US011235515B2

(12) United States Patent
Lawless et al.

(10) Patent No.: US 11,235,515 B2
(45) Date of Patent: Feb. 1, 2022

(54) METHODS, SYSTEMS, AND DEVICES FOR THREE-DIMENSIONAL OBJECT GENERATION AND PHYSICAL MASK CURING

(71) Applicant: CALT Dynamics Limited, County Wicklow (IE)

(72) Inventors: Ross Lawless, Newtownmountkennedy (IE); Irene Villafane, Newtownmountkennedy (IE); Warren Katz, Boston, MA (US); Mark McDonagh, Dublin (IE)

(73) Assignee: CALT DYNAMICS LIMITED, County Wicklow (IE)

( * ) Notice: Subject to any disclaimer, the term of this patent is extended or adjusted under 35 U.S.C. 154(b) by 0 days.

(21) Appl. No.: 17/226,869

(22) Filed: Apr. 9, 2021

(65) Prior Publication Data
US 2021/0229346 A1 Jul. 29, 2021

Related U.S. Application Data

(63) Continuation-in-part of application No. 17/260,347, filed as application No. PCT/US2019/043764 on Jul.
(Continued)

(51) Int. Cl.
*B29C 64/129* (2017.01)
*B33Y 30/00* (2015.01)
(Continued)

(52) U.S. Cl.
CPC .......... *B29C 64/129* (2017.08); *B29C 64/245* (2017.08); *B29C 64/255* (2017.08);
(Continued)

(58) Field of Classification Search
CPC ... B29C 64/129; B29C 64/245; B29C 64/255; B29C 64/286; B33Y 10/00; B33Y 30/00; B33Y 40/00; B33Y 40/20
(Continued)

(56) References Cited

U.S. PATENT DOCUMENTS 4,074,287 A 2/1978 Iwata et al.
4,086,582 A 4/1978 Kiyohara et al.
(Continued)

FOREIGN PATENT DOCUMENTS

WO 2017079774 A2 5/2017

OTHER PUBLICATIONS

Anonymous. "Introducing the Form 3 and Form 3L, Powered by Low Force Stereolithography." Formlabs, Apr. 2, 2019, formlabs.com/blog/introducing-form-3-form-3l-low-force-stereolithography.
(Continued)

*Primary Examiner* — Joseph S Del Sole
*Assistant Examiner* — Lawrence D. Hohenbrink, Jr.
(74) *Attorney, Agent, or Firm* — Cantor Colburn LLP

(57) ABSTRACT

An additive manufacturing system is provided including a light source configured to emit light, a vessel configured to contain a photopolymer, and a bed having a surface disposed at least partially within the vessel. The surface is movable in a first direction relative to the light source. A membrane is fixed to the vessel and is positioned between the light source and the photopolymer. A movable carrier is disposed between the light source and the membrane. The light source is operably coupled to the movable carrier.

17 Claims, 66 Drawing Sheets

Related U.S. Application Data 26, 2019, application No. 17/226,869, which is a continuation of application No. PCT/US2020/026288, filed on Apr. 2, 2020.

(60) Provisional application No. 62/743,615, filed on Oct. 10, 2018, provisional application No. 62/711,516, filed on Jul. 28, 2018, provisional application No. 62/829,367, filed on Apr. 4, 2019.

(51) Int. Cl.

| | |
|---|---|
| *B29C 64/245* | (2017.01) |
| *B29C 64/255* | (2017.01) |
| *B29C 64/286* | (2017.01) |
| *B33Y 40/20* | (2020.01) |
| *B33Y 10/00* | (2015.01) |
| *B33Y 40/00* | (2020.01) |

(52) U.S. Cl.
CPC ............ *B29C 64/286* (2017.08); *B33Y 30/00* (2014.12); *B33Y 10/00* (2014.12); *B33Y 40/00* (2014.12); *B33Y 40/20* (2020.01)

(58) Field of Classification Search
USPC ........................................................ 264/40.1
See application file for complete search history.

(56) References Cited

U.S. PATENT DOCUMENTS

| | | | |
|---|---|---|---|
| 5,135,379 A | | 8/1992 | Fudim |
| 6,547,552 B1* | | 4/2003 | Fudim .................. B33Y 30/00 425/174.4 |
| 10,675,856 B2 | | 6/2020 | Frantzdale |
| 10,710,303 B2 | | 7/2020 | Broady et al. |
| 2015/0137426 A1 | | 5/2015 | Van Esbroeck et al. |
| 2015/0145171 A1* | | 5/2015 | Walker .................... B29C 64/40 264/401 |
| 2016/0059486 A1 | | 3/2016 | Desimone et al. |
| 2016/0136902 A1 | | 5/2016 | Stadlmann |
| 2017/0173872 A1 | | 6/2017 | McCall et al. |
| 2017/0281828 A1* | | 10/2017 | Zhang ................ A61L 27/3891 |
| 2017/0297102 A1 | | 10/2017 | Chin et al. |
| 2017/0355132 A1 | | 12/2017 | Moore |
| 2019/0369566 A1* | | 12/2019 | Lobovsky ............... G01L 1/127 |

OTHER PUBLICATIONS

International Search Report of the International Searching Authority; International Application No. PCT/US2019/043764; International Filing Date: Jul. 26, 2019; dated Oct. 9, 2019; 4 pages.

International Search Report of the International Searching Authority; International Application No. PCT/US2020/026288; International Filing Date: Apr. 2, 2020; dated Aug. 17, 2020; 4 pages.

Written Opinion of the International Searching Authority; International Application No. PCT/US2019/043764; International Filing Date: Jul. 26, 2019; dated Oct. 9, 2019; 10 pages.

Written Opinion of the International Searching Authority; International Application No. PCT/US2020/026288; International Filing Date: Apr. 2, 2020; dated Aug. 17, 2020; 7 pages.

* cited by examiner

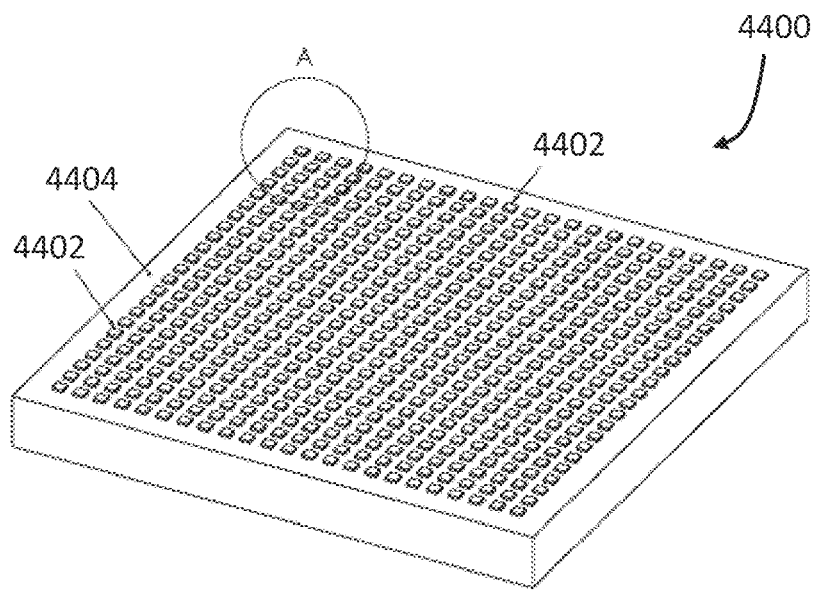
FIG. 38A
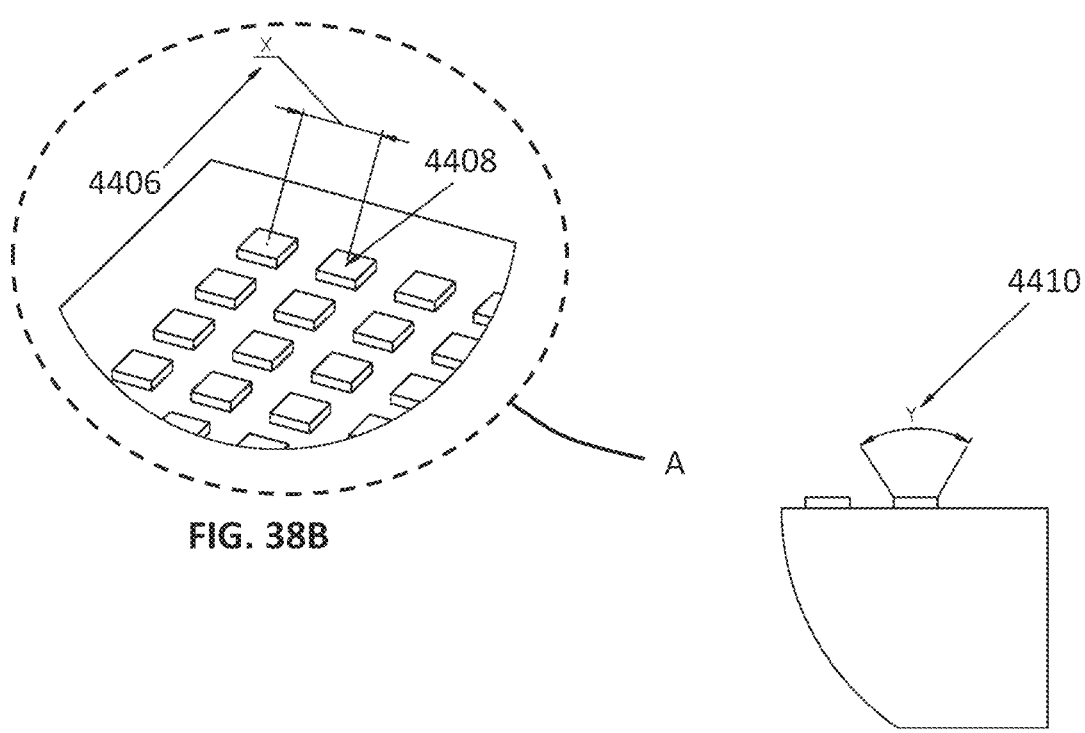
FIG. 38B
FIG. 38C

METHODS, SYSTEMS, AND DEVICES FOR THREE-DIMENSIONAL OBJECT GENERATION AND PHYSICAL MASK CURING

CROSS-REFERENCE TO RELATED APPLICATIONS

This application is a Continuation-in-Part of U.S. patent application Ser. No. 17/260,347 filed Jan. 14, 2021, which is a National Stage Application of PCT/US2019/043764 filed Jul. 26, 2019, which claims the benefit of U.S. Provisional Application No. 62/743,615 filed Oct. 10, 2018, and U.S. Provisional Application No. 62/711,516 filed Jul. 28, 2018, the disclosures of which are incorporated herein by reference in their entirety. This application is additionally a continuation of International Application PCT/US2020/026288, which claims priority to and the benefit of U.S. Provisional Patent Application No. 62/829,367, filed Apr. 4, 2019, and International Application No. PCT/US2019/043764, filed Jul. 26, 2019, the disclosures of each of which are incorporated herein by reference.

TECHNICAL FIELD

The present disclosure relates generally to methods, systems, and devices for additive manufacturing or printing of three-dimensional (3D) objects, and more specifically, to 3D printing using physical media or masks including information regarding a 3D object along with a vessel containing a printing substance (e.g., a photopolymer) where the cured photopolymer is detached from the device via the release mechanism described herein.

BACKGROUND

Printing of 3D objects typically involves the use of a printer that applies thin layers of material in succession. For example, a 3D printer can include a container for holding a liquid polymer that can be cured on a bed to produce a 3D object. The printer can include a light source and a controller that selectively controls the light source to expose the liquid polymer to light to print successive layers of the 3D object. Existing systems, however, require light sources that are dynamically controllable by a compute device to form specific layers of a 3D object.

Further, in existing systems to separate the cured layer from the base, the bed on which cured object is being formed is moved to cause separation of the cured layer from the base. This movement is large (e.g. multiples of the thickness of the layer) and is done slowly to provide the desired separation. Further, the separation of the layer is performed over the entire area of the layer at once. It should be appreciated that this movement of the bed to separate the cured layer slows the time to form the desired object.

Accordingly, while existing 3D printing systems are suitable for their intended purpose the need for improvement remains, particularly in providing a 3D printing system that cures photopolymers using a light source in a cost effective manner and having the features described herein.

SUMMARY

In accordance with an embodiment, an additive manufacturing system is provided. The additive manufacturing system includes a light source configured to emit light, a vessel configured to contain a photopolymer, and a bed having a surface disposed at least partially within the vessel. The surface is movable in a first direction relative to the light source. A membrane is fixed to the vessel and is positioned between the light source and the photopolymer. A movable carrier is disposed between the light source and the membrane. The light source is operably coupled to the movable carrier.

In addition to one or more of the features described herein, or as an alternative, in further embodiments of the system the vessel further comprises a housing having a bottom opening and the membrane extends across the bottom opening.

In addition to one or more of the features described herein, or as an alternative, in further embodiments of the system an upper side of the membrane is coated with at least one of a hydrophobic material and a fluid having a density greater than a density of the photopolymer.

In addition to one or more of the features described herein, or as an alternative, in further embodiments of the system the membrane is fixed to the vessel with a tension sufficient to maintain the membrane in a flat configuration when the weight of the photopolymer is acting on the membrane.

In addition to one or more of the features described herein, or as an alternative, in further embodiments of the system the bed is configured to move one layer thickness after a first layer is formed.

In addition to one or more of the features described herein, or as an alternative, in further embodiments of the system the light source is configured to emit light in the ultraviolet spectrum.

In addition to one or more of the features described herein, or as an alternative, in further embodiments of the system the light source includes one of a light emitting diode, a cold cathode tube, or an array of dynamically selectively activated light emitting diodes.

In addition to one or more of the features described herein, or as an alternative, in further embodiments of the system the membrane has a Youngs modulus between 0.4 GPa and 4.5 GPa.

In addition to one or more of the features described herein, or as an alternative, in further embodiments of the system the carrier is a mask carrier that is movable during operation in a plane that is parallel to the surface.

In addition to one or more of the features described herein, or as an alternative, in further embodiments of the system the mask carrier is removably coupled to the system.

In addition to one or more of the features described herein, or as an alternative, in further embodiments of the system the membrane is configured in operation to release from a cured photopolymer as the mask carrier moves in the plane.

In addition to one or more of the features described herein, or as an alternative, in further embodiments, the system comprises a mask disposed within the mask carrier, the mask having a plurality of orifices formed thereon, the orifices being configured to transmit the light therethrough.

In addition to one or more of the features described herein, or as an alternative, in further embodiments, the system comprises a wash tank disposed adjacent the vessel, wherein the bed is configured to move a formed photopolymer object from the vessel to the wash tank.

In addition to one or more of the features described herein, or as an alternative, in further embodiments, the system comprises a cure tank having at least one evaporation element operably disposed thereon, the cure tank being disposed adjacent the vessel and the wash tank, the bed being configure to move the formed photopolymer object from the wash tank to the cure tank.

In accordance with an embodiment, a method of fabricating an object includes providing a vessel containing a photopolymer, a membrane affixed to the vessel, and a bed positioned a first layer thickness away from membrane, directing a first light through the membrane into the photopolymer, the first light being generated by a light source, curing a first portion of the photopolymer between the membrane and the bed with the first light, moving a carrier from a first position to a second position to separate the first portion from the membrane, the light source being operably coupled to the carrier, and moving the bed in a direction away from the membrane.

In addition to one or more of the features described herein, or as an alternative, in further embodiments of the system the membrane forms a bottom surface of the vessel.

In addition to one or more of the features described herein, or as an alternative, in further embodiments of the system moving the bed in a direction away from the membrane separates the first portion from the membrane by a predetermined distance.

In addition to one or more of the features described herein, or as an alternative, in further embodiments of the system separating the first portion from the membrane includes peeling the first portion from the membrane, the peeling beginning at an edge of the first portion in response to a movement of the carrier.

In addition to one or more of the features described herein, or as an alternative, in further embodiments of the system the carrier includes a mask.

In addition to one or more of the features described herein, or as an alternative, in further embodiments of the system the moving of the bed is a distance equal to a next layer thickness.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 38A-41B depict an LED light source which is comprised of an array of LEDs where each LED in said array can form a cure point in photopolymer.

DETAILED DESCRIPTION

Figure 1:
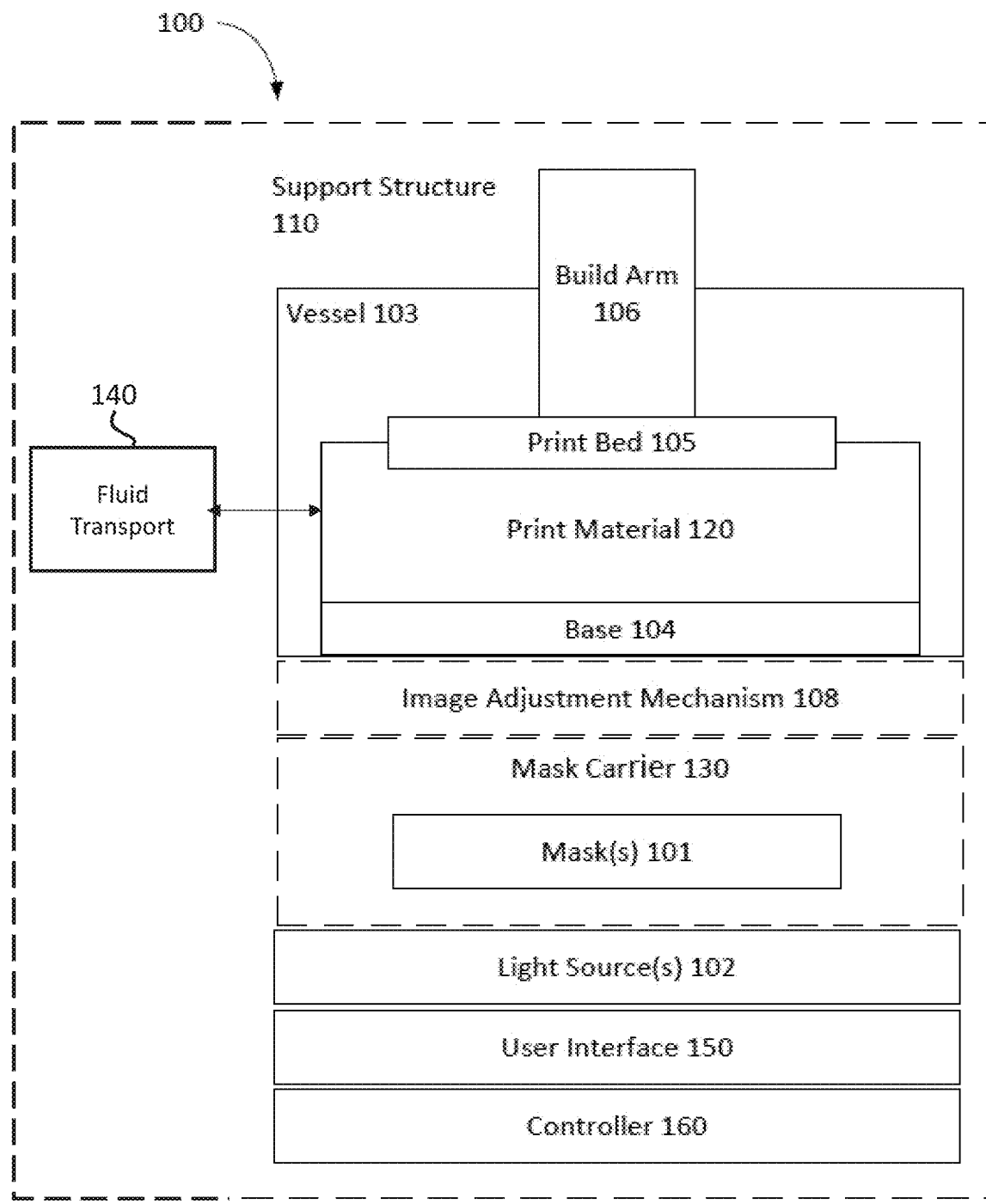
FIG. 1 is a schematic illustration of an additive manufacturing device, according to embodiments disclosed herein.

Some prior art systems utilise a digital micro-mirror device in order to direct light towards the photopolymer vessel, other such systems utilise a liquid crystal display. Both of which are designed for the transmission and representation of images within the visible light spectrum. In embodiments herein, it is desirable to create a light source specifically designed for the purposes of curing a photopolymer with electromagnetic radiation within the ultra-violet spectrum. Furthermore, some prior art systems utilise a laser which incurs addition cost and complexity to alter the diameter and shape of the beam. In embodiments described herein, the 3D printing system achieves alterations in light beam diameter and shape during the 3D printing process in a cost-effective manner without varying the quantity of radiation striking the photopolymer used in the process. Embodiments of the 3D printing system described herein can further operate with a plurality of beam diameters without an increase in complexity. Moreover, multiple light beams can be cured simultaneously without additional complexity.

Systems, devices, and methods are described herein for additive manufacturing or printing of 3D objects. In some embodiments, systems, devices, and methods relate to additive manufacturing or 3D printing using a vessel, which contains one or more components for printing a 3D object, a physical mask or media, and one or more light sources. In some embodiments, the vessel can contain a volume of a print material (e.g., a photopolymer), a print bed, a build arm, and a cleaning agent (e.g., a carbonated or non-carbonated cleaning fluid, such as, for example, alcohol), each contained in one or more chambers of the vessel. In some embodiments, the light source can be a non-dynamic light source such as a light emitting diode.

Objects manufactured using a 3D manufacturing device are typically cleaned and cured after printing. Existing methods of manufacturing a 3D object, however, treat cleaning and curing as post-processing steps that are separate from the printing function of an additive manufacturing device.

The additive manufacturing systems and methods described herein provide several advantages over existing 3D printing methods, including lower manufacturing costs, e.g., because such systems and methods do not require the use of a dynamic light source, such as a laser or digital light processing (DLP) projector. Without requiring a dynamic light source, systems and methods described herein can reduce power consumption and/or make use of commercially available portable power sources (e.g., batteries). Systems and methods disclosed herein also use physical media for storing input data (e.g., models or patterns associated with printed objects), which can be easier to produce and/or more secure than a digital file.

Embodiments of the present disclosure herein relates to an additive 3D printing process that can use physical media implemented as a set of physical masks to form a series of patterns, as opposed to a dynamic light source. The masks include a first area or orifice that is configured to transmit light (e.g. translucent to a desired wavelength of light) therethrough and a second area that blocks the transmission of light.

In some embodiments, systems and devices disclosed herein can include a 3D printer, a physical media device (e.g., a physical mask reel), and a vessel that contains a volume of a print material (e.g., a photopolymer such as resin) while interfacing with a mask carrier. In addition to these three components, such systems and devices can include one or more of: a build plate (e.g., a print bed or surface upon which the object will be printed) that can be held parallel to a bottom surface of the vessel, an information tag (e.g., near field communications tag) disposed or contained within the build plate or another component, a build arm attached to a print bed and attached to a printer once installed, and/or a volume of cleaning fluid (e.g., alcohol) such that a printed object can be submerged or washed in the cleaning fluid once printing has completed. Optionally, the vessel can be sealed such that the print material is contained in a sealed chamber until the printing process begins and/or throughout a portion of or an entirety of a printing process. In some embodiments, the cleaning fluid can be stored in a contained fashion (e.g., in a sealed or closed off chamber) separate from the print material until printing is completed, Systems and devices set forth herein can have particular applications in onsite production of parts or objects, e.g., in aid, industrial, military or consumer applications, where access to large scale photopolymer printing may be desired. The disclosed systems and devices can also have applicability in Science, Technology, Engineering, the Arts and Mathematics (STEAM) applications and other educational applications In some embodiments, processes described herein can enable commercialization of scalable, low cost, low power, high resolution printers. These processes can be different from currently available processes that use digital micro mirror device, liquid crystal display or laser. The processes also does not require static electricity for the transfer of materials nor the lamination of prefabricated sheets, nor the spraying of the photopolymer in an inkjet fashion. In some embodiments, a process referred to as the Physical Mask Curing (PMC) process uses a light source and mask to form images into a photopolymer to create a 3D object. In some embodiments, the light can be in the UV range. physical media (e.g., physical masks) can incorporate materials such as carbon (e.g., in black ink and toner) printed/etched/painted on paper and polymer substrates used to selectively block UV light. In other embodiments, physical media can also be created with other materials and fabrication methods, such as, for example, laser cutting cardboard, hand drawing on paper, etc.

Certain processes for additive manufacturing of photopolymer materials use a digital image source. The digital image source can emit light at a photopolymer to cure specific portions of the photopolymer. Examples of dynamic image sources used in the additive manufacturing of photopolymers include laser galvanometer systems, digital light projection (DLP) systems and Liquid crystal displays coupled with UV L.E.Ds. Typically, dynamic image sources are a high cost component of an additive manufacturing device. Accordingly, since processes and devices described herein do not require the use of a dynamic image source, such processes and devices can reduce costs. For example, processes and devices described herein can operate without a dynamic image source by utilizing a physical media masking system or PMC process. The PMC process allows a dynamic image source to be replaced with a non-dynamic image source, e.g., an optical light source such as a light emitting diode (LED) array, which can be significantly lower in cost when compared to a dynamic light source coupled with a mask. These and other advantages increase of the accessibility of systems and devices disclosed herein.

In addition the advantages of using physical masks include high printing resolution (e.g., ability to resolve details) at a lower cost when compared to galvanometer or DLP systems. For example, in a laser-based dynamic image source system, the dot size of the beam is usually around 0.14 mm. DLP systems, another example of a dynamic image source system, usually operate around a 0.05 mm pixel pitch. The PMC process and systems described herein can achieve resolutions greater than or equal to 0.01 mm using a low cost mask and single LED. The PMC process and system can achieve this because the masking aspect of a digitally controlled dynamic light source can be replaced with a physical, low cost, mask which can be produced by 2D printing systems having high resolution (e.g., 4800 dpi). By harnessing the resolution of 2D printing systems, low cost physical masks can be produced, e.g., by using such 2D systems to print patterns on paper or plastic substrates. This coupled with the release mechanism utilised by the vessel described herein allows for a large printing area without, or at least reducing the risk of, damaging the printed object upon release nor reducing on print quality. Typically the dot size (minimum surface area that can be illuminated by the light source) of a laser based system is 140 μm, for a DLP system it is typically 50 μm avg and for PMC 25 μm. It should be appreciated that by controlling the 2D printing of a mask smaller hole sizes can be created on the mask substrate by repeated passes of the printing process.

FIG. 1 schematically depicts an additive manufacturing device 100 (e.g., a 3D printer). The manufacturing device 100 can include or be used with one or more mask(s) 101. The mask(s) 101 can optionally be stored in a mask carrier 130. The mask carrier 130 can be configured to support the mask(s) 101 (e.g., in position between light source(s) 102 and a vessel 103) and/or move the mask(s) 101 (e.g., according to a predefined sequence for printing a 3D object). The mask carrier 130 can include, for example, a reel that stores the mask(s) 101 and advances the mask(s) 101 such that they can be exchanged before or during a printing process. The mask(s) 101 can be manually advanced by a user, e.g., by rotating the reel. Alternatively or additionally, the mask(s) 101 can be advanced automatically by a compute device (e.g., an on-board processor such as controller 160). Additionally, in some embodiments the light source may be contained within the mask carrier.

In some embodiments, the mask(s) 101 can include a substrate that includes light transmissive and non-transmissive portions. For example, a mask 101 can include a substrate such as a thin paper or polymer that is light transmissive, and portions of that paper or polymer can be printed with a dark ink (e.g., a black ink) to make those portions non-transmissive. Alternatively, a mask 101 can include a more rigid substrate (e.g., a cardboard, a wood, a polymer, a glass, etc.) and portions of the rigid substrate can be etched, cut out, etc. to form transmissive and/or non-transmissive portions. The transmissive and non-transmissive portions of the mask(s) 101 can define patterns that are associated with individual layers of a 3D object or can represent a circular orifice(s) or patterns such as an 'infill' pattern. For example, each mask within a set of masks 101 can be associated with a different exposure diameter or pattern, and collectively the set of masks 101 can be used to print the 3D object by controlling the light that can pass from the light source(s) 102 to a vessel 103, as further described below.

The manufacturing device 100 can include one or more light source(s) 102. The light source(s) 102 can be configured to emit light for curing a print material 120 stored in a vessel 103, as further detailed below. In some embodiments, the light source(s) 102 can be light emitting diode(s) (LED(s)). In some embodiments, the light source(s) 102 can be configured to emit ultraviolet (UV) light that is designed to cure the print material 120. In some embodiments, the light source(s) 102 can include an external light source, such as, for example, a solar light source, an external light bulb, etc.

The manufacturing device 100 can include a vessel 103 that includes one or more chambers or component vessels. The one or more chambers can store one or more print material(s) 120 (e.g., different types of print material and/or different colors of print material). The print material(s) 120 can be, for example, a photopolymer. Optionally, the one or more chambers can store a cleaning fluid (e.g., alcohol) that can be used to clean a printed 3D object. The vessel 103 can optionally include a fluid transport mechanism 140 that transports fluid (e.g., a print material or a cleaning agent) in and/or out of a chamber of the vessel 103. For example, the fluid transport mechanism 140 can be used to deliver a print material 120 into a chamber for curing (e.g., via light from light source(s) 102) and/or remove excess print material 120 from the chamber after the curing. Additionally or alternatively, the fluid transport mechanism 140 can deliver a cleaning agent into a chamber after an object has been printed, e.g., to clean the object. The fluid transport mechanism 140 can include one or more channels, valves, and/or other components for enabling controlled transport of fluids (e.g., a liquid or air).

The vessel 103 can include a surface suitable for curing the print material 120. The surface can be implemented as a base 104 that is formed of a transparent material or light transmissive material. Examples of suitable materials include fluorinated ethylene propylene (FEP) and polypropylene (PP) and Polyethylene terephthalate (PET). In some embodiments, the base 104 can be a membrane that is placed across a housing of the vessel 103. For example, the vessel 103 can include a rigid housing defining a space (e.g., a lumen, a chamber) for containing the print material 120 and a bottom opening, and the membrane forming the base 104 can be placed across this opening to provide a light transmissive surface for receiving light into the space. The vessel 103 can include and or be configured to receive a print bed 105 (e.g., build plate) that provides an area onto which layers of print material 120 can be printed or cured. This differs from other vessels common in the art where the base of the vessel is held taught or backed by a rigid material such as glass or acrylic sheeting. The print bed 105 can be positioned such that it extends parallel to the base 104 of the vessel 103. During printing, the location of the print bed 105 can be adjusted to different heights as each layer of an object is printed, e.g., the print bed 105 can initially be one layer height spaced from the base 104 when a first layer of the object is being printed and then be raised as additional layers of the object are being printed. The print bed 105 and the base 104 can be designed such that a printed object adheres with greater force to the print bed 105 than the base 104 during a printing process. As the release of the printed polymer from the base is performed by a combination of the motion of the mask carrier and the design of the vessel, the print bed need not be lifted for separation unlike systems common in the art. This separation will allow additional print material 120 to flow into the space between the print bed 105 and the base 104 for subsequent curing of additional layers of the object. In some embodiments, a coating (e.g., a hydrophobic material) can be applied to the base 104 that reduces adherence of the cured print material 120 to the base 104.

The print bed 105 can be coupled to a build arm 106, which in turn can be coupled to a support structure 110. The build arm 106 can be configured to move the print bed 105 during operation. The build arm 106 can be configured to move the print bed 105 to submerge a printed object in a cleaning agent after a print process. Movement of the build arm 106 can be controlled by a compute device (e.g., an on-board processor such as controller 160) or manually adjusted by a user. When controlled by a compute device, the compute device can use information obtained regarding the object being printed and/or the mask(s) 101 associated with that object to determine which heights to set the print bed 105 to, e.g., for curing each layer of the object. In some embodiments, the compute device can obtain this information, for example, from an information tag (e.g., NFC tag) located on the mask(s) 101, mask carrier 130, vessel 130, and/or other suitable component of the device 100. For example, the compute device can be operatively coupled to one or more sensors (e.g., a NFC tag reader) located on the manufacturing device 100, and can use those sensors to capture information regarding the object and its associated mask(s) 101.

In some embodiments, the manufacturing device 100 can include a support structure 110, such as, for example, a body or frame. The support structure 110 can support the light source(s) 102, mask carrier 130, mask(s) 101, and vessel 103 in operative positions relative to one another, e.g., such that an object can be printed using such components. In some embodiments, the vessel 103 and/or mask carrier 130 (or other components of the manufacturing device 100) can be designed to be selectively coupleable (e.g., attachable and removable) from the manufacturing device 100. For example, the vessel 103 and/or mask carrier 130 can be coupled to the support structure 110 (e.g., received within slots and/or openings in the support structure 110) prior to a printing process, and then removed after the printing process and optionally discarded. In some embodiments, the vessel 103 can form a sealed chamber for storing the print material 120 prior to printing, which can be unsealed and/or remain sealed during a printing process.

The manufacturing device 100 can include a microcontroller 160 (e.g., an on-board processor or compute device and memory). The controller 160 can control the operation of one or more components of the manufacturing device 100. For example, the controller 160 can control the light source(s) 102 to emit light during specific time periods of a print process. In embodiments including a mask carrier 130 with a reel of mask(s) 101, the controller 160 can control the operation of the mask carrier 130 to advance individual mask(s) 101 such that the mask(s) 101 can be exchanged for one another during a print process by reeling. In embodiments including an image adjustment mechanism 108, the controller 160 can control a position and/or orientation of one or more components of the image adjustment mechanism 108 (e.g., lenses). In some embodiments, the controller 160 can control the movement of the build arm 106 and print bed 105 during a printing and/or cleaning process.

In some embodiments, the controller 160 can be configured to receive user inputs (e.g., via user interface 150) and control the operation of the manufacturing device 100 based on such inputs. For example, the controller 160 can receive an input from a user requesting a print of a 3D object, and in response to that input, control one or more of the build arm 106, print bed 105, image adjustment mechanism 108, mask carrier 130, mask(s) 101, or light source(s) 102 to print the 3D object and/or clean the 3D object after printing. The controller 160 can be any suitable type of processing device, including, for example, a general purpose processor, a Field Programmable Gate Array (FPGA), an Application Specific Integrated Circuit (ASIC), a Digital Signal Processor (DSP), a microprocessor, and/or the like. The controller 160 can be operatively coupled to each component of the manufacturing device 100 that it is configured to communicate with (e.g., receive and/or send data) and/or control.

In some embodiments, the controller 160 can be operatively coupled to one or more sensors coupled to and/or integrated into the manufacturing device 100. The one or more sensors can include, for example, image capture devices (e.g., cameras), light sensors, position sensors, force sensors, temperature sensors, pressure sensors, motion sensors, sound detectors, etc. The controller 160 can receive information form the one or more sensors and use that information to confirm installation and/or proper positioning of one or more components of the manufacturing device 100 (e.g., the vessel 103, the mask carrier 130, the mask(s) 101) and/or to confirm proper operation of the manufacturing device 100. In some embodiments, the controller 160 can be configured to present alerts (e.g., error signals) or other information to a user, e.g., via user interface 150, based on information collected by the one or more sensors.

User interface 150 can include one or more components that are configured to receive inputs and send outputs to other devices and/or a user operating the manufacturing device 100. For example, user interface 150 can include a display device (e.g., a display, a touch screen, etc.), an audio device (e.g., a microphone, a speaker), or other devices configured for receiving an input and/or generating an output to a user.

Figure 2:
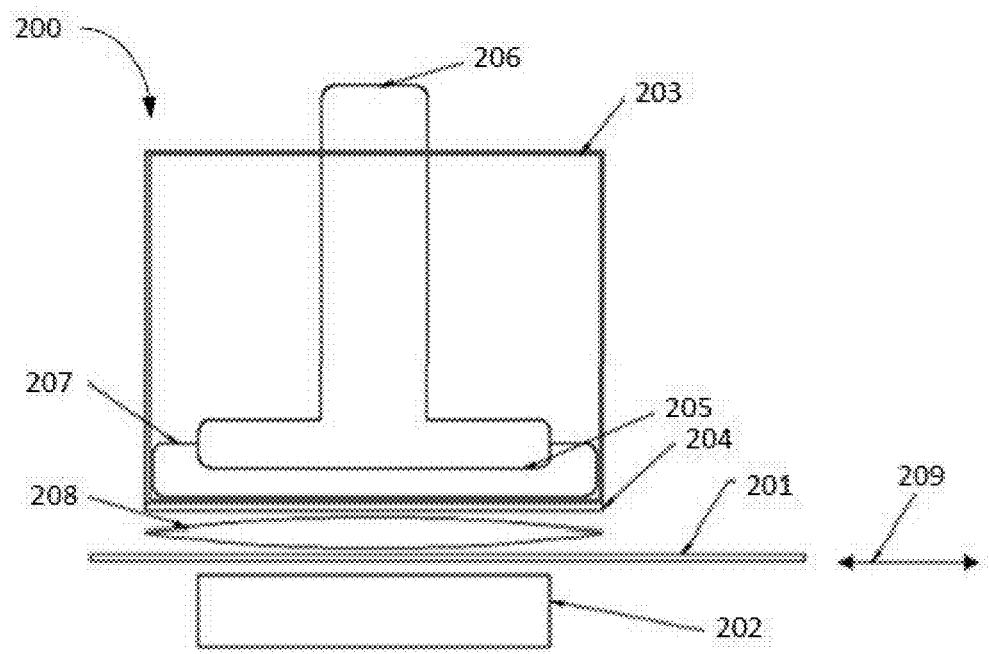
FIG. 2 is a schematic illustration of an additive manufacturing device, according to embodiments disclosed herein.

FIG. 2 schematically depicts an additive manufacturing device 200 (e.g., a 3D printing device), according to embodiments described herein. The additive manufacturing device 200 can include components that are structurally and/or functionally similar to other additive manufacturing devices described herein (e.g., additive manufacturing device 100). The manufacturing device 200 can include a light source 202, a mask(s) 201, a vessel 203 including a base 204 and an area 207 including a volume of photopolymer (e.g., a print material), a print bed 205, and a build arm 206.

Figure 24A:
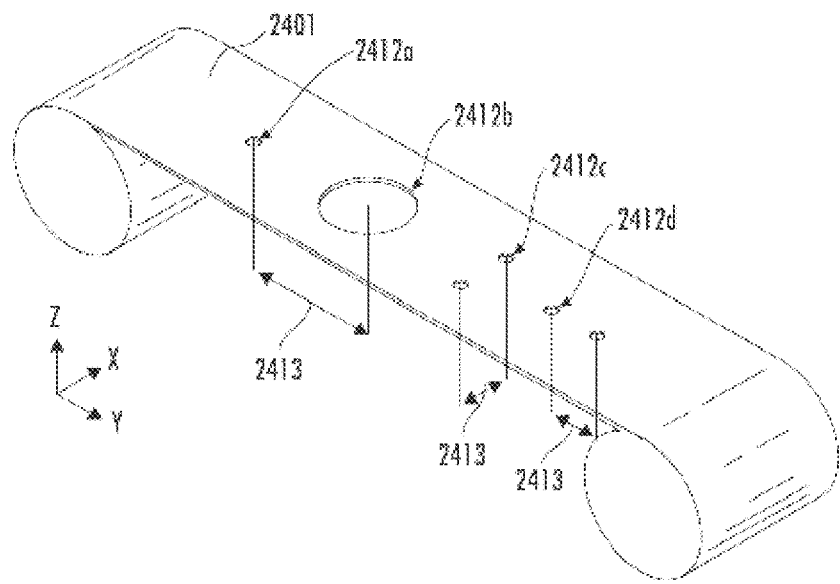
FIGS. 24A and 24B depict examples of mask reels, according to embodiments.
Figure 24B:
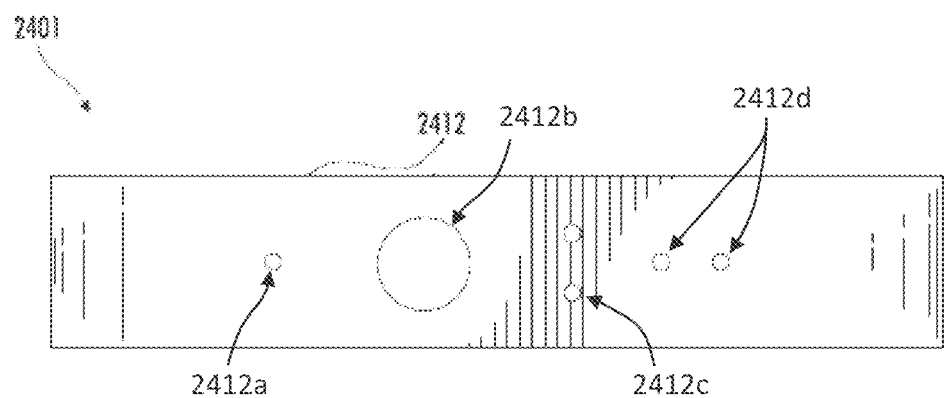

The mask 201 can optionally be exchanged with other masks, e.g., via a reel or other suitable device, as represented by arrow 209. The mask 201 can include a pattern or image that is associated an exposure diameter or curing pattern representing a section of a layer. Examples of images that can be printed on the mask 201 (and other masks described herein) are depicted in FIG. 24A and FIG. 24B.

The light source 202 can include one or more LEDs or another suitable light source (e.g., a light bulb). In an embodiment, the light source 202 is a non-dynamic light source. In some embodiments, the light source 202 can be configured to emit UV light (e.g., light with a wavelength within the UV spectrum, e.g., below 420 nm) or other light suitable for curing the print material contained within the area 207 of the vessel 203. In some embodiments, the angle of emission can be low to increase an amount of light that hits the mask 201 at a perpendicular angle. The light source 202 can emit light with an angle of emission that is generally perpendicular (e.g., at a 90 degree angle±10%) to a top surface of the light source 202. Stated differently, the light source 202 can be configured to emit light at an angle of about 90 degrees (e.g., 90 degrees±10%), and desirably at 90 degrees, with respect to a surface of a particular light emission unit (e.g., LED) although it should be appreciated that any angle of incidence will result in curing.

The vessel 203 containing the volume of photopolymer can be positioned above the mask 201. The base 204 of the vessel 203 can be formed of an optically clear or light transmissive material that enables light emitted by the light source 202 to enter the area 208 of the vessel 203 containing the photopolymer, such that a portion of the photopolymer can be cured against an inner surface of the base 204. In some embodiments, the base 204 can be formed of FEP or a similar material. The material can be designed to allow for separation of a cured area or portion of photopolymer form the base 204 with a low force.

The print bed 205 is configured to provide a flat surface onto which layers of an object can be printed. During printing, a portion of the photopolymer between the print bed 205 and the base 204 of the vessel can be cured, and be held upon the bottom surface of the print bed 205 with a greater force than to the base 204 of the vessel 203. Accordingly, when the print bed 205 is moved a distance away from the base 204, the cured photopolymer can separate from the base 205. Subsequent curing of additional layers of photopolymer can be achieved by movement of the mask carrier and re-positioning the print bed 205 one layer height relative to its previous position.

The build arm 206 can be coupled to the print bed 205, and be used to move the print bed 205 vertically (e.g., away from and toward the base 204 in a orthogonal direction) during a printing process. The image adjustment mechanism 208 can include one or more lenses, which can be used to scale an image projected by the light 202 and mask 201.

In operation (e.g., to manufacture a particular 3D object using the PMC process), the print bed 205 can be lowered into a bottom portion of the vessel 203 such that a bottom surface of the print bed 205 is one-layer height away from the base 204 of the vessel 203. Such lowering can be accomplished via an on-board processor (e.g., controller 160) of the manufacturing device 200. The print bed 205 can be attached to the build arm 206, which in turn can be attached to another portion of the manufacturing device 200 (e.g., a support structure, such as, for example, support structure 110), which can facilitate movement of the print bed 205 and build arm 206. The light source 202 can then be activated such that it emits light though the transmissive portions of the mask 201 and subsequently through the base 204 of the vessel 203 and into contact with a portion of the photopolymer within, according to an image or pattern printed on the mask 201. Based on the pattern formed by the light that is transmitted through the mask 201 (and the light that is blocked by the non-transmissive portions of the mask 201), a line/curve can be cured and printed on the print bed 205 or a pattern can be cured in sections. The print bed 205 with the cured layer of photopolymer is then raised, while unlike systems common in the prior art separating from the base 204 of the vessel 203 is not necessary at this point as this is occurring continuously as the mask carrier is in motion. The print bed 205 can be moved into a position such that it is two-layer heights above the base 204 of the vessel 203. Optionally, the mask 201 can be exchanged, depending on the specific requirements of the additive manufacturing process for the particular object. In an embodiment, the exchange of the mask can involve rolling a reel of masks forward until the next mask is aligned with the light source 202, according to the direction shown with arrow 9 in FIG. 2. This process of curing a layer of photopolymer in lines, curves and patterns while separating the print bed 205 from the base 204 of the vessel 203, and then lifting the print bed 205 by one layer height can repeat layer-by-layer until the object has been manufactured.

In can be desirable to separate or release a cured layer of print material (e.g., photopolymer) from a vessel without requiring lifting and lowering of a print bed, or by lifting the print bed a lesser amount. Such that reduce overall times required to print an object using an additive manufacturing device and increasing the delicacy with which it is released. In some embodiments, passive separation forces can be generated between a cured layer of an object and a vessel using surrounding print material and flexible membranes to separate the cured layer from the vessel. These passive separation forces, as further detailed below, can be dependent on a number of factors, including, for example, a volume or weight of print material (e.g., photopolymer), the material used to form the base of a vessel, the design of the vessel, relative positions between various components of the manufacturing device (e.g., relative positioning of a mask carrier to a base of the vessel), etc.

It can also be desirable to make an additive printing process scalable such that it can be used for objects with larger dimensions. Since curing a photopolymer has a surface area dependency, ensuring complete release between the cured photopolymer and the vessel floor during each cycle is more difficult at large surface areas (e.g., above 20 cm by 20 cm), with forces holding the cured photopolymer to the vessel floor becoming greater at greater surface areas. In some devices common in the art, additional robotics can be employed to complete a cycle of printing and release, but such can increase the time per cycle and the cost of the additive manufacturing device. It is therefore desirable to employ other mechanisms of releasing cured photopolymer from a vessel floor, such as those described herein.

Figure 3:
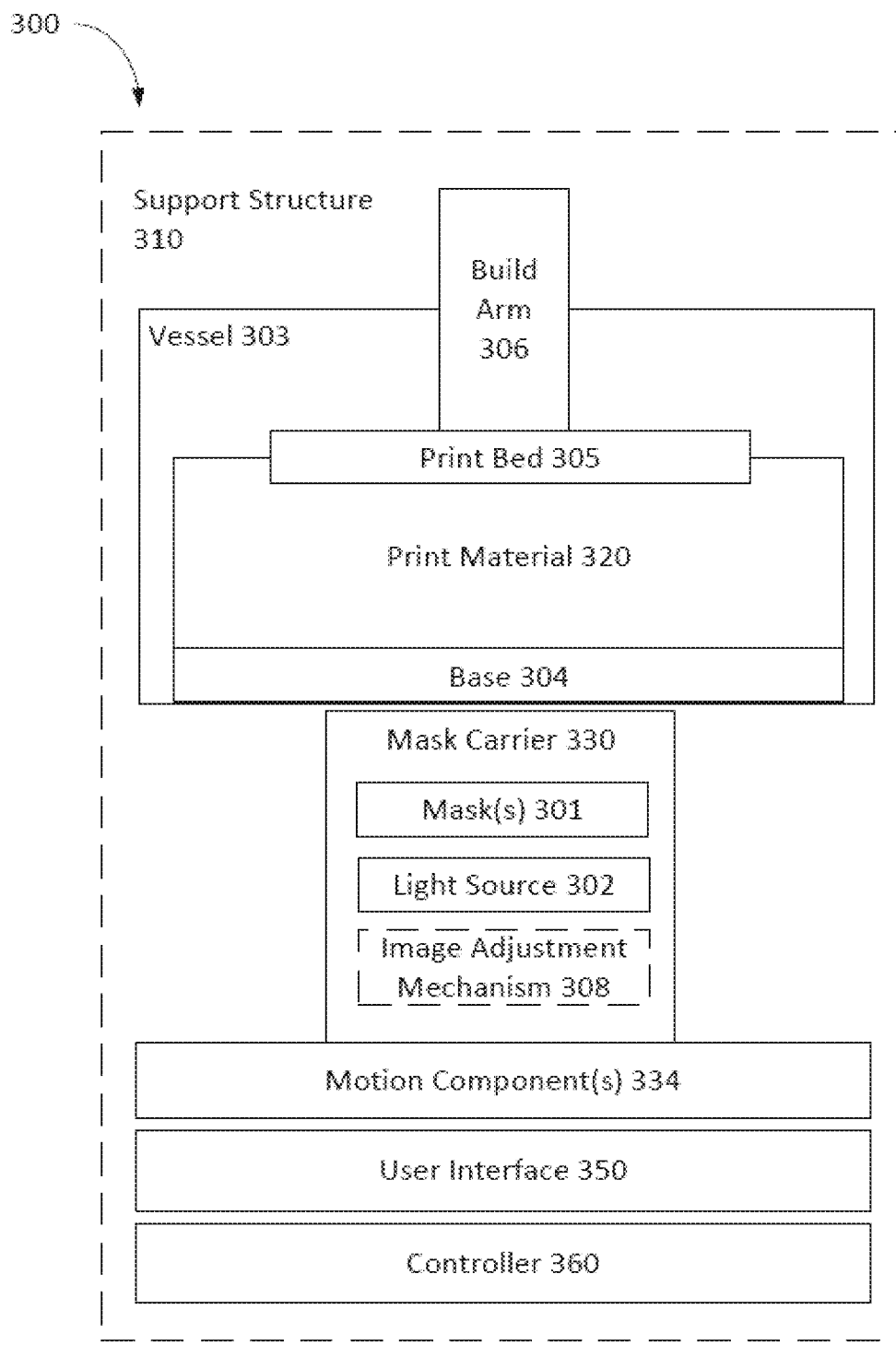
FIG. 3 is a schematic illustration of an additive manufacturing device, according to embodiments disclosed herein.

FIG. 3 schematically depicts an additive manufacturing device 300 (e.g., a 3D printer). The manufacturing device 300 can include components that are structurally and/or functionally similar to those of other manufacturing devices described herein (e.g., manufacturing devices 100, 200), but also include components that enable movement of a mask carrier 330 of the manufacturing device 300 where the light source is contained within the mask carrier. For example, the manufacturing device 300 can include a vessel 303, build arm 306, print bed 305, print material 320, base 304, mask carrier 330, mask(s) 301, light source 302, user interface 350, and/or controller 360. The manufacturing device 300 can also optionally include a support structure 310 and/or an image adjustment mechanism 308.

Mask carrier 330 can store and/or support one or more mask(s) 301. In some embodiments, the mask carrier 330 can be configured to transition between different masks 301, e.g., by advancing and/or retracting a sheet including a set of masks 301. For example, the mask carrier 330 can include a reel that can be manually and/or electrically rotated to advance and/or retract a sheet of masks 301 attached to the reel/hub/core. The mask(s) 301 can include a substrate with light transmissive and light non-transmissive portions, such that the mask(s) 301 can be used to define different patterns of light used to cure a print material 320 (e.g., photopolymer).

The mask carrier 330 can support a light source 302 that is configured to emit light for curing the print material 320. The light source 302 can be supported by the mask carrier 330 to emit light toward the mask(s) 301, such that a portion of the light that travels through the light transmissive portions of the mask(s) 301 can be incident on the print material 320. In some embodiments, the light source 302 can be configured to emit UV light. In some embodiments, the light source 302 can be a LED light source that uses about 10 Watts and can be chosen to emit light at a wavelength of between about 355 nm and about 395 nm.

The mask carrier 330 can optionally include an image adjustment mechanism 308 that is configured to adjust images produced using the mask(s) 301 and light source(s) 302. More specifically, the light source(s) 302 can be configured to emit light toward a mask 301 that includes light transmissive and non-transmissive portions. These transmissive and non-transmissive portions of the mask 301 can define a pattern that is associated with one or more layer(s) of an object being printed. In some embodiments, additional mask(s) 301 can be exchanged for an initial mask 301 to define sections of layers of the object being printed. Based on the pattern or transmissive and non-transmissive portions of the mask 301, the light being directed at the mask 301 can produce an image beyond the mask 301. This image can be received by an image adjustment mechanism 308, which can include, for example, one or more lenses and one or more mechanical and/or electrical components for moving the lenses relative to the mask(s) 301 and light source(s) 302.

While the light source 302 is depicted as being supported by mask carrier 330, it can be appreciated that the light source 302 can be separate from the mask carrier 330 and supported on another portion of the manufacturing device 300 (e.g., a support structure 310) or be external to the manufacturing device 300. In such embodiments, positioning of the light source 302 relative to the mask(s) 301 can be important to ensure that light from the light source 302 is emitted through the mask(s) 301 and at the print material 320.

The manufacturing device 300 can include a set of motion component(s) 334 that are configured to move the mask carrier 330 and mask(s) 301. The motion component(s) 334 can include one or more tracks, motors, lines, reels, sliders, etc. The motion component(s) 334 can be configured to move the mask carrier 330 along a base 304 of the vessel 303, such that different areas of the print material 320 can be cured. Movement of the mask carrier 330, e.g., using the motion component(s) 334, can enable printing of objects with larger dimensions than that of the mask(s) 301 exposure surface area. In some embodiments, movement of the mask carrier 330 along the base 304 of the vessel 303 enables passive separation of cured print material 320 from the base 304, as further described below.

In some embodiments, motion component(s) 334 can move the mask carrier 330 along a single axis (e.g., a x- or y-axis along a plane that extends parallel to the print bed 305. In some embodiments, motion component(s) 334 can move the mask carrier 330 along multiple axes (e.g., along two or more axes extending along parallel plane to the print bed 305). In some embodiments, motion component(s) 334 can move mask carrier 330 in direction(s) parallel to the print bed 305 and/or direction(s) toward or away from the print bed 305. In use, motion component(s) 334 can move the mask carrier 330 to a first position to cure a first portion of the print material 320, and then move the mask carrier 330 to a second position to cure a second portion of the print material 320, and so on and so forth. This allows the mask carrier to cure lines, curves and patterns depending on its usage.

The base 304 can be formed of a transparent material or light transmissive material (e.g., a UV transmissive material). In some embodiments, the base 304 can be implemented as a flexible membrane that can have taut and/or slack portions that facilitate separation of cured print material 320 from the membrane surface, as further described below. In such embodiments, the base 304 can be designed to have a suitable and desirable bending stiffness. A flexible base can be, for example, made from a highly flexible polymer such as fluorinated ethylene propylene (FEP), polyethylene (PET), or polypropylene (PP), with a thickness of about 0.01 mm, 0.025 mm, about 0.05 mm, about 0.1 mm, about 0.127 mm, about 0.2 mm, up to 5 mm or all ranges and values in between. In some embodiments, a high flexibility base can be FEP, PP, PMMA or PET sheet material in transparent forms, for example. These materials have Young's modulus values ranging from 0.344 GPa for FEP to 4.14 GPa for PET with PP and PMMA falling between those values. The release mechanism operates by utilising the flexible material within its elastic region with reference to its material characteristics. Materials with chemical compatibility and young's modulus values between 0.3 GPa and 4.2 GPa shall be considered suitable materials.

Different methods can be used to form the vessel 303 and/or base 304. For example, the vessel 303 may be fabricated by folding or by using vacuum forming methods. The vessel may be made from polypropylene or polyethylene materials for example. In some embodiments, a low flexibility floor can have a thickness of greater than about 0.1 mm. Further details of the base, and methods of forming such bases, are described in embodiments below.

The controller 360 can be configured to control the operation of one or more components of the manufacturing device 300. Similar to the controller 160, the controller 360 can control the light source(s) 302, the mask carrier 330, the image adjustment mechanism 308, the build arm 106, and/or the print bed 105 during printing and/or cleaning processes. Additionally or alternatively, the controller 360 can control the operation of motion component(s) 334, e.g., motor(s), tracks, etc. to move the mask carrier 330 in one or more directions. The controller 360 can be configured to receive user inputs (e.g., via user interface 350) and control the operation of the manufacturing device 300 (e.g., movement of the mask carrier 330 using motion component(s) 334) based on the inputs. The controller 360 can be any suitable type of processing device, including, for example, a general purpose processor, a Field Programmable Gate Array (FPGA), an Application Specific Integrated Circuit (ASIC), a Digital Signal Processor (DSP), a microprocessor, and/or the like. While a single mask carrier 330, a single vessel 303, a single print bed 305, etc. are depicted in FIG. 3, it can be appreciated that additional numbers of one or more of the mask carrier 330, vessel 303, and/or print bed 305 (as well as other components of the manufacturing device 300 depicted in FIG. 3) can be included in embodiments described herein.

In embodiments of an additive manufacturing device including a mask carrier that can move in one or more axes, the mask carrier can be used with a vessel floor having specific characteristics that enable release between a cured section of photopolymer (e.g., print material) and the vessel floor. For example, factors such as the surface area of the cured section, the surface area of the vessel floor, the volume of the photopolymer, etc., as further detailed below, can affect separation between the cured photopolymer and the vessel floor. In particular the surface area and the volume of the cured photopolymer can be selected to be sufficiently small to allow for passive separation of the vessel floor and the cured photopolymer, as further described below. Curing the photopolymer in relatively small sections, compared to the total available build area, at a time allows the build volume to be scaled up without inducing larger forces upon curing, caused by larger areas of low pressure. For example, at scales above 20×20 cm of cured photopolymer, the separation force between the cured photopolymer can damage the photopolymer and can also cause damage to components of the printing device (e.g., vessel floor). Additionally, the chemical reaction taking place when a photopolymer is cured is often exothermic and, at large scales, the heat generated can damage the cured polymer and or printer components. Curing surface areas of photopolymer known to be equal to or less than the upper orifice(s) (e.g., transmissive surfaces) of the mask carrier, in sections, can ensure that the forces and heat generation are known and quantifiable despite the scale and particular pattern of the layer being cured.

Figure 4:
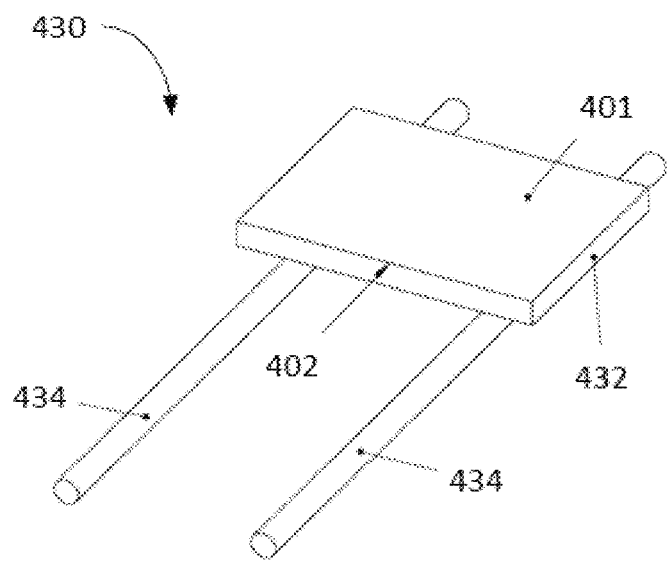
FIG. 4 is a schematic illustration of a mask carrier of an additive manufacturing device, according to embodiments disclosed herein.
Figures 5A, 5B:
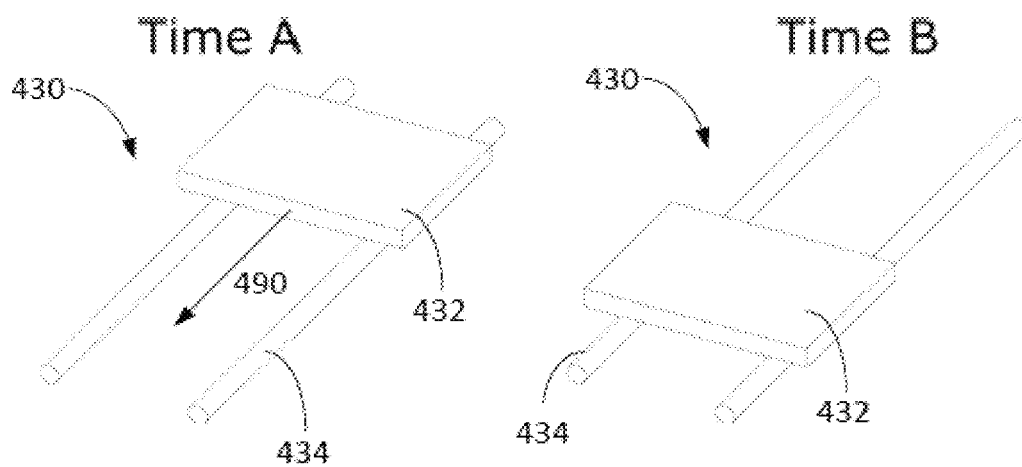
FIGS. 5A and 5B depict movement of the mask carrier of FIG. 4 between two positions, according to embodiments disclosed herein.

FIGS. 4, 5A, and 5B schematically depicts an example implementation of a mask carrier 430 capable of moving one or more masks 401 along one or more axes, e.g., to print a larger surface area or a larger object. The mask carrier 430 can include one or more elongate members 434 (e.g., beams, rods, tracks) that enable the mask carrier 430 to move along a linear axis. The mask(s) 401 can be placed or coupled to a top side 402 of a support structure 432 (e.g., housing) of the mask carrier 430. It should be noted that the mask carrier may move in an axis perpendicular to the line of motion depicted by 402.

FIGS. 5A and 5B depict the mask carrier 430 in two different configurations at different times. FIG. 5A depicts the mask carrier 430 at a Time A with the support structure 432 and mask 401 at a first location, and FIG. 5B depicts the mask carrier 430 at Time B with support structure 430 and mask 401 at a second location. During a printing process, at Time A, an area of a print material (e.g., a photopolymer) above the mask 401 at the first location can be cured, and after this area is cured, the mask carrier 430 can move the mask 401 in a direction 490 to the second location. Once the mask 401 is in position, at Time B, another area of the print material can be cured.

While the mask carrier 430 is implemented in FIGS. 4, 5A, and 5B as moving along a single axis, it can be appreciated that with additional tracks, motors, etc. (e.g., motion component(s)), mask carrier 430 can move in a plurality of axes, as described in greater detail below.

Figure 40:
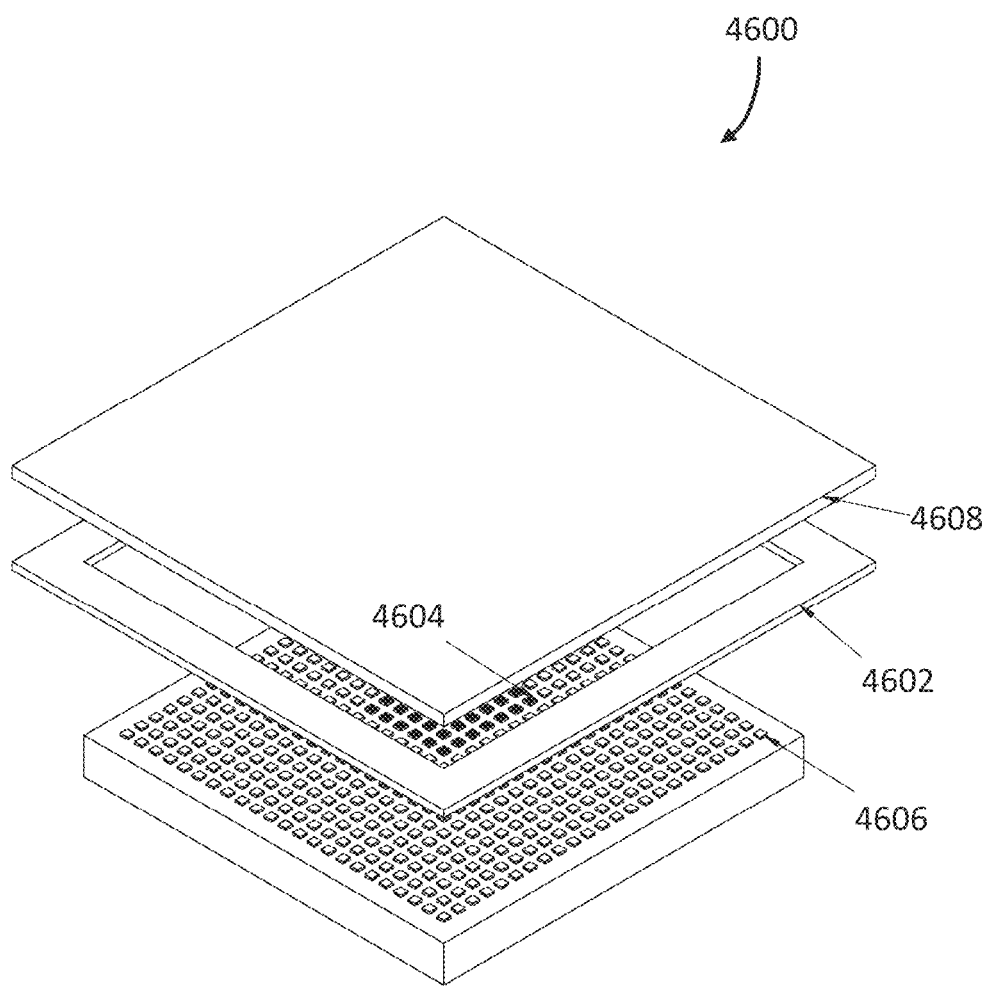
Figure 41A:
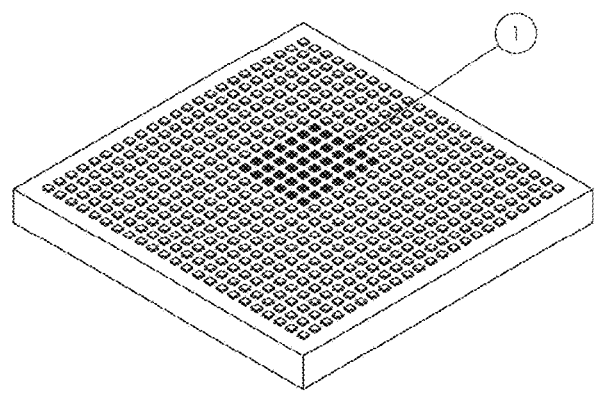
Figure 41B:
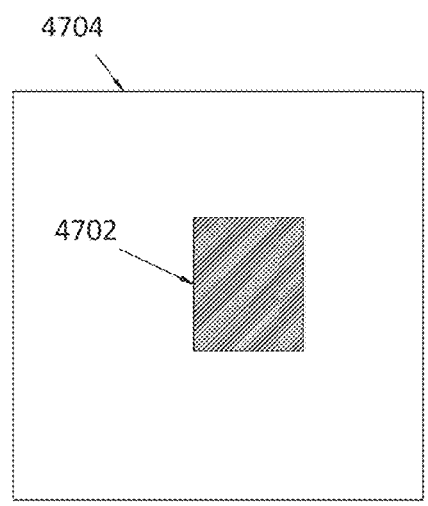

The Device(s) and or mask carrier may contain a configurable array of light emitting diodes, as depicted in FIG. 40A-41B. This source may be used in conjunction with physical masking and or without physical masking. The masking or directing of the light may be controlled digitally by selectively emitting light from pre-planned positions in an array of light emitting diodes. The wavelength of light emitted from the diode should be suitable for curing said photopolymer. The most useful wavelengths of light with regard to this purpose, are those between 355 nm and 395 nm, as this is the initiation wavelength of the photo-initiators in many photopolymers. The array may feature micro-lenses in order to control the light emission, diffusers to flatten the light intensity across the curing plane and or other optical apparatus placed between the light emitting diodes such as optical fibres or water. There is no additional masking of the light source necessary to cure a pattern as illuminated by the diodes. With reference to FIG. 41A-41B, the array comprises a plurality of diodes with a 'pitch' noted in both X and Y axes which refers to distance between the centres of the diodes. This pitch and the number of diodes in the array will determine the maximum X and Y resolution if the source is used without a mask. For example an array of 64*64 diodes, with equal pitch in both X and Y axes, that is 21.55 cm*21.55 cm in size (12 inch diagonally), has a pixel pitch of 3.3676 mm which equates to 7.54 dots per inch which is a common metric in the art. As each LED can be addressed individually an image or pattern can be displayed on the source for the purposes of curing the photopolymer even without additional masking, albeit at a lower resolution. This 64*64 array has 4,096 positions which can be illuminated prior to separation. When used without masking the resolution is significantly lower but it provides opportunity to further expand the feature set of the proposed devices. Furthermore in instances where no mask or a clear mask on a reel (one with no uv blocking pattern) is present the array may be such that it integrated into a mask carrier for kinetic operation in a plurality of axes and or integrated into the 3D printer for static operation. When integrated into the device for static operation the LED's form the pattern to be cured themselves without the need for physical masking, an LCD or any other pattern masking apparatus. By moving the LED array, via the mask carrier, or other means, an array of cured positions can be resolved on the print bed.

During a printing process, a print material (e.g., photopolymer) that has been cured shrinks post-curing by a measurable percentage. This shrinking of the cured print material can cause an area of low pressure to form between the cured print material and a portion of the vessel containing the cured print material (e.g., a base of a vessel). When this pressure is released, the cured print material is released from the vessel. Various release or separation mechanisms can be used to produce this release between the cured print material and the vessel.

Figure 6A:
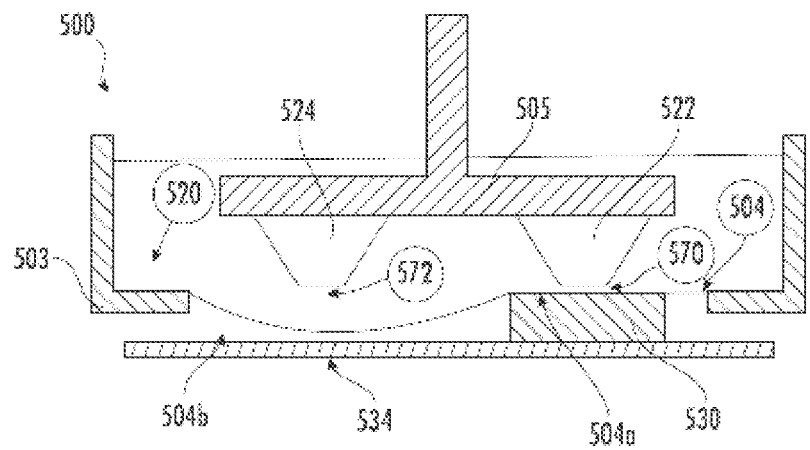
FIGS. 6A and 6B depict an additive manufacturing device with a movable mask carrier, according to embodiments disclosed herein.
Figure 6B:
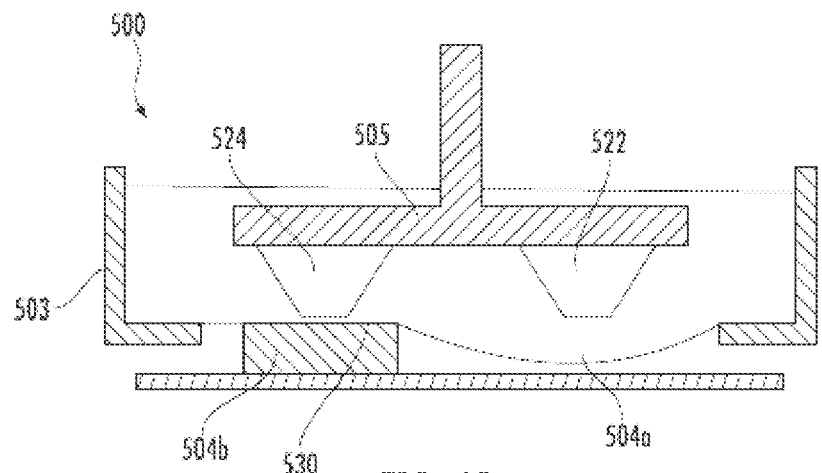

FIGS. 6A and 6B provide an example of a passive method of releasing a cured layer of print material from a vessel, e.g., using a movable mask carrier 530 and a vessel base 504 implemented as a flexible membrane. As depicted in FIGS. 6A and 6B, a manufacturing device 500 includes a movable mask carrier 530 that is disposed below the base 504 of a vessel 503. The manufacturing device 500 can include components that are structurally and/or functionally similar to other manufacturing devices described herein.

The mask carrier 530 is configured to move along a linear axis, e.g., similar to the mask carrier 430 depicted in FIGS. 4, 5A, and 5B. Movement of the mask carrier 530 can enable or facilitate passive release of a cured print material from a surface of the base 504. The mask carrier 530 can be configured to move along a track 534. One or more masks (not depicted) can be located or positioned between a light source (not depicted) and the vessel 503, e.g., along a top of the mask carrier 530.

The vessel 503 can contain a print material 520 (e.g., a photopolymer). The vessel 503 can include a base or floor 504 implemented as a flexible membrane. The floor 504 can include a portion 504a that is flat and taut above the mask carrier 530, and the floor 504 can include a portion 504b that is slack under the weight of print-material/photopolymer when the mask carrier is in the position of FIG. 6B. This allows the print material 520 to accumulate in that area and provide tension across the taut portion 504a above the mask carrier 530. The floor 504 can be formed of fluorinated ethylene propylene and/or polypropylene or any of the materials defined herein. For the materials defined herein it can been shown that when the surface area of the cured material is within the upper surface area of the mask carrier, the force generated by the cured print material shrinking is less than the opposing force generated by the mass of uncured print material acting on the floor 504 which will result in passive separation.

During a printing process, one or more objects 522, 524 can be printed using the manufacturing device 500. The objects 522, 524 can be printed on a print bed 505. When the mask carrier 530 is in a first configuration (FIG. 6A), light (e.g., from a light source within the mask carrier 530) can shine through a mask (e.g., disposed at or near an upper surface of the mask carrier 530), through the floor 504, and subsequently cure a section of the lowest layer 570 of the object 522. In this configuration, after curing, the distance between the lowest layer 570 of the object 522 and the floor 504 can be zero or zero layer heights, while an area of slack exists between a lowest layer 572 of the object 524 and the floor. This slack in a portion of the floor 504 allows a portion of the print material 504 to accumulate and provide tension in the portion of the floor 504 extending across the face of the mask carrier 530. As used herein, the term "slack" means a flexible component that is loose or not held taut. After curing the object 522, the mask carrier 530 can be placed in the second configuration (FIG. 6B), e.g., by sliding the mask carrier 530 along the track 534. While moving the mask carrier 530 between the first and second configurations, the light source can be powered off such that regions between the objects 522, 524 are not cured while the mask carrier 530 is moving. In the second configuration, the mask carrier 530 can be disposed below the object 524, and light can be used to cure a lowest layer of the object 522. In the second configuration, excess print material 504 also acts on the floor 504a below object 522, and from the weight of that material 504, the portion 504a of the floor 504 can passively separate from (e.g., peel away from) the lowest layer 570 of the cured object 522. As the mask carrier 530 continues to move between the two configurations shown in FIGS. 6A and 6B, additional layers of objects 522, 524 can be cured and passively separated from the floor 504, according to the release mechanism described herein.

While objects 522, 524 are identified as separate objects with reference to FIGS. 6A and 6B, it can be appreciated that objects 522, 524 can form portions of a larger object.

In some embodiments, the track 534 of the mask carrier 530 can extend beyond a printing area, e.g., to allow the mask carrier 530 to be moved away from the floor 504 and an entire cured area to peel and release from the floor 504. In some embodiments, the track 534 can be a non-linear track and/or extend in multiple directions.

Figure 7A:
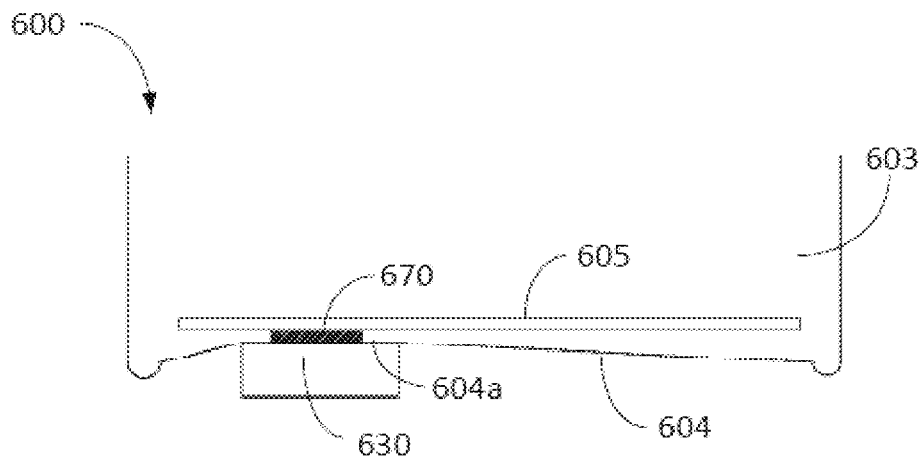
FIGS. 7A and 7B depict an additive manufacturing device with a movable mask carrier, according to embodiments disclosed herein.
Figure 7B:
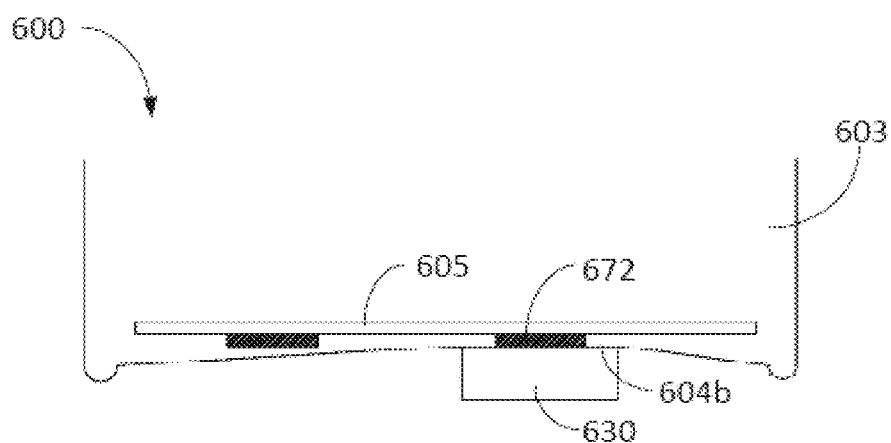

FIGS. 7A and 7B depict another example of a passive release of cured print material (e.g., photopolymer) from a base or floor 604 of a manufacturing device 600. The manufacturing device 600 can include components that are structurally and/or functionally similar to other manufacturing devices described herein. For example, the manufacturing device 600 can include a vessel 603 with a floor 604, a print bed 605, and a mask carrier 630. The floor 604 is depicted having lesser flexibility or greater stiffness than that seen FIG. 6A and FIG. 6B as well as less slack material along the vessel floor.

As depicted in FIGS. 7A and 7B, the mask carrier 630 is moveable between two locations or being two configurations. In a first configuration (FIG. 7A), the mask carrier 630 can be configured to cure a first portion 670 of an object (or first object), and in the second configuration (FIG. 7B), the mask carrier 630 can be configured to cure a second portion 672 of the object (or second object). The mask carrier 630 can include a light source (not depicted) that can emit light through a mask (not depicted) and the floor 604 and into the print material to cure each portion 670, 672 of the object.

More specifically, as the floor 604 is optically clear and UV transmissive, print material (e.g., photopolymer or resin) within the vessel 603 is exposed to light from the mask carrier 630. Stated differently, light from the mask carrier 630 can pass through the floor 604 to harden the print material that is located between the floor 604 and the print bed 605 (or a previously cured layer of print material), e.g., due to photo-initiators in its chemical composition. As described above, this cured print material can form a slice or layer of an object that is being printed.

Once the layer of print material has been hardened/cured, the cured print material can become attached to (e.g., suctioned onto) the floor 604 due to a shrinkage of the print material during curing, which can create an area of low pressure beneath a cured area and, to a lesser extent, van der Waals forces. Separation forces can be generated to separate the cured layer of print material from the floor 604. As depicted in FIGS. 7A and 7B, passive separation forces can be generated using the movable mask carrier 630. The passive separation forces that are generated can be dependent on a number of factors, including, for example, a volume of the print material, dimensions of the mask carrier 630, design of the vessel 604, positioning of the mask carrier 630 relative to the floor 604, size of cured section of print material, etc. These separation forces can enable the portions 670, 672 to separate from one or more portions 604a, 604b of the floor 604, as further described with reference to FIGS. 8A, 8B, 9, and 10.

Figure 8A:
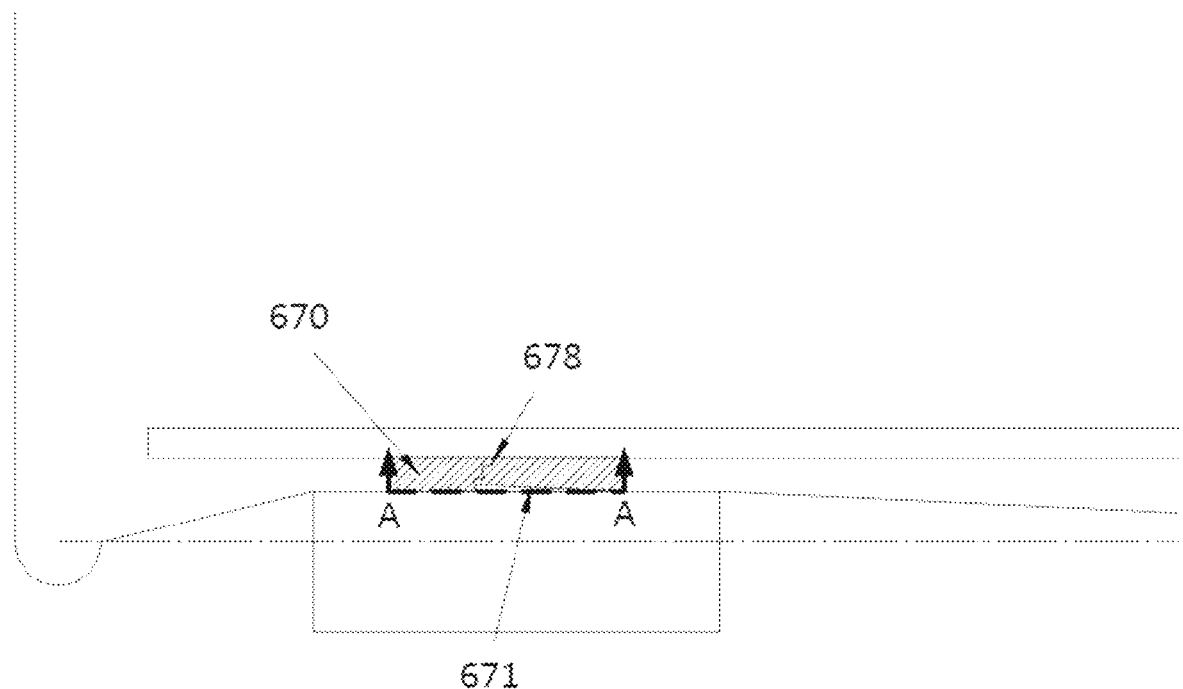
FIG. 8A depicts forces acting on an object during a printing process using an additive manufacturing device, according to embodiments disclosed herein.
Figure 8B:
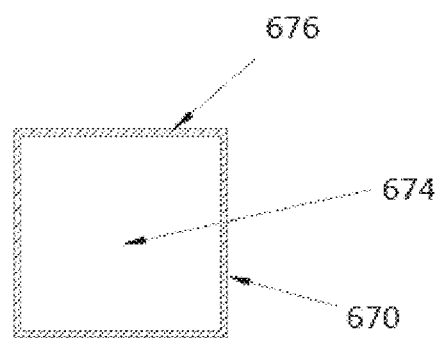
FIG. 8B depicts a cross-sectional view of a cured layer of the object, along cross-section A-A depicted in FIG. 8A, according to embodiments disclosed herein.

FIGS. 8A and 8B depict different views of a cured portion 670 of a print material (e.g., photopolymer). When each layer of the print material is cured, a threshold region 676 surrounding an area of relatively low pressure 674 results from shrinking of the print material during cross-linking or curing. In some embodiments, this shrinking of the print material can be below about 4% in volume. FIG. 8A depicts this shrinking through broken-out section detail 678. When the mask carrier 630 is moved from its position beneath the cured layer of print material, e.g., moved away from the position depicted in FIGS. 7A and 9 or beneath the area 604a of the floor 604, the surrounding print material (not depicted) can act to separate the cured layer of print material from the floor 604. Since the floor 604 is flexible, as the mask carrier 630 moves, the floor 604 enables displacement of a volume of the surrounding print material. The surrounding print material, now displaced, can act on the floor 604 in the area 604a, resulting in liquid print material ingress below the cured layer of the print material. Greater volumes of print material can be used to increase the forces that are generated and applied to the floor 604 by the surrounding print material. Accordingly, as an object is being built (e.g., layers of photopolymer are being cured), additional liquid print material or photopolymer can be added to the vessel 603 to maintain sufficient forces upon floor 604 for separating the cured layers of print material.

Additionally, the area 604a of the floor 604 under low pressure can flex downward as the mask carrier 630 is moved away. The flexing of the floor 604, within its elastic region, can result in more displacement of the volume of surrounding print material and an increase in the downward force acting on the floor 604 as well as tension on the floor 604.

As described above, the floor 604 can be implemented as a flexible membrane having lesser flexibility. In some embodiments, the floor can be formed by vacuum forming methods using materials such as, for example, polypropylene and polyethylene. The floor 604 can be configured to apply a downward force, e.g., via its internal tension. The mask carrier 630 can be positioned to elastically deflect the floor upward. This elastic deflection of the floor 604 produces potential energy within the floor 604 that acts downward. Increasing the height of the mask carrier 630 and therefore increasing the deflection of the floor 604 can increase the potential energy of the floor 604. With increasing height of the mask carrier 630 and an increasing angle of deflection a (see FIG. 9), the potential energy experienced by the floor 604 increases, further facilitating in separation or peeling from a cured layer of print material.

Figure 9:
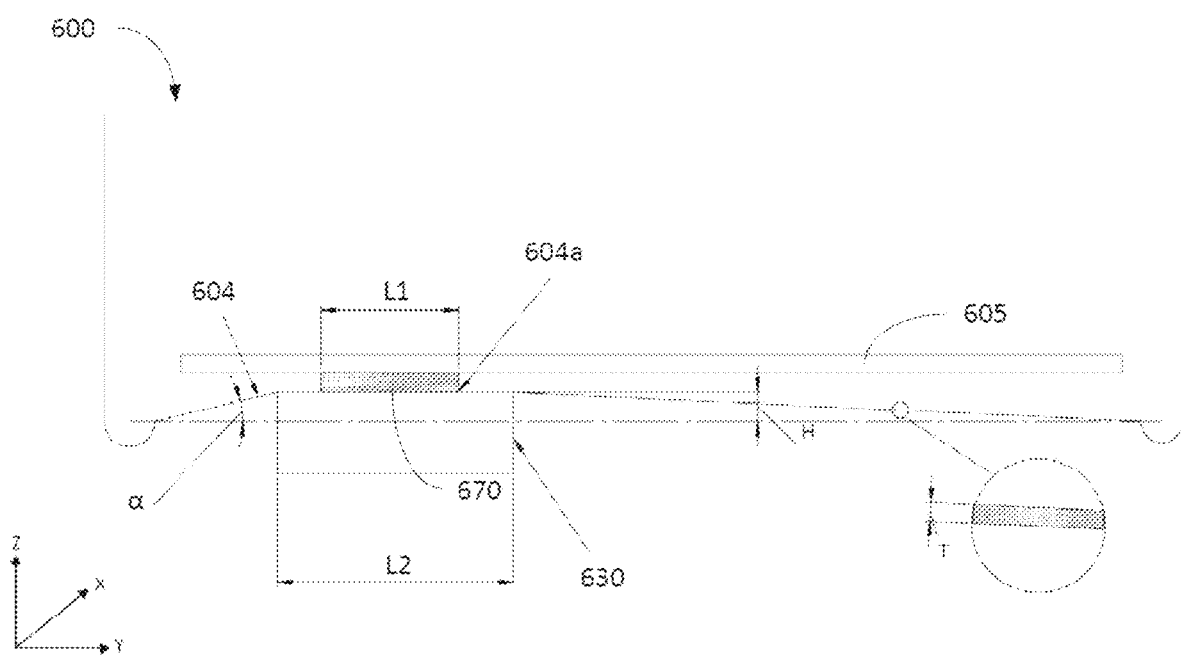
FIGS. 9, 10A, and 10B depict factors that affect separation between a cured layer of an object and a vessel floor of an additive manufacturing device, according to embodiments disclosed herein.

FIG. 9 depicts a number of factors that can impact forces that act upon the floor 604. Such factors can be tailored to produce sufficient forces (e.g., alone or in combination with other forces, such as the volume and weight of surrounding photopolymer) for separating a cured layer of print material from the floor 604. As depicted, the cured portion 670 has dimensions L1 (e.g., along one or more axes) that are less than the dimensions L2 of an upper face of the mask carrier 630. As the dimension L1 increases relative to L2, greater force may be required to separate a cured layer of the portion 670 from an area 604a of the floor 604. To increase the forces applied to the floor 604, a height H of the mask carrier relative to a bottom of the floor and the angle of deflection a can be increased such that the floor 604 holds greater potential energy. Additionally or alternatively, a thickness T of the floor 604 can be increased to increase the tension associated with displacing the floor 604.

Figure 10A:
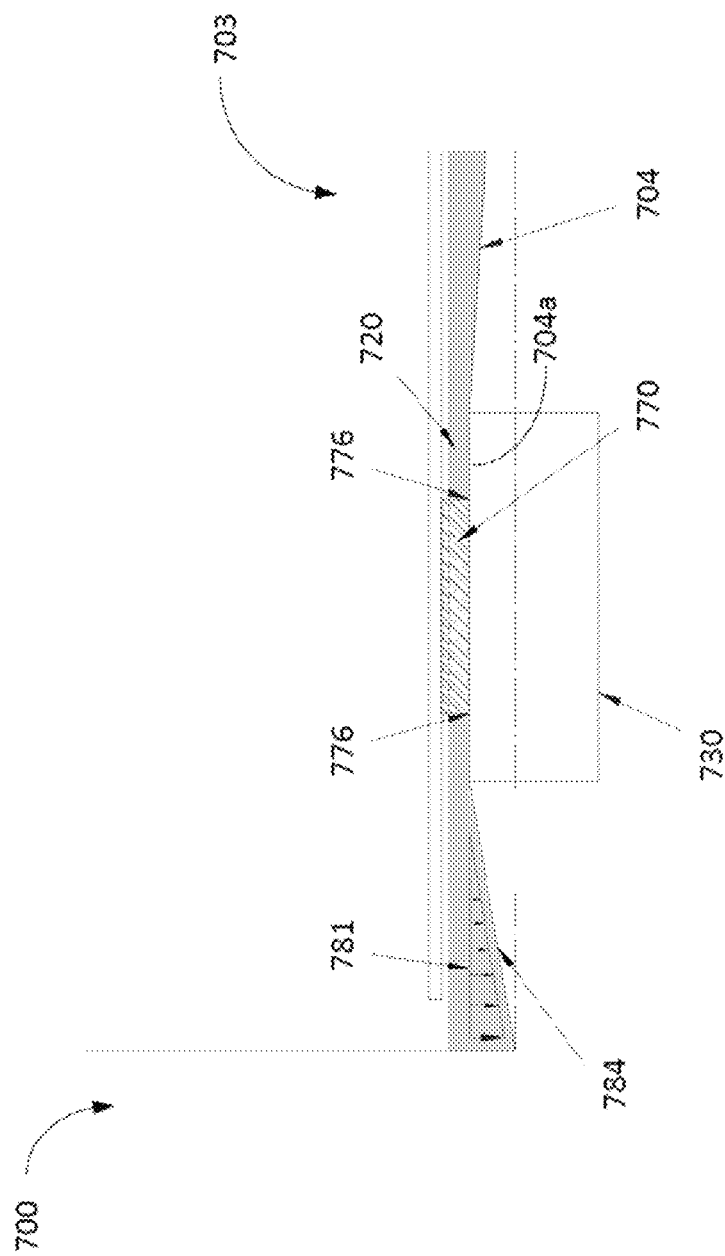
Figure 10B:
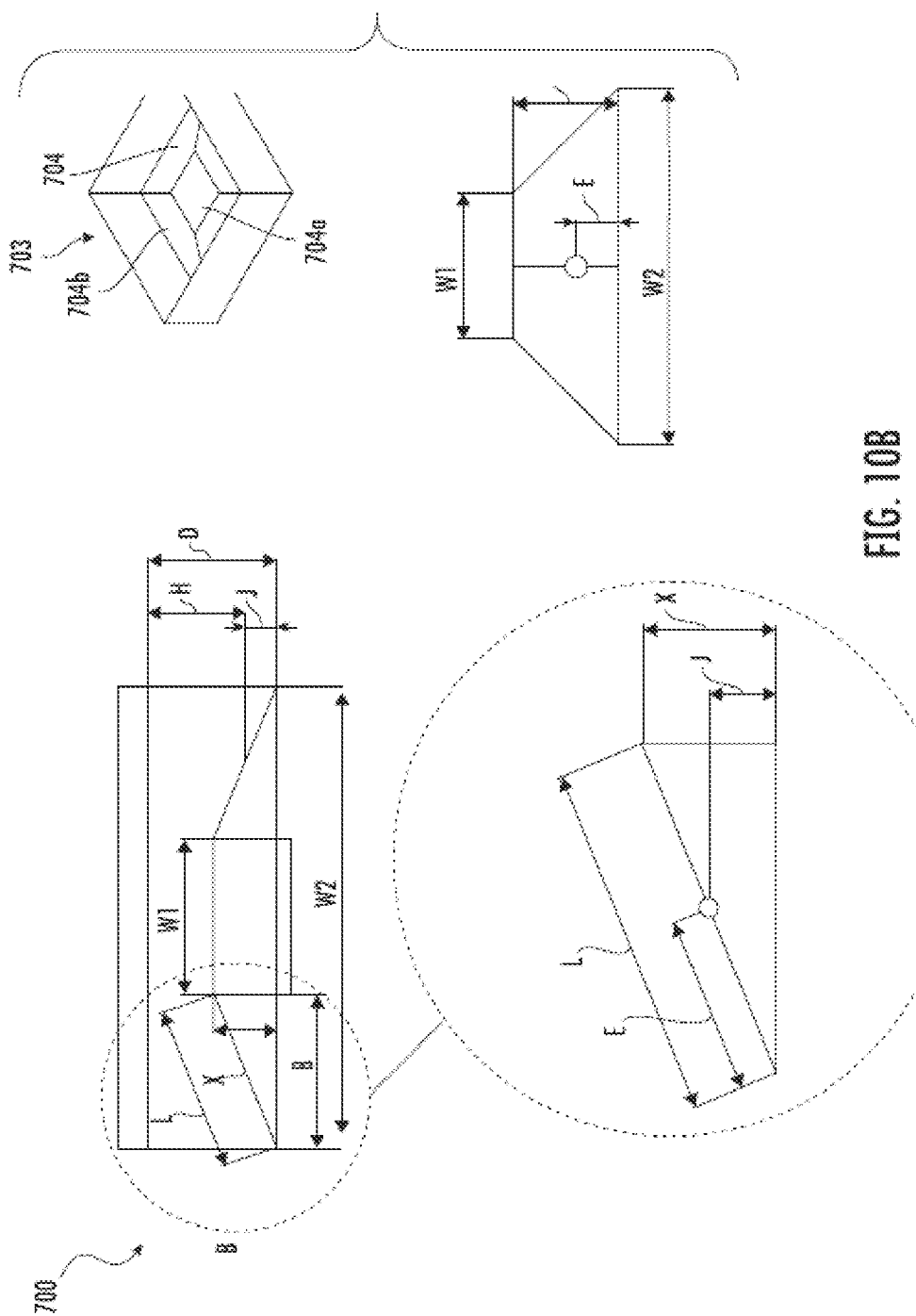

FIGS. 10A-10B are used to illustrate the pressures and forces 781 acting downward on a base or floor 704 of a vessel 703 containing a print material or photopolymer 720. Similar to the printing process depicted in FIGS. 7A-9, an object 770 is cured above a mask carrier 730 of an additive manufacturing device 700. The additive manufacturing device 700 can include components that are structurally and/or functionally similar to other manufacturing devices described herein.

As described above, when the photopolymer 720 is cured, the photopolymer can shrink and produce a threshold region 776 surrounding a region of relatively low pressure. This cured photopolymer is initially attached to an area 704a of the floor 704. When the cured photopolymer is separated from the floor 704, fluid ingress of surrounding photopolymer 720 can first occur along the threshold region 776. Stated differently, the separation between the cured photopolymer and the floor 704 can begin at an edge of the cured layer and work inwards, as the cured layer peeled away from the floor 704.

During printing, the mask carrier 730 can be placed in the position show in FIG. 10A and used to cure a layer of the object 770. With the mask carrier 730 in the position or configuration depicted in FIG. 10A, forces 781 of the surrounding photopolymer 720 can act downwards on inclined surfaces 784. The mask carrier 730 can then be moved aside (e.g., using a motion component 334), and ingress of the surrounding photopolymer 720 can occur. For ingress to occur, the pressure experienced at the threshold region 776 must be sufficiently great to overcome the force applied to the floor 704 in the low pressure region. When such pressure is sufficient, ingress of the surrounding photopolymer 720 enables passive peeling or separation of the floor 704 from the cured layer of the photopolymer.

FIG. 10B depicts the arrangement in FIG. 10A, with dimensions shown and certain geometries simplified for illustrative purposes. In particular, calculations of a downward acting pressure produced by surrounding photopolymer 720 are explained with reference to FIG. 10B.

As described above, separation between a cured layer of photopolymer 720 and the floor 704 can be achieved by producing sufficient separation forces. The separation forces produced can be dependent upon factors such as, for example, a volume of the photopolymer 720 as well as the material choice and design of the floor 704 of the vessel 703. For example, with a given material type and arrangement, as depicted in FIGS. 10A and 10B, the thicker the floor 704, the greater the potential energy generated when the floor 704 is deflected, e.g., by the mask carrier 730. The floor 704, similar to other bases or floors described herein, can be formed from a sufficiently flexible material such that the floor 704 is configured to extend parallel (e.g., flat) along a surface of the mask carrier 730 when the mask carrier is positioned as shown in FIG. 10A.

The floor 704 can be a relatively high flexibility floor or a low flexibility floor with reference to the aforementioned acceptable Young's modulus values. With a high flexibility floor, forces produced in response to deflection of the floor (e.g., potential energy, tension) may be negligible in comparison to forces generated by the volume of photopolymer 702. Accordingly, prior to separation, the pressure or force acting downward on the floor 704 at any point on a high flexibility floor (e.g., along a horizontal axis of the manufacturing device 700, such as a Y-axis), can be represented by the equation:

$$P = \rho \cdot g \cdot h$$

where P is the pressure (Pascals), $\rho$ is the density of the photopolymer 720, g is gravity, and h is a depth of a centre of mass of the surface which is being acted upon (e.g., the inclined surface extending from an edge of the floor 704 to a top of the mask carrier 730). For example, at a depth (h) of 2 mm, the pressure P produced by a photopolymer with a density (ρ) of 1050 kg/m³ is:

$$P = \left(1050 \frac{\text{kg}}{\text{m}^3}\right) \cdot \left(9.8 \frac{\text{m}}{\text{s}^2}\right) \cdot (0.002 \text{ m}) = 20.58 \text{ Pa}$$

The density 1050 kg/m³ is provided, as it lies between the density of saline (1202 kg/m³ at 25° C. with a concentration of NaCL in water of 357 mg/mL) and water and common photopolymers float on saline and sink in water.

With reference to FIG. 10B, assuming that the mask carrier 630 is beneath a centre point of the floor 704 (where a minimum peak force would be acting upon the threshold region), that a maximum allowable surface area of the cured photopolymer is equal to the area above the top surface of the mask carrier 630 (i.e., L1=L2, as depicted in FIG. 9), and that the floor 704 is two times the maximum allowable surface area, the force (Newtons) acting on the each inclined surface 704b and applied to separate the floor from the cured photopolymer is:

$$F = P \cdot A_f$$

where F is the force, P is the pressure, and $A_f$ is a surface area of each inclined surface 704b, the shape formed in the floor is an isosceles trapezoid.

$$A_f = L \cdot (W_1 + W_2)/2$$

where L is a length of the inclined surface, $W_1$ is a width of the cured section, and $W_2$ is a width of the vessel floor. L can be calculated based on:

$$L = \sqrt{X^2 + B^2}, \text{ and}$$

$$B = W_2/4,$$

assuming that the ratio of the surface area of the floor 704 to a surface area of the cured layer is 2:1.

The depth (h) can be calculated based on:

$$h = D \cdot J$$

where D is a height of the photopolymer (e.g., 5 mm), J is a height of the centre of mass from a bottom of the vessel 703 and can be determined based on:

$$J = \frac{X}{L} E$$

where E is a height of the centre of mass of the inclined surface 704b and can be determined by:

$$E = \frac{L \cdot (2W_1 + W_2)}{3 \cdot (W_1 + W_2)}$$

And therefore:

$$h = D - \frac{X \cdot (2W_1 + W_2)}{(W_1 + W_2)}$$

From these equations, the force (F) can be represented as:

$$F = \rho \cdot g \cdot \left[D - \frac{X \cdot (2W_1 + W_2)}{(W_1 + W_2)}\right] \cdot \left[L \cdot \frac{W_1 + W_2}{2}\right]$$

In an example embodiment:

$$B = \frac{W_2}{4} = \frac{30 \text{ mm}}{4} = 7.5 \text{ mm} = 0.007 \text{ m}$$

$$F = \left(1050 \frac{\text{kg}}{\text{m}^3}\right) \cdot \left(9.8 \frac{\text{m}}{\text{s}^2}\right) \cdot \left(0.005 \text{ m} - \frac{0.002 \text{ m} \cdot (2 \cdot 0.01 \text{ m} + 0.03 \text{ m})}{(0.01 \text{ m} + 0.03 \text{ m})}\right) \cdot \left(0.00726 \cdot \frac{0.01 \text{ m} + 0.03 \text{ m}}{2}\right) = 0.096 \text{ N}$$

Based on the above relationships, with greater length or elongation of the floor 704, the separation force (F) increases. The surface area of a cured section of photopolymer also impacts the force experienced by the floor 704 and thus the separation force (F) as a result of such surface area determining one side of the isosceles trapezoid 704b (i.e., inclined surface) created in the floor 704. Therefore, the surface area of the cured section of photopolymer is limited by a surface area of the floor 704. Stated differently, the surface area of the cured section must be relatively small compared to the surface area of the floor 704, assuming that the container is filled with a certain volume of photopolymer. In some embodiments, a ratio of the surface area of the floor 704 to the surface area of the cured section can be selected to be at least about 2:1. A ratio of 2:1 ensures that the mask carrier 730 can move at least one mask width in a horizontal direction (e.g., along a X or Y axis) to allow for separation between the cured section and the floor 704. In such embodiments, the depth (h) can be greater than about 0.5 mm and the thickness of each cured layer can be below about 0.3 mm. While a ratio of 2:1 can be sufficient for separation, a ratio of about 2.5:1 can provide better separation in some instances, e.g., when the mask carrier 730 houses the masking apparatus (e.g., mask(s)) and therefore may have a width and depth greater than that of the maximum cure area (e.g., due to a border or other feature limiting the size of the maximum cure area along a top surface of the mask carrier 730). In other words, for some mask carrier implementations it may be desired that the carrier is wider than the maximum cure width. As such, in many applications, a minimum ratio of about 2.5:1 is selected, assuming sufficient volume of photopolymer being present to produce the necessary separation forces. The height of each cured layer can also impact the required separation force, with thicker layers requiring higher separation forces and therefore certain parameters or factors to be adjusted. For example, with a thinner layer, e.g., about 0.02 mm to about 0.3 mm, a depth (h) of about 0.5 mm or above can separate the layer from the floor 704, assuming sufficient volume of photopolymer being present to produce the necessary separation forces.

With a movable mask carrier 730, the maximum surface area cured while the mask carrier 730 is at each location can be selected to be sufficiently small (e.g., 10×10 mm²) such that ingress or separation may occur, while the overall maximum surface area of an object (e.g., a surface area of the floor 704) can be greater, e.g., when the maximum surface area at each location is combined.

When the mask carrier 730 is centrally positioned along the floor 704, the threshold region of the cured photopolymer experiences a minimum peak force. After curing, as the mask carriers distance from the centre increases, a greater volume of photopolymer 720 acts upon one side of the threshold. Separation therefore can initiate along that side of the threshold more readily as a result of the greater force being applied to it. Accordingly, if sufficient separation forces exist at a central position of the floor 704, then sufficient separation forces would exist at each other location along the floor 704.

With reference to FIG. 9-FIG. 10B the desired thickness 'T' of the vessel base is defined with the following equation for materials (as disclosed herein) within their elastic range:

$$F = \sigma_y \cdot A_s$$
$$A_s = W_1 \cdot T$$
$$\sigma_y \cdot W_1 \cdot T = \rho \cdot g \cdot h \cdot A_f$$
$$T = \frac{\rho \cdot g \cdot h \cdot A_f}{\sigma_y \cdot W_1}$$

Where $\sigma_y$ is yield stress (Pa)

Therefore the separation force that may be generated, as a result of the mass of photopolymer residing in the vessel, is quantifiable. With reference to previous equation, the maximum permissible volume of photopolymer, for a given thickness, may be determined.

FIGS. 11A-12B depict an example experimental setup for demonstrating a 2:1 release ratio with an additive manufacturing device or 3D printer. In the experiment, transparent resin 820 (e.g., print material) with characteristics including high shrinkage of 3.3% and density at 25° C.: 1.1 g/cm3 was used to cure a layer of an object. The surface area of the floor 804 to the surface area of the cured section was 2:1. Specifically, the cured layer had dimensions of 25×25 mm (e.g., corresponding to a surface area of a print bed 805), and the vessel or container 803 had a floor 804 with dimensions of 50×50 mm. The thickness of the cured layer was 0.3 mm, and the thickness of the floor 804 was 0.127 mm.

Figure 11A:
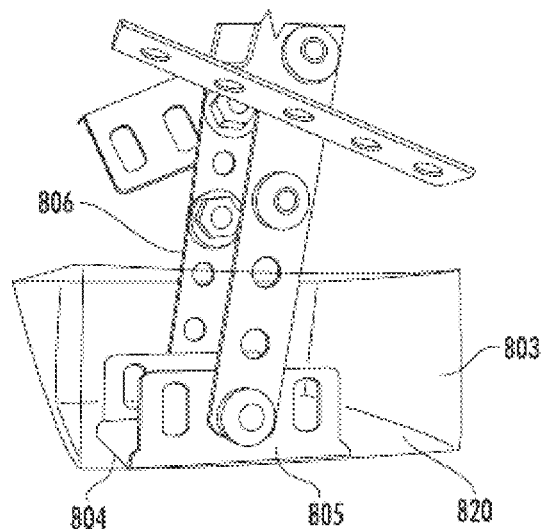
FIGS. 11A, 11B, 12A, and 12B depict an example of separating cured photopolymer from a vessel floor of an additive manufacturing device, according to embodiments.
Figure 11B:
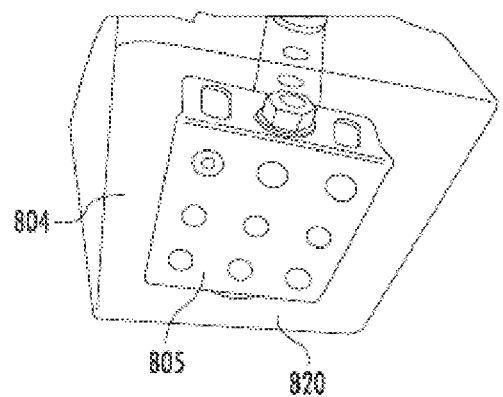

For example, a volume of photopolymer enough to complete curing of the pattern was placed in the container, e.g., a volume of 3 mL of photopolymer. Curing was completed in 5 ms using a 395 nm, 10 watt LED, and the mask carrier was slowly moved away from the cured section to not induce any further forces on the container floor 804. With the 3 mL of photopolymer, release failed to occur, and it was possible to remove the container 803 from the 3D printer without release occurring, e.g., as depicted in FIG. 11B.

Figure 12A:
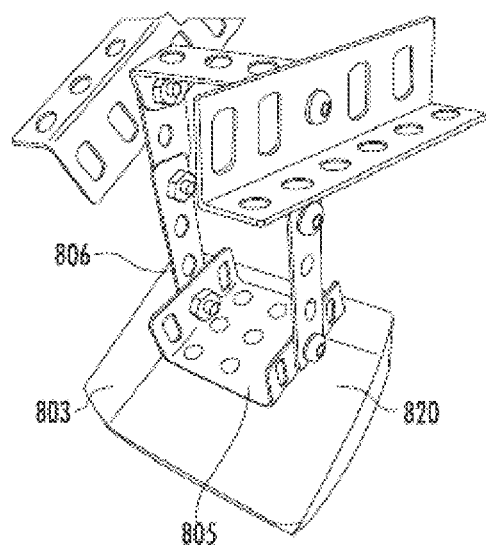
Figure 12B:
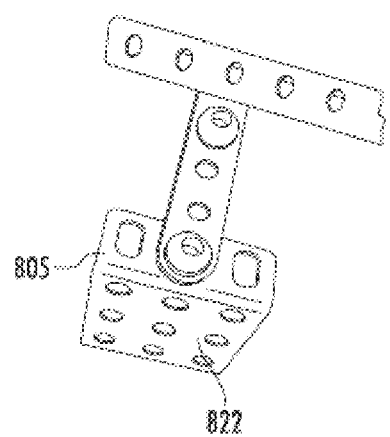

Photopolymer was then added to the container in 1 mL increments. Release occurred at an additional volume of 10 mL, totaling 13 mL. FIGS. 12A and 12B depict this release. A cure cycle was then repeated with this volume in the container 803, and release occurred within 10 seconds, despite the print bed 805 exhuming one layer's volume previously. Accordingly, with 3D printers using mask carriers and vessels or containers as described herein, and with a ratio of at least 2:1, release can occur for a given section of a layer of photopolymer with volumes above 13 mL, within 10 seconds. Referencing the equations above, the force of this experiment can be calculated as shown below:

$$B = \frac{W_2}{4} = \frac{50 \text{ mm}}{4} = 12.5 \text{ mm} = 0.0125 \text{ m}$$

-continued
$$L = \sqrt{X^2 + B^2} = \sqrt{1^2 + 12.5^2} = 12.54 \text{ mm} = 0.01254 \text{ m}$$

$$D = \frac{13000}{50 \times 50} = 5.2$$

mm because 13 mL is 13000 mm³ and the area of the floor is 50×50 mm $$F = \rho \times g \times \left[ D - \frac{X \times L \times (2W_1 + W_2)}{3L \times (W_1 + W_2)} \right] \times \left[ L \times \frac{W_1 + W_2}{2} \right] =$$

$$1100 \times 9.8 \times \left[ 0.0052 - \frac{0.001 \times 0.01254 \times (2(0.025) + 0.05)}{3 \times 0.01254 \times (0025 + 0.05)} \right] \times$$

$$\left[ 0.01254 \times \frac{0.025 + 0.05}{2} \right] = 0.0241 \text{ N}$$

As shown above, a depth of 1 mm of the photopolymer in the container 803, when flat, can be provided by the equation:

$$D = \frac{\text{(volume of photopolymer in m}^3\text{)}}{(x \text{ dimension of floor}) \times (y \text{ dimension of floor})}$$

In this example, the ratio of the width of the photopolymer to a depth of the photopolymer in the container is 50:1. When this ratio is maintained for the specifications above, separation can occur. For example, for a 10:1 ratio of container floor to cure area, with a cure area of 10×10 mm, separation can occur when the volume of photopolymer has a depth of 2 mm with a 100:2 ratio of depth to width of photopolymer or, stated differently, when there is a volume of 100×100×2 mm of photopolymer. Accordingly, with a given cure area, the dimensions of the container and the required volume of photopolymer can be known, e.g., based on the equations above and empirical evidence obtained from prior experimental testing. In some embodiments, to allow for a margin of error in different photopolymer chemistries, values of 23 mL of photopolymer, 20 seconds of separation time, a ratio of 25:1 for width to depth of photopolymer can be used. In some embodiments, where the surface area of the container floor is not square (e.g., with two edges being longer than the other two), then the specifications of the printing can be selected to comply with the longer of the two edges.

Figure 13A:
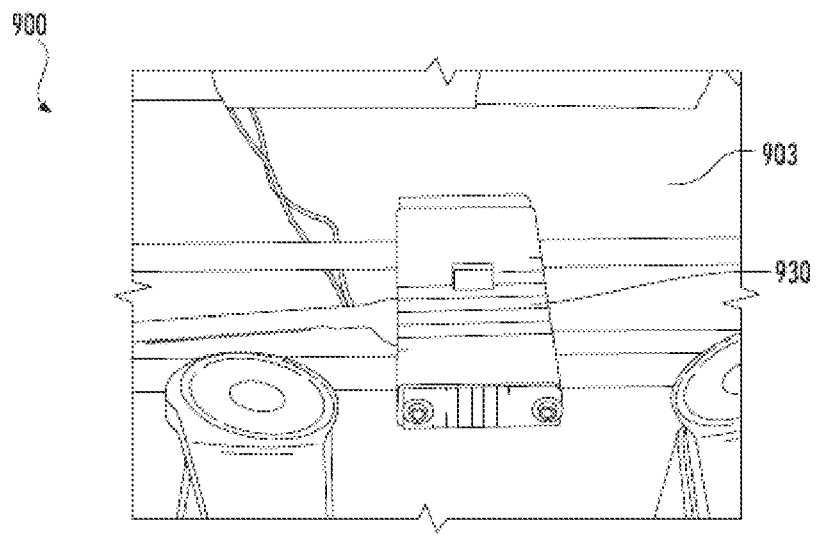
FIGS. 13A and 13B depict portions of an additive manufacturing device, including a vessel and a mask carrier, according to embodiments.
Figure 13B:
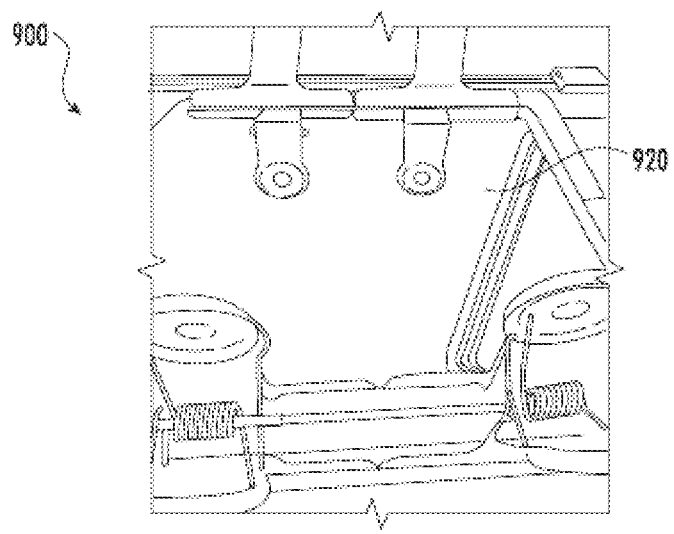

FIGS. 13A and 13B depicts another example experimental setup of an additive manufacturing device 900, including a vessel or container 903 containing a photopolymer 920 that is installed above a mask carrier 930. The additive manufacturing device 900 can include components that are structurally and/or functionally similar to those to other additive manufacturing devices described herein. A volume of 135,000 mm³ of photopolymer, e.g., 150×150×6 mm of photopolymer, can be placed in the container 903 with dimensions of 150×150×25 mm. The mask carrier 930 can have a maximum curable area of 25×25 mm (i.e., lateral dimensions of 25 mm). Accordingly, a ratio of the area of the container floor to the cure area is 6:1, which exceeds the 2:1 ratio described above. The mask carrier can be placed at a centre of the photopolymer container, such that a minimum peak force is experienced at any point along a threshold that forms around a cured section of the photopolymer 920.

In the experiment, a volume of photopolymer of 62.5 mm³, or 25×25×0.1 mm, was cured on a bed of a build plate. An area of low pressure can form between the container floor 904 and the cured section of photopolymer. This area of low pressure can result in an upward force being applied to the container floor within the area. With the provided dimensions and volume of photopolymer, the cured section can separate from the floor 904 when the mask carrier 930 moves away from the cured section. The mask carrier can then move to cure a second section within the layer and the curing cycle can be repeated, and further separation of that second section can occur. In this instance, the pressure and force exerted upon the first section that is cured, as described using the above equations, can be provided by:

$$B = \frac{(W_2 - W_1)}{2} = \frac{(150 - 25)}{2} = 62.5 \text{ mm} = 0.0625 \text{ m}$$

$$L = \sqrt{X^2 + B^2} = \sqrt{2^2 + 62.5^2} = 62.532 \text{ mm} = 0.06253 \text{ m}$$

$$D = 6 \text{ mm} = 0.006 \text{ m}$$

$$F = \rho \times g \times \left[ D - \frac{X \times L \times (2W_1 + W_2)}{3L \times (W_1 + W_2)} \right] \times \left[ L \times \frac{W_1 + W_2}{2} \right] =$$

$$1050 \times 9.8 \times \left[ 0.006 - \frac{0.002 \times 0.06253 \times (2(0.025) + 0.15)}{3 \times 0.06253 \times (0.025 + 0.15)} \right] \times$$

$$\left[ 0.06253 \times \frac{0.025 + 0.15}{2} \right] = 0.0294 \text{ N}$$

Figure 14A:
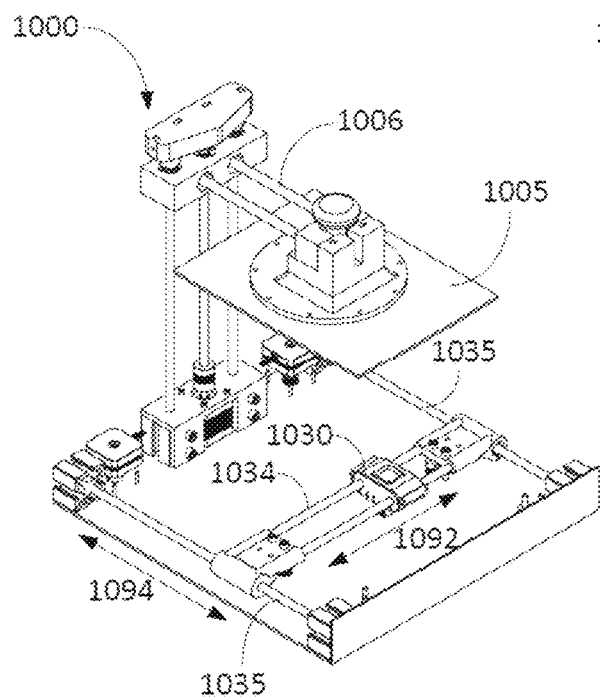
FIGS. 14A and 14B depict an additive manufacturing device including a movable mask carrier, according to embodiments.
Figure 14B:
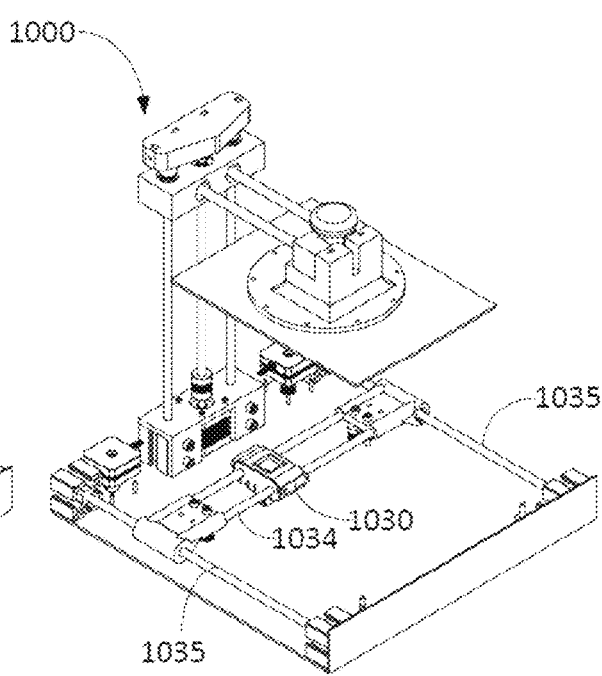

FIGS. 14A and 14B depict an example embodiment of an additive manufacturing device 1000 with a movable mask carrier 1030. Additive manufacturing device 1000 can have components that are structurally and/or functionally similar to other additive manufacturing devices described herein. For example, additive manufacturing device 1000 can include a print bed 1005, a build arm 1006, a mask carrier 1030, and one or more motion components (e.g., tracks) 1034, 1035.

FIG. 14A depicts the mask carrier 1030 at a first time (e.g., Time A) at a first position, and FIG. 14B depicts the mask carrier 1030 at a second time (e.g., Time B) at a second position. When the mask carrier 1030 moves from one position to the next, the photopolymer volume within a vessel (not depicted) disposed above the mask carrier 1030 can act downward upon the vessel floor to separate a cured section of photopolymer from the vessel floor. Motion components 1034, 1035 can facilitate movement of the mask carrier 1030 from one position to the next. For example, the mask carrier 1030 can move via motion components 1034 implemented as tracks and/or guide rails along a first axis or direction 1092, and the mask carrier 1030 can move via motion components 1035 implemented as tracks and/or guide rails along a second axis or direction 1094.

Figure 15:
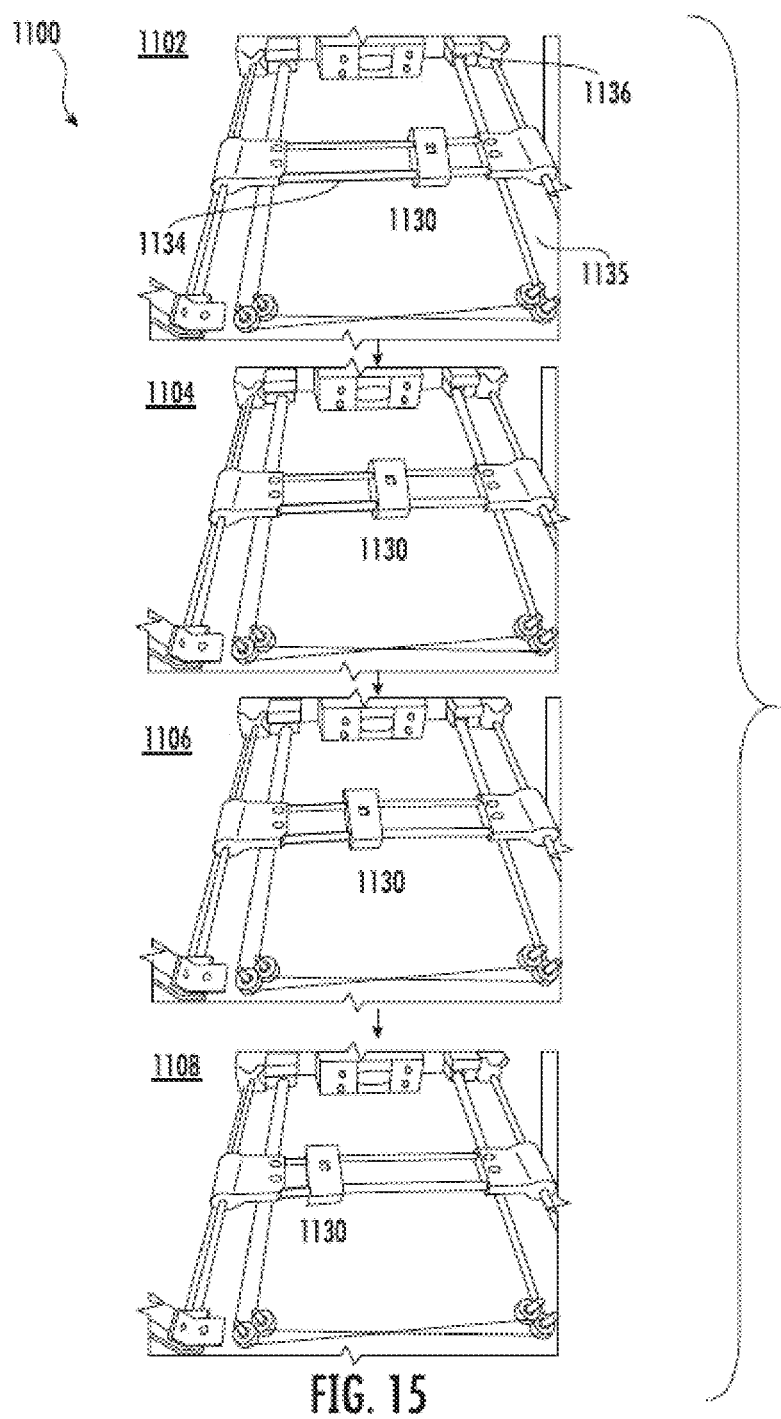
FIG. 15 depicts movement of a mask carrier of an additive manufacturing device, according to embodiments.

FIG. 15 depicts a flow 1102-1108 of movement of a mask carrier 1130 of an additive manufacturing device 1100, according to embodiments described herein. Additive manufacturing device 1100 can have components that are structurally and/or functionally similar to other additive manufacturing devices described herein (e.g., manufacturing device 1000). As depicted, mask carrier 1130 can move along multiple axes, e.g., via tracks 1134, 1135. The mask carrier 1130 can be driven along tracks 1134, 1135 via one or more motors 1136 that are contained within mask carrier 1130 and/or operatively coupled to one or more moving tracks.

Figure 16:
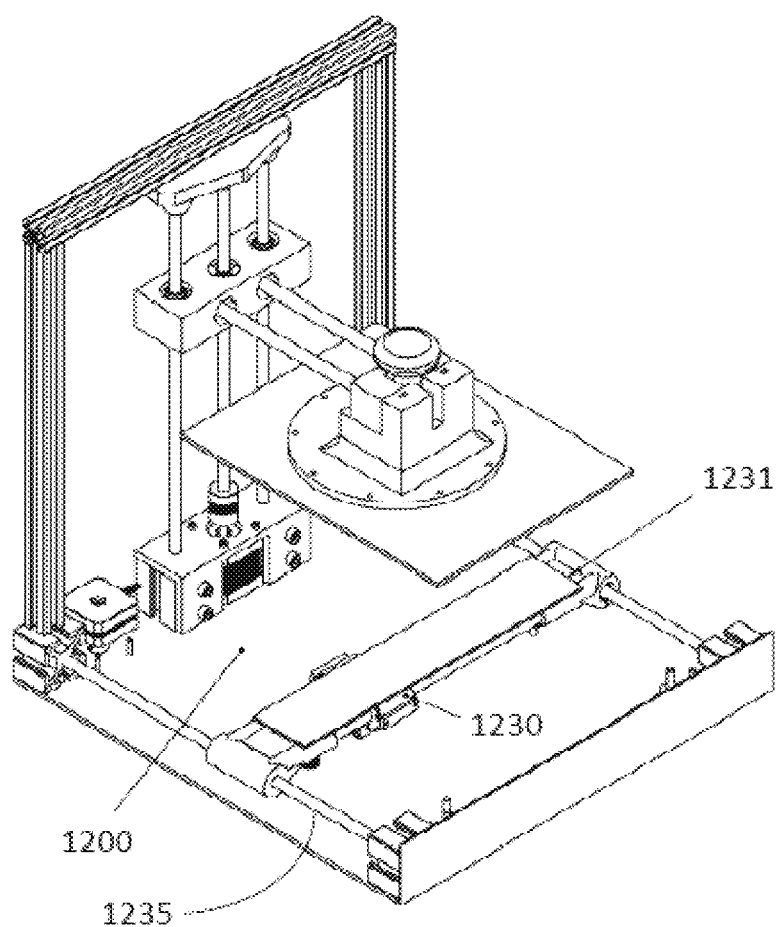
FIG. 16 depicts an additive manufacturing device including a movable mask carrier and a support structure, according to embodiments.

FIG. 16 depicts an example additive manufacturing device 1200, with a movable mask carrier 1230. Additive manufacturing device 1200 can have components that are structurally and/or functionally similar to other additive manufacturing devices described herein. Additive manufacturing device 1200 can include a transparent cross-member or guard 1231, e.g., for use with vessels or containers including high flexibility floors. The transparent cross-member 1231 can be UV transmissive. Transparent cross-member 1231 can be used to provide additional support during curing of a portion of an object. For example, transparent cross-member 1231 can divide the photopolymer volume into two main volumes as well as protect the mask carrier from the full downward force of the photopolymer volume. Transparent cross-member 1231 can be moved along one or more directions (e.g., along tracks 1235) with mask carrier 1230 and/or remain stationary as mask carrier moves along one or more directions. When the transparent cross-member 1231 is used, the value of W1 as depicted in FIG. 10B can be the width of the cross-member 1231, and the number of trapezoids 704a under pressure from the photopolymer volume can be 2.

In some embodiments, forces in addition to those applied by a liquid volume of photopolymer can be applied to separate a cured section of photopolymer from a vessel or container floor. For example, additional factors can affect the tautness of the floor, such as low pressure applied to the floor and/or internal tensions within the floor. As described above, e.g., with reference to floor 604, with a flexible container floors, elastic deflection of the floor can produce potential energy that can facilitate in separating cured photopolymer from the floor.

Figure 17A:
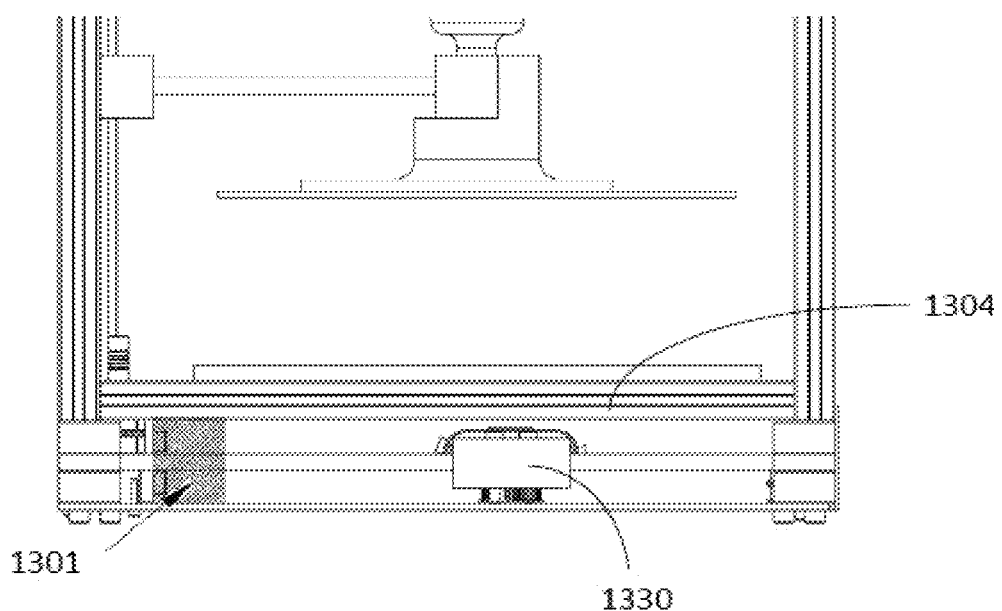
FIG. 17A-17G depicts an additive manufacturing device including components for forming vacuum forces, according to embodiments.
Figure 17B:
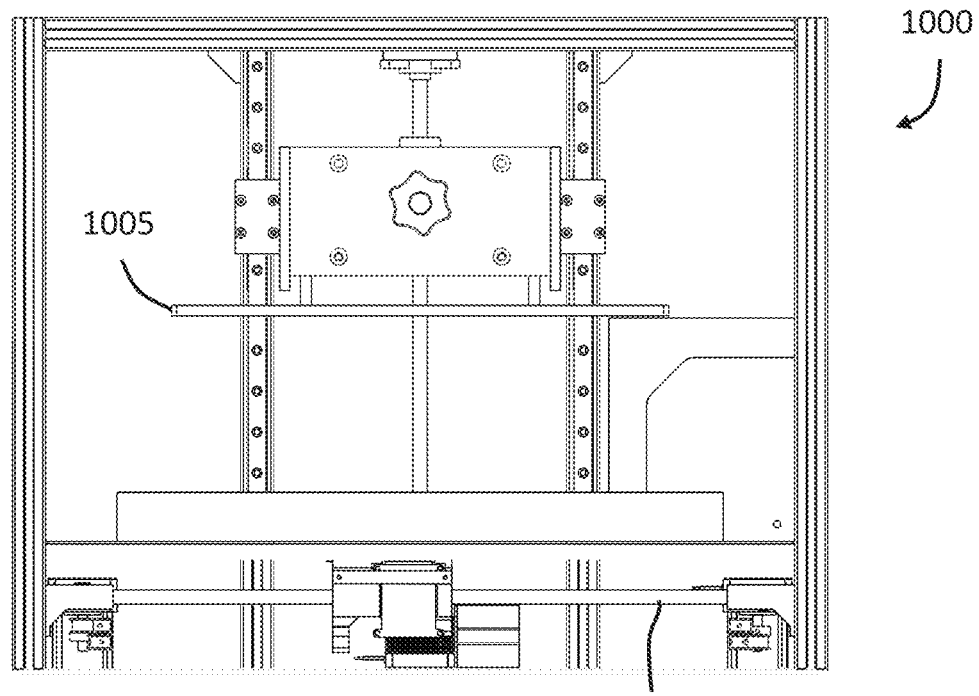
Figure 17C:
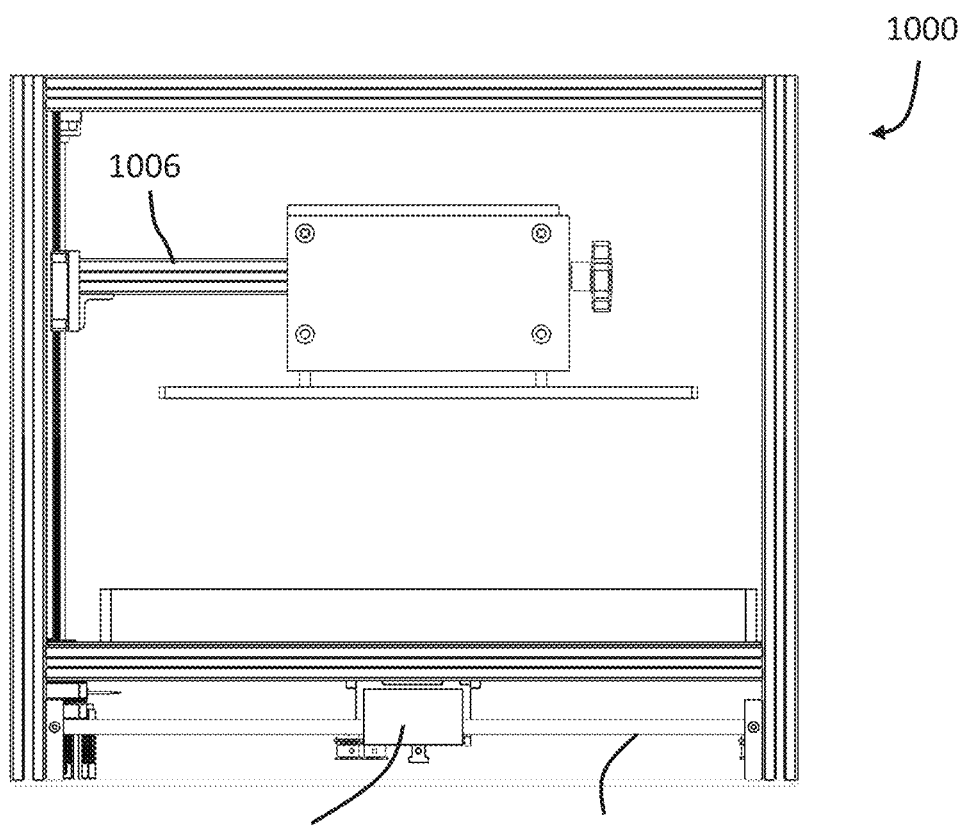
Figure 17D:
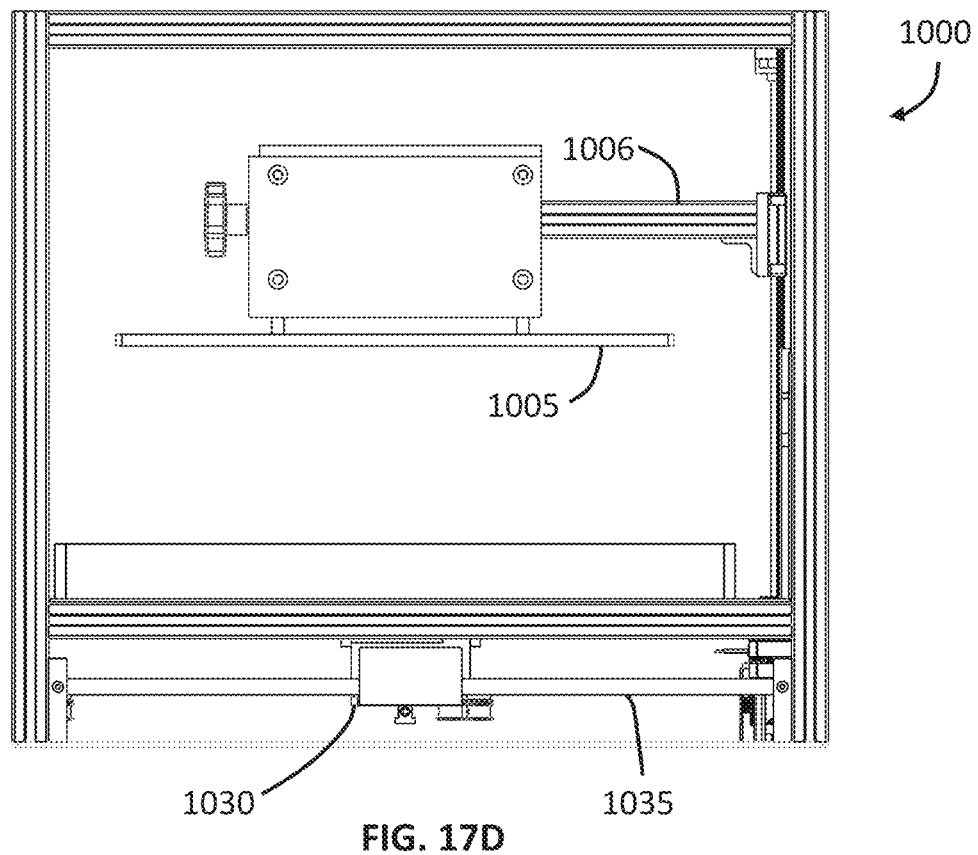
Figure 17E:
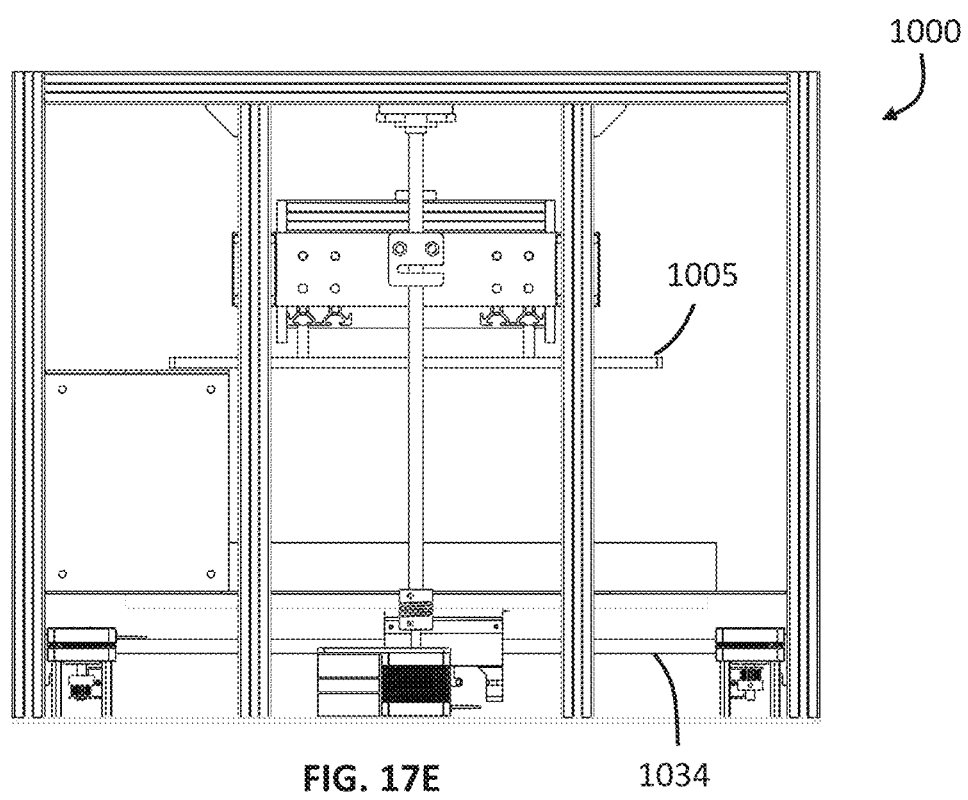
Figure 17F:
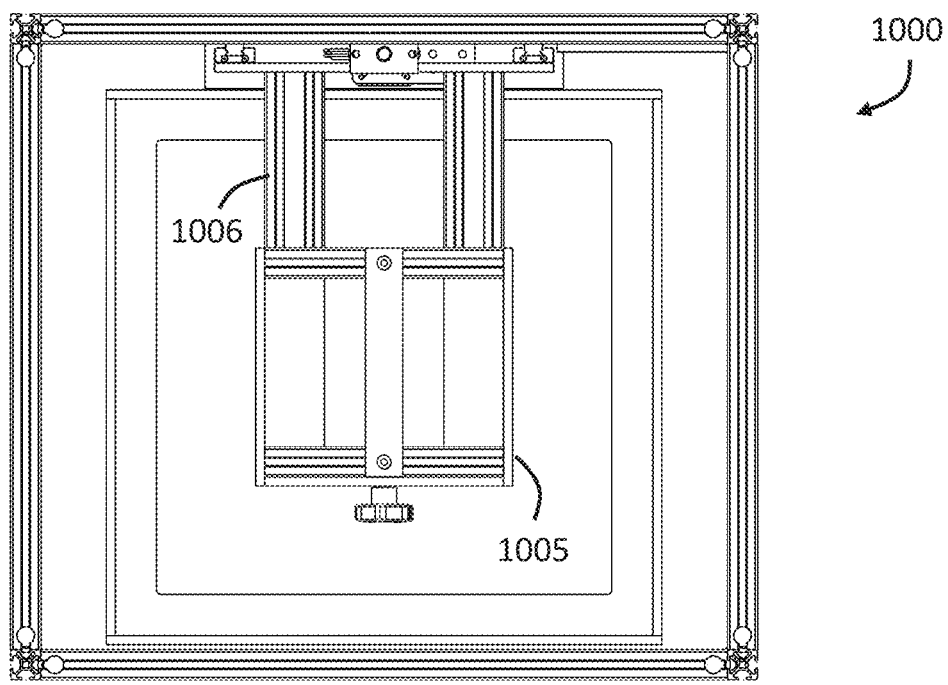
Figure 17G:
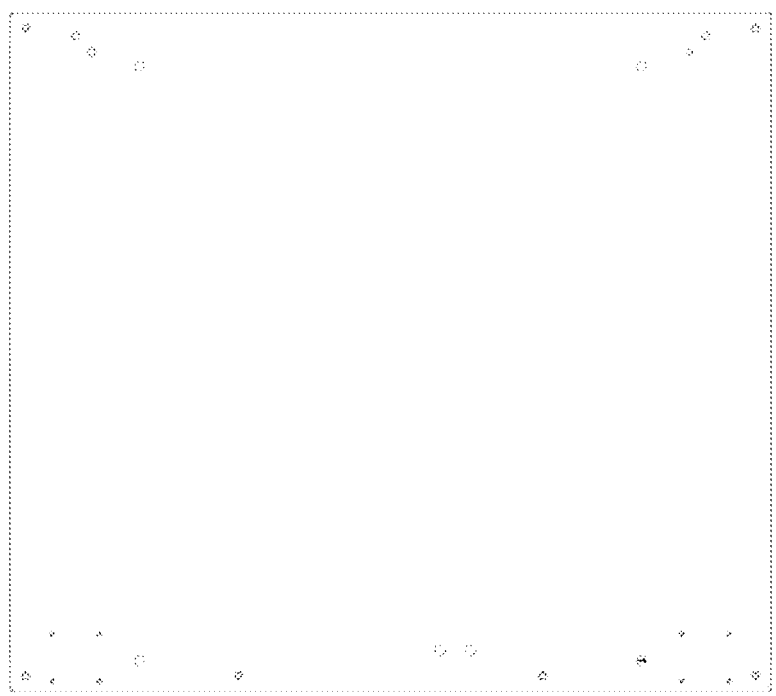

With high flexibility floors, mechanisms can be used to apply a suction force to the underside of the container floor to facilitate separation from cured photopolymer. For example, as depicted in FIG. 17A, a suction force 1301 can be applied to the floor 1304 to keep it taut over a mask carrier 1330. The force 1301 can produce a volume of low pressure beneath the floor 1304. The force 1301 can act to increase the separation force applied to the underside of the floor 1304. In some embodiments, the force 1301 can be achieved by sealing the lower portion of an additive manufacturing device, e.g., by sealing the area beneath the floor 1304, and using a fan, or other mechanism to remove air that is naturally present from the lower portion to produce an area of low pressure. This additional force 1301 can act to separate the container floor from the cured photopolymer during a printing process. The evacuation of air (e.g., mL per second) and subsequent low pressure produced by such evacuation can be controlled via a pulse width modulated signal or by a varying voltage source or other suitable electronic mechanism.

Figure 22A:
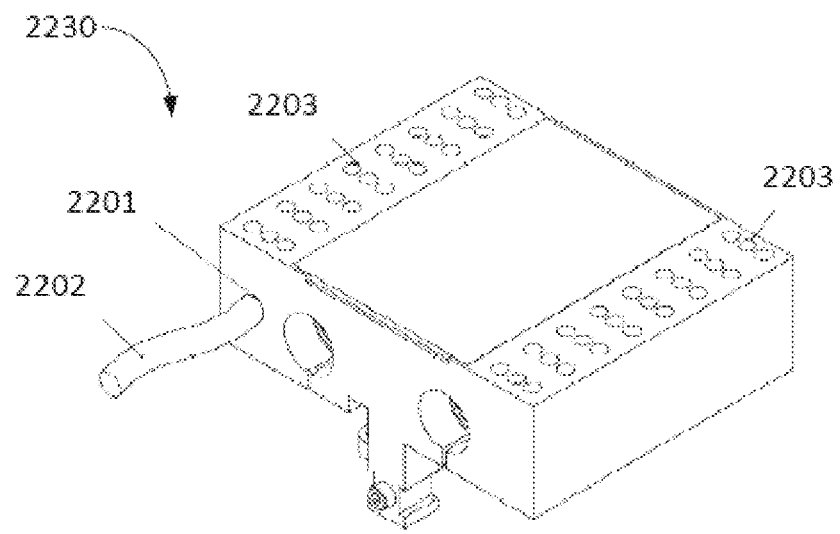
FIGS. 22A and 22B depict an example of a mask carrier of an additive manufacturing device, according to embodiments, with the addition of a feature set for creating an area of low air pressure along the face of the carrier.
Figure 22B:
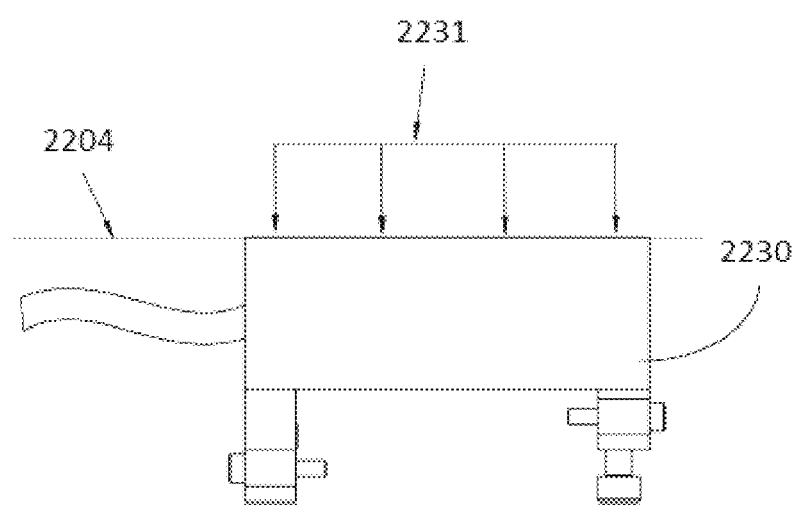

Additionally, low pressure 2231 can be applied by a mask carrier 2230 to a container floor 2204, as depicted in FIGS. 22A and 22B. The mask carrier 2230 can accept a hose 2202 at an orifice 2201 that can enable evacuation of air across a face of the mask carrier 2230, e.g., via openings 2203, resulting in the force 2231 being felt at the floor 2204. The low pressure forces 2231 can ensure parallelism and coincidence between the face of the mask carrier 2230 and the container floor 2204.

Figure 18:
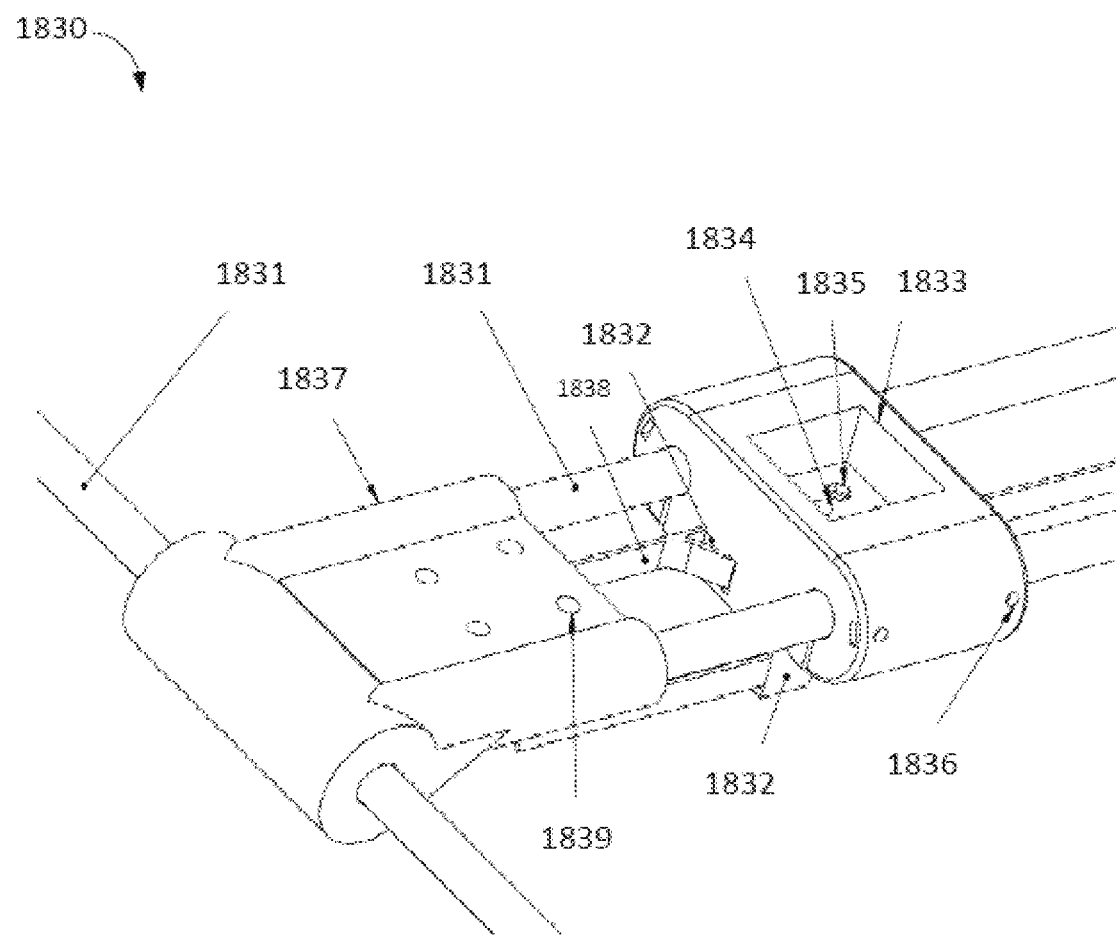
FIG. 18 depicts an example of a mask carrier of an additive manufacturing device, according to embodiments.

FIGS. 18-24B depict various examples of mask carriers used with additive manufacturing devices, as described herein. FIG. 18 depicts an example of a mask carrier 1830 of an additive manufacturing device, according to embodiments described herein. The mask carrier 1830 can be structurally and/or functionally similar to other mask carriers described herein. The mask carrier 1830 can be movable, e.g., along at least two axes. The mask carrier 1830 can move along one or more linear motion components 1831, e.g., implemented as guiding rods, rails, or tracks. The linear motion components 1831 can be attached to the mask carrier 1830 via attachment mechanisms implemented as belts 1832. The mask carrier 1830 can include a port 1834 for receiving cables, e.g., for providing power to mask carrier 1830 for powering one or more components of the mask carrier 1830, including, for example, motors (e.g., for linear motion), light source(s) (e.g., light source 1833), etc.

The mask carrier 1830 can include an opening or hollow 1833 for housing a light source and adjustment points 1835 for adjusting light source directionality. A flat and low friction upper surface can cover the hollow 1833. One or more masks can be configured to be located between the light source and the upper surface of the hollow 1833, e.g., on a reel. The masks can be exchanged during a printing operation. The reel or sheet or mask(s) can be attached to the mask carrier 1830 via attachment points 1836. It should be noted that the upper surface of the mask carrier window may be coated with low friction materials such as poly dimethylsiloxane (PDMS), fluorinated ethylene propylene (FEP), polymethyl methacrylate (PMMA), polyethylene (PET), or polypropylene (PP).

The motion components can include a motor, e.g., disposed within mask carrier 1830 and/or a nearby housing. In an embodiment, the motion components can include a motion component 1837 housing bearings, linear motion components 1831, and pulleys that can be mounted to an underside of the housing 1837 via bolt locations 1839. The pulleys, linear motion components, bearings, and motors can be configured to move the mask carrier 1830 along the plurality of linear axes.

Figure 19:
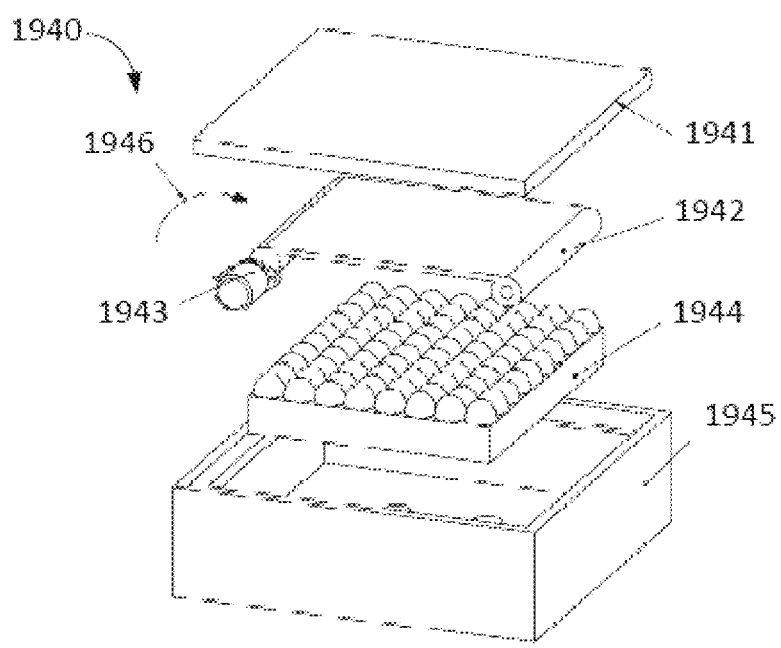
FIG. 19 depicts an exploded view of a housing including a light source and a mask reel of an additive manufacturing device, according to embodiments.

FIG. 19 depicts an exploded view of a removable housing 1940 for housing a light source and/or one or more masks, e.g., for placement into a hollow of a mask carrier such as, for example, hollow 1833 of mask carrier 1830. The housing 1940 can include a lower housing portion 1945 and an upper surface 1941. The light source, masks, upper surface, and other components depicted in FIG. 19 can be functionally and/or structurally similar to like components described with reference to other figures above.

The one or more masks can be positioned or located on a reel 1942, which can be driven on an axel by a motor 1943 or using another suitable mechanism. The mask can be exchanged during printing by rolling the reel forward or backward, e.g., as indicated by the arrow 1946. The housing also houses a light source 1944, which can be a single LED light source or an array of light sources.

Figure 20:
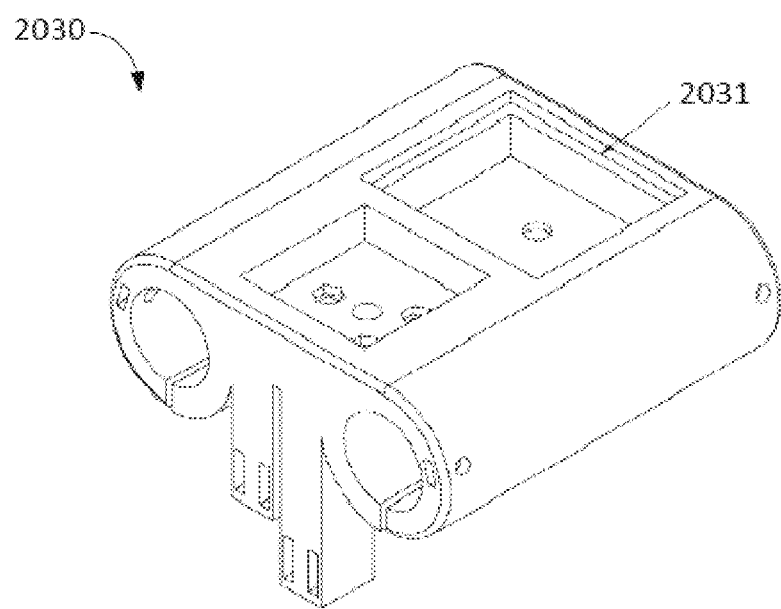
FIG. 20 depicts an example of a mask carrier of an additive manufacturing device, according to embodiments.
Figure 21:
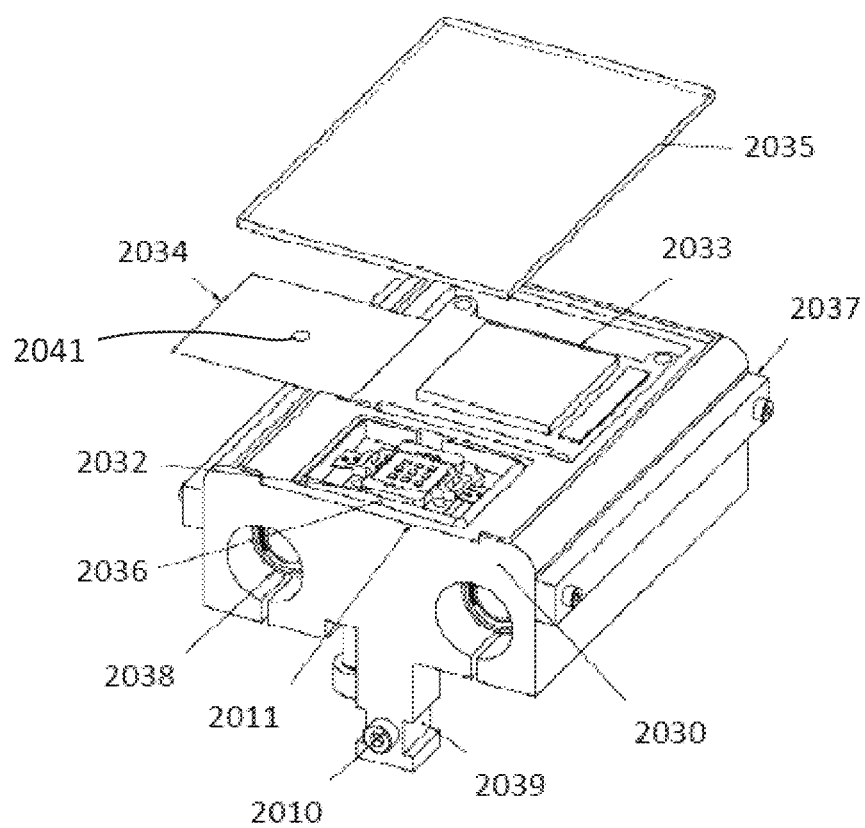
FIG. 21 depicts an exploded view of a mask carrier with a light source and other components installed, according to embodiments.

FIG. 20 depicts an example of a mask carrier 2030 of an additive manufacturing device, according to some embodiments. The mask carrier 2030 can include components that are structurally and/or functionally similar to other mask carriers described herein. The mask carrier 2030 can be configured for use with a liquid crystal display. For example, the mask carrier 2030 can include an opening or hollow 2031 for receiving a light source and a liquid crystal display. FIG. 21 depicts an exploded view of the mark carrier 2030 depicted in FIG. 20, with internal components installed. In the exploded view, the mask carrier 2030 includes an opening 2011 for receiving a light source implemented as an LED array 2032, a physical mask 2034 with a circular exposure orifice or pattern 2041, and a flat and low friction clear plate or window having an upper surface 2035. In an embodiment, the window is transparent. In another embodiment, the window 2035 may filter light passing therethrough to predetermined wavelengths. The LED array 2032 and the physical mask can be mounted or supported on a removable housing 2036. The low friction upper surface can be a rectangular sheet of fluorinated ethylene propylene (FEP), which can be secured to the mask carrier 2030 via a bracket 2037. The mask carrier 2030 also includes a Liquid Crystal Display (LCD) display 2033, such as, for example, a thin-film transistor liquid crystal array or a graphic liquid crystal display. The mask carrier 2030 can include openings or orifices for receiving linear bearings 2038, e.g., to enable movement of the mask carrier 2030 along the linear bearings. The mask carrier 2030 can also include a structure 2039 for securing a belt for movement and a mechanism 2010 to tension the belt (e.g., by tightening the bolt).

As noted above, the advantages of performing layer-wise curing with physical masking include cost reduction, power consumption reduction, reduction in weight, high pattern resolutions, and fast cure rates. When compared to a digital pattern or image forming device such as LCD, the cure rate of a physical mask is significantly faster for a given light source at equal distances, e.g., because an LCD may block relevant wavelengths of light required for curing certain type of photopolymers, such as those with initiation wavelengths within the UV spectrum.

While LCD light sources lead to slower cure times, it can be desirable to use LCD light sources as an alternative or in addition to LED light sources, e.g., as an additional mechanism for forming patterns. Other suitable mechanisms for forming patterns can also be used as an alternative or in addition to physical masks. For example, as a LCD is digital, it can display patterns when connected to suitable electronics. It therefore may be desirable to use an LCD pattern device within the printer for the purposes of testing or prototyping physical masks before committing to producing such physical masks for long term usage and higher performance. For example, the LCD can be placed within an additive manufacturing device alongside a LED light source, as depicted in FIG. 21, to test one or more patterns before preparing one or more physical masks. To reduce variability between LCD and LED performance, and for the purposes of prototyping, the LCD light source can be designed to have equal surface area as an LED light source; however, such is not required as a LCD can be programmed to display variations in size of an image. In some embodiments, LCD systems can be used to perform printing of portions of an object that have not been committed to one or more physical masks. In operation, a LCD system includes a light source that is used to create a pattern in an optical light path that traverses through the LCD, though a transparent base of a vessel, and ultimately striking the photopolymer, with the difference from a physical masking being that the pattern displayed is controlled digitally by the LCD system.

FIGS. 22A and 22B depict an example of a mask carrier 2230, which can form relatively low pressure at its upper surface and apply forces 2231 upon a floor of a vessel above the mask carrier 2230, as described above. The mask carrier 2230 can include components that are structurally and/or functionally similar to other mask carriers described herein. In an embodiment, the mask carrier 2230 can include physical masking and/or a liquid crystal display.

As described above, the mask carrier 2230 can include an orifice 2201 that can receive a hose 2202 to allow for evacuation of air across the upper surface of the mask carrier 2230 via openings 2203. This evacuation of air can result in a force 2231 being applied to a container floor above the mask carrier 2230, e.g., assisting in separating the container floor from cured photopolymer during a printing operation.

Figure 23A:
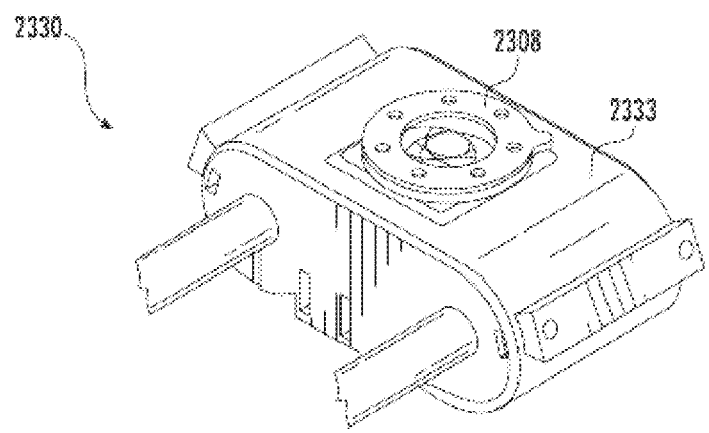
FIGS. 23A-23C depict an example adjustable iris of an additive manufacturing device in different configurations, according to embodiments.
Figure 23B:
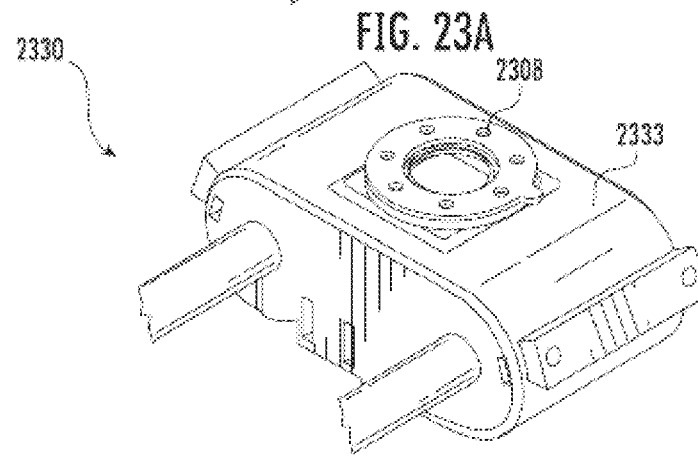
Figure 23C:
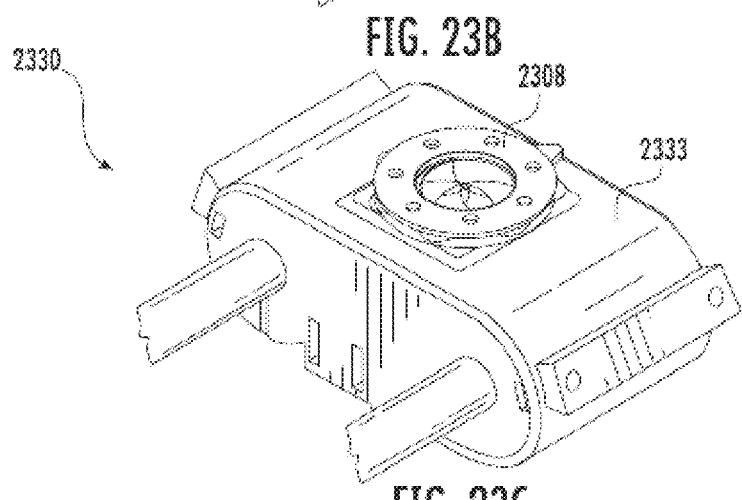

FIGS. 23A-23C depict an example mask carrier 2330 with an adjustable iris 2308 (e.g., image adjustment mechanism, similar to those described with reference to figures above) shown in multiple configurations. The adjustable iris 2308 can be incorporated into the mask carrier 2230 at an open face 2333. The adjustable iris 2308 is configured to adjust the spot diameter of the cure or, stated differently, the area of the cured photopolymer. FIG. 23A depicts the iris 2308 in a half-open position. FIG. 23B depicts the iris 2308 in a fully open position. And FIG. 23C depicts the iris 2308 in a closed position. The iris 2308 can be located between the light source within the mask carrier 2330 and a volume of photopolymer within a vessel, and therefore can be used to control various spot diameters that would be cured in the photopolymer during a printing process.

Additionally or alternatively, the size and/or pattern of a cured section of photopolymer can be adjusted using physical masks, as described above and further described with reference to FIGS. 24A and 24B. For example, FIGS. 24A and 24B depict a reel of masks 2401 that can be used with additive manufacturing devices, as described herein. The reel of masks 2401 can be structurally and/or functionally similar to other masks described herein. The reel of masks 2401 can include a plurality of light transmissive patterns 2412 (e.g., UV light transmissive circles), with distances 2403 between each pattern being known. A mask carrier can use the reel of masks 2401 to select between various cure orifice diameters and/or patterns. For example, a left most orifice 2412a is depicted as being smaller in diameter than its adjacent orifice 2412b, with a reel progression distance of A. Accordingly, moving the reel 2401 a distance of A between the left most orifice 2412a and its adjacent one 2412b can result in a different spot diameter being used for curing during a printing process. Patterns 2412c, 2412d can be used, for example, to create infill or structure inside of a printed perimeter of a layer of an object. For example, if a plurality of circular patterns reside in a single mask, then the distances between those are known (e.g., B or C as depicted in FIG. 24A). the patterns 2412c, 2412d are examples of such patterns. It should be appreciated that while the embodiment of FIG. 24A, 24B illustrates the orifices 2412a-2312d as being circular, this is for example purposes and the claims should not be so limited. In other embodiments, the orifices 2412a-2412d may be non circular. In still other embodiments, the orifices 2412a-2412d may each be a different shape.

As described above, the reel of masks 2412c can be formed by etching or cutting out patterns 2412 in a substrate (FIG. 24A), or by using 2D printing methods to produce the patterns 2412 on a UV transmissive substrate (e.g., paper or polymer) (FIG. 24B).

Figure 25A:
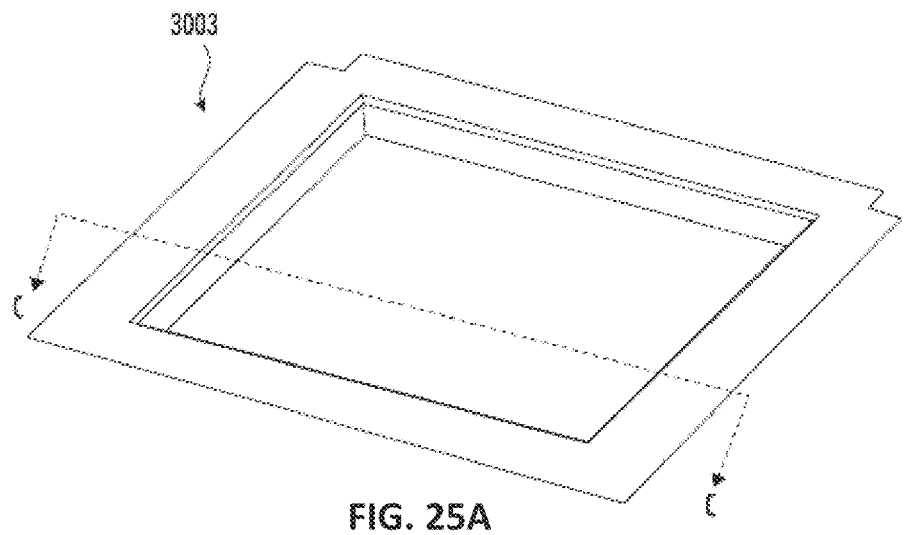
FIG. 25A-25C depicts an example of a vessel of an additive manufacturing device, according to embodiments.
Figure 25B:
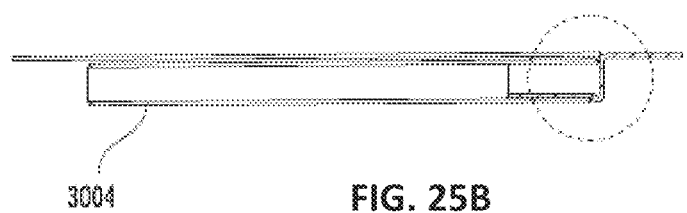
Figure 25C:
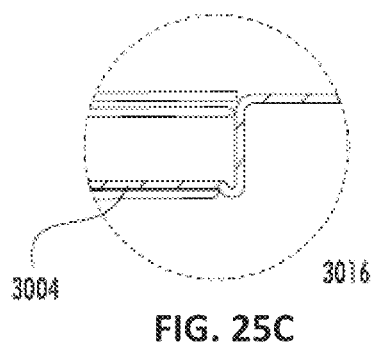

An example of a flexible floor, seen in FIGS. 25A-25C, can be used with additive manufacturing devices described herein. FIGS. 25A-25C depicts a container 3003 manufactured using vacuum forming. Suitable materials for forming a floor 3004 of the container include PP, PET, PMMA or FEP. Such materials can be capable of prolonged contact with many photopolymers, and can be clear and UV transmissive (e.g., with particle sizes as small as 0.05 mm) to enable the photopolymer to be cured using an externally placed light source. containers formed with such material can be sufficiently flexible to allow for passive peeling of cured photopolymer from the container floor.

Figure 26:
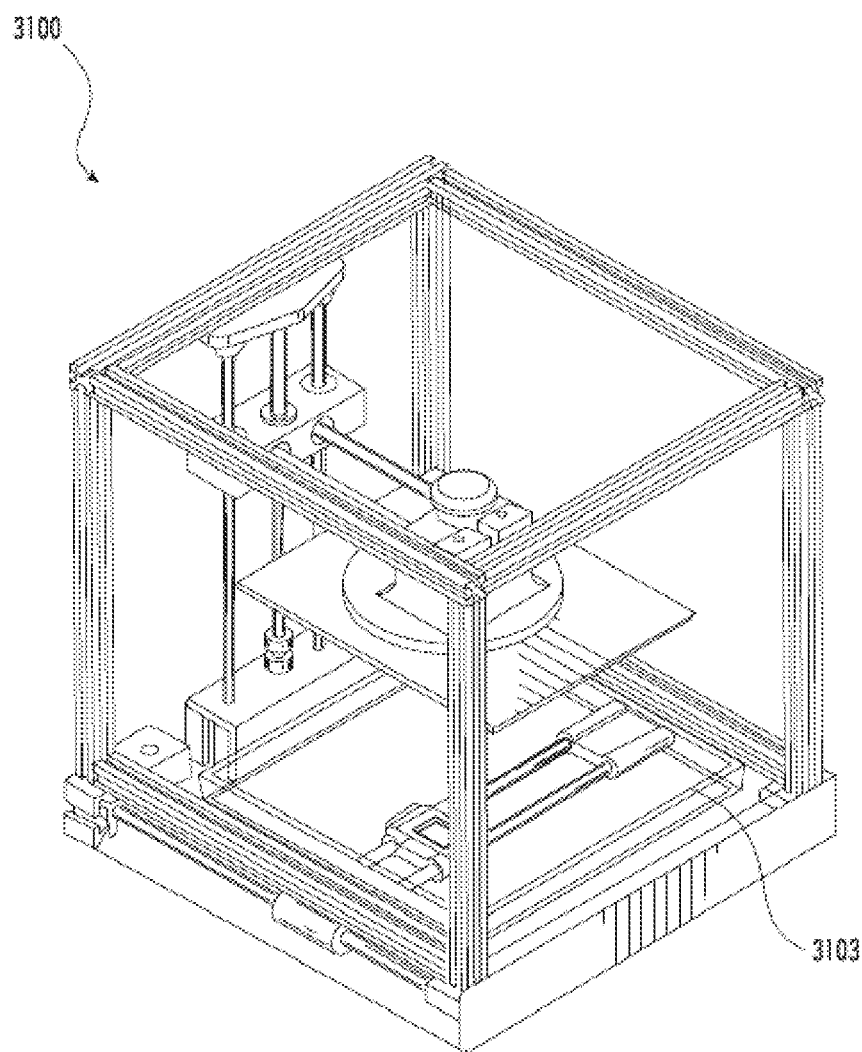
FIG. 26 depicts an example of a vessel installed in an additive manufacturing device, according to embodiments.

As described above, with materials with larger Youngs modulus values (4 GPa), internal tension within the photopolymer container can act together with the force of the photopolymer volume to separate the cured photopolymer from the container floor. Factors that impact this separation can include, for example, the shape and/or size of the container assembly and the thickness of the material. In some embodiments, ribbing 3016 (e.g., curved component) and/or other structural components can be formed into the containers walls, e.g., to add rigidity to the container walls, as shown in Detail D. Ribbing structures can be directly vacuum forced into the shape of the container 3003. The ribbing can impact the shape of the container when it is deflected during use. FIG. 26 depicts a low flexibility container 3103 installed in an additive manufacturing device 3100.

Additive manufacturing devices with moveable mask carriers, such as those described above, can be used to manufacture objects by moving the mask carrier from section to section. These moveable mask carriers (e.g., mask carriers 430, 530, 630, 730, 930, 1030, 1130, 1230, 1330, 1830, 2030, 2230, 2330) can move along one or more axes. In embodiment where the mask carriers can move along more than one axis, e.g., a X and a Y axis, the mask carriers can be configured to move along those axes simultaneously.

During operation, these mask carriers can operate in several modes. For example, the mask carriers can operate in stepping mode path mode. In stepping mode, the mask carriers can be configured to move from section to section (e.g., a portion of a current layer of an object being printed), completing a curing at each section. For example, this may be useful for infill or common patterns such as logos and safety markings.

Figure 27:
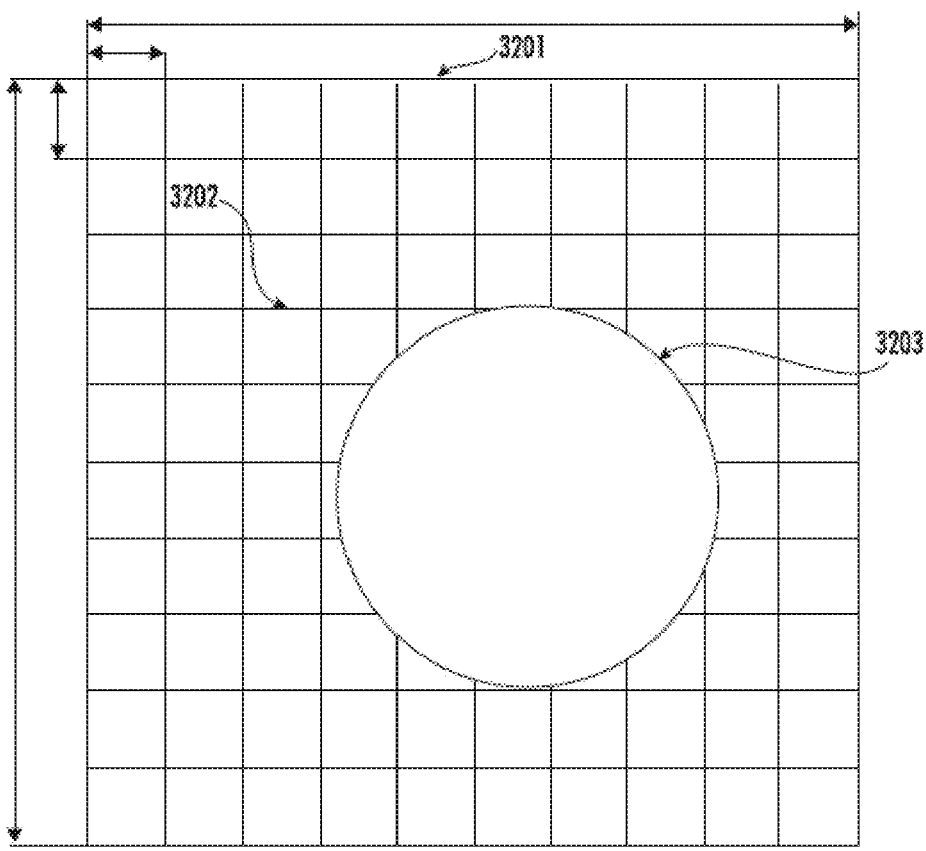
FIG. 27 depicts an example of one or more sections of a layer of an object, according to embodiments.

FIG. 27 depicts a layer of cured sections, which form the overall shape. As depicted, this area 3201 is 300×300 mm, which has been subdivided into section 3202 of 30×30 mm. Each section 3202 can be cured sequentially, e.g., by a light source and pattern in a mask carrier. An orifice or pattern 3203 representing a portion of a layer of an object can be cured by moving the mask carrier from section 3202 to section 3202 to cure that layer of the object.

With a mask carrier operating in stepping mode, if each layer of an object is a 300×300 mm square pattern, and the maximum surface area that can be cured by the mask carrier at one time is 30×30 mm, then the minimum number of sections that require curing is 10 in both the X and Y directions and therefore the mask carrier must move to 100 different sections to cure each layer of the object. As such, assuming a reposition time of 2 seconds and cure time of 0.05 seconds at each section, the time to form each layer of the object can be calculated using the following equation:

Time per layer=[0.05+2×100]+4=209 seconds

And the total time required to form a 300×300×1 mm cuboid, assuming layer heights of 0.1 mm is:

Total time=209×(1/0.1)=2090 seconds=~35 minutes

Figure 28:
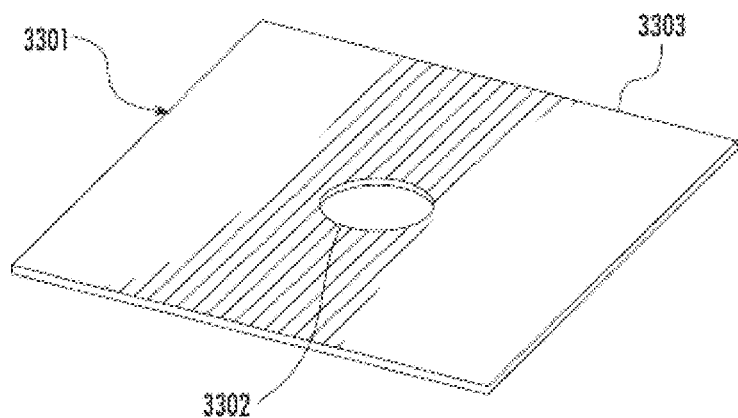
FIG. 28 depicts an example of a mask used in an additive manufacturing device, according to embodiments.
Figure 30A:
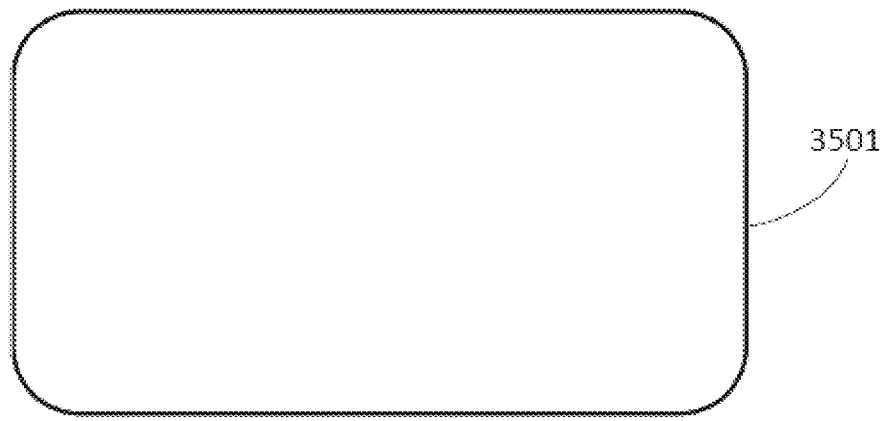
FIGS. 30A-30C depict examples of a layer of an object, according to embodiments.
Figure 30B:
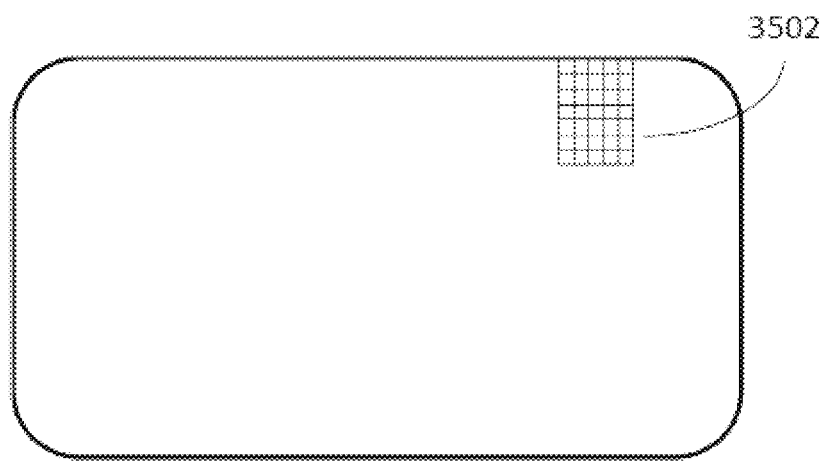

In path mode, a mask carrier can move along a designated path (e.g., traverse along the X and Y axes) while curing. In some embodiments, the UV transmissive portion of a mask used by the mask carrier can be a circular pattern with a known diameter, as depicted in FIG. 28. Specifically, an example mask 3301 can include a UV transmissive portion 3302 (e.g. orifice) surrounded by a non-transmissive portion 3303. The mask 3301 can be one of a plurality of masks within a reel of masks, e.g., within a PMSD, and can be located within the mask carrier that is traversing the designated path. FIGS. 30A and 30B depict one or more paths 3401, 3402, 3403 along which a mask carrier can traverse. As depicted the mask carrier can move around an available space in both X and Y directions, with predetermined positions where the light source is switched on and off. This mode of operation enables the mask carrier to cure lines or beads of a volume of photopolymer as it traverses the available space.

During operation, the diameter of the cured pattern can also be adjusted, e.g., by rolling a mask reel to select different diameter circular patterns and/or by adjusting an adjustable iris (e.g., iris 2308 as depicted in FIGS. 23A-23C). Referring to FIGS. 30A and 30B, a first part 3401 of a depicted layer can be cured with a mask having a circular cure pattern or an iris adjusted to a certain diameter. The mask carrier can be positioned at a starting point, and a light can be engaged to begin the curing of the first part 3401. While moving along this first part 3401, the mask carrier can be in constant motion. After finishing curing of the first part 3401, the light source can be disengaged, and a mask containing a relatively smaller diameter can be selected (i.e. by moving a reel of masks or adjusting an iris). The light source can then be engaged once again to cure a second part 3402 of the layer. In some embodiments, a mask containing two circular transmissive portions can be selected (e.g., as depicted in FIGS. 24A and 24B), and a resulting cure including two straight lines 3403 can be formed when the mask carrier moves along a linear axis (e.g., the X axis).

While a container containing photopolymer, a print bed, and other components of an additive manufacturing device are not depicted in FIGS. 30A and 30B, it can be appreciated that such components can be present but have been omitted for illustrative purposes.

In the path mode, separation between the cured photopolymer and the container floor can occur while the mask carrier is in motion, e.g., when used with photopolymer containers as disclosed herein. Accordingly, such separation may not impact overall printing speed, nor does a lifting sequence need to be performed with a print bed to produce such separation.

Figure 29A:
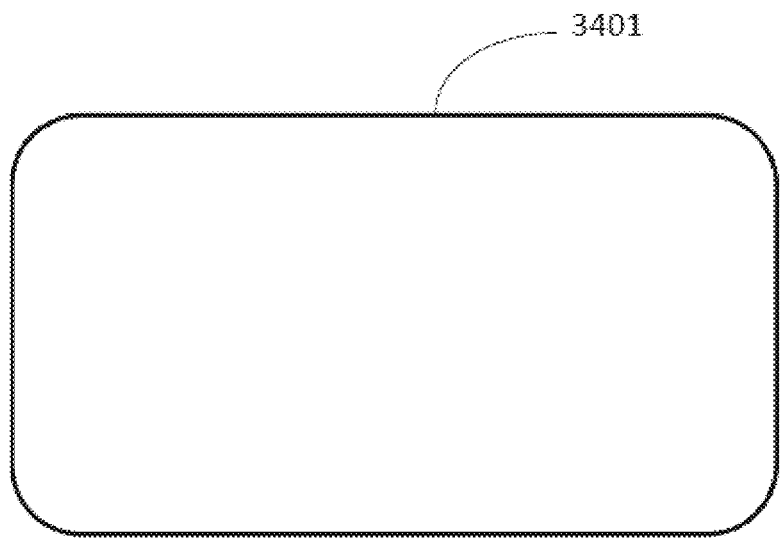
FIGS. 29A and 29B depict examples of a layer of an object, according to embodiments.
Figure 29B:
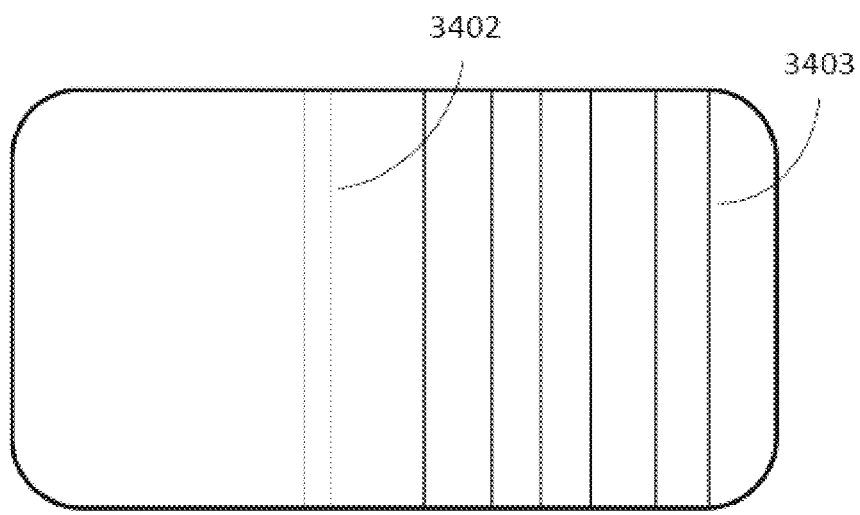
Figure 30C:
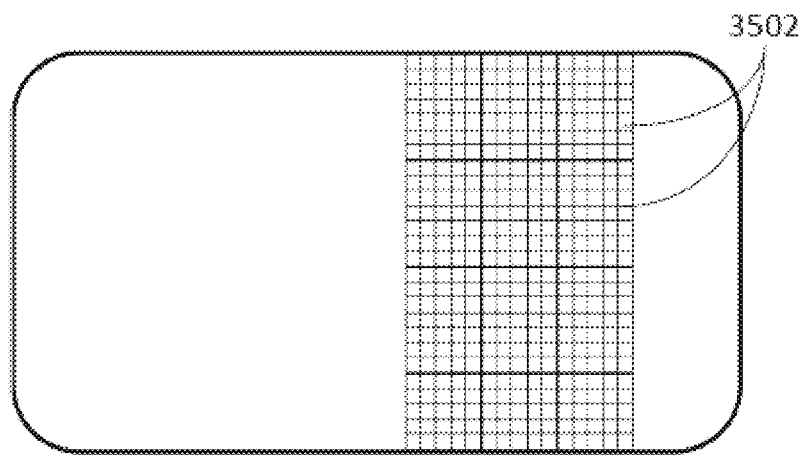

In some embodiments, both stepping mode and path mode can be used to form a layer of an object, e.g., as depicted in FIGS. 30A-30C. For example, the thicker line 3501 can be formed by a mask carrier operating in path mode, similar to that described with reference to FIG. 29A. Then, rather than have the mask carrier travel along each path, an infill pattern mask can be utilized to cure larger sections 3502 at a time in stepping mode, e.g., by moving the mask carrier from section 3502 to section 3502. Specifically, a mask having a dense rectangular infill exposure pattern can be selected, and the first section 3502 depicted in FIG. 30B can be exposed at once. The mask carrier can then move onto the next section to be exposed, enabling the container floor along the first section to release from the cured photopolymer cured in that section. This process can be repeated until the entire layer is cured, e.g., as in FIG. 30C.

Given that the operation of the device is such that it moves a mask carrier along an X and Y axes, an equation is stated in mm/s along the X and Y axes with a specified mask orifice diameter for a cure feed rate. In this mode of operation, which will be referred to as 'path mode' herein, where the mask carrier is following a path, assuming the light source is planar as depicted by the example devices here:

Cure feed rate (mm/s)=[dot diameter (mm)/Cure time (s)];

Where cure time is the time taken to cure the desired diameter & layer height and;

Deposition rate (mm$^3$/s)=[Area dot (mm$^2$)*Layer height (mm)]/Cure time (s);

Where 'dot' refers to the circular, UV transmissive, portion of the mask depicted in FIG. 24A; and Where 'cure feed rate' is the distance travelled by the mask carrier in millimetres per second and where 'Deposition rate' is the volume of photopolymer cured in millimetres cubed per second.

For Example, a 10 mm dot diameter with a light source capable of curing the polymer in 0.1 s will result in an allowable cure feed rate of 100 mm/s. Increasing light performance to a cure time of 0.01 s will result in a 1 m/s cure feed rate. Alternatively, increasing the dot size to 20 mm with a 0.1 s light source will result in a 200 mm/s cure feed rate or 2 m/s with a 0.01 s light source.

The deposition rate of a 10 mm diameter spot and 0.005 s light source curing layer heights of 0.1 mm is 1,570.8 mm$^3$/s.

Note, the maximum cure rate is dependent upon the amount of relevant energy that can be transmitted to the polymer as well as the polymer chemical makeup. As the reaction is often exothermic, in practice the photopolymer will have a maximum cure rate where energy transmission is not limited.

A further mode of operation, referred to herein as 'stepping mode', consists of the mask carrier being moved to a starting position. After this, a pattern is cured against a build plate and above a photopolymer container floor as described herein. The mask carrier then moves to the next desired position, in preparation for another curing cycle. A curing then takes place again and this cycle continues until all sections as depicted in FIG. 28 have been cured. The print bed is then raised 1 layer height (e.g. 0.05 mm) and afterwards the mask carrier moves to the starting position of the next layer. As the mask carrier moves from position to position beneath the container floor, its design as depicted in FIG. 6A and FIG. 6B, allows it to 'release' away from the cured photopolymer under the force of the contained photopolymer acting downward and or the internal tension of the floor in the case of the floor being as described in FIG. 10A. This mode of operation can be more readily understood with reference to FIG. 30C. In this case there is time taken for each curing and for the motion between sections, but the release time, per section, can be considered zero seconds, in both 'path mode' and 'stepping mode', because it takes place while a curing is happening and thus does not increase the overall time taken. Rather it is the time taken to cure each section plus the time taken to move from section to section which makes up the total time taken. Therefore;

Time per layer (s)=[(Cure Time (s)+(reposition time (s))*Number of sections]+[(reposition time (s))*2]

Where 'reposition time' is the time taken to move between 'sections' as described herein and subsequently curing a portion of the current layer being produced, for a time 'cure time'. This assumes the mask carrier moves into position for the first section and away from directly beneath the last section prior to the bed lifting by one 'layer height'. This adds an additional time taken for two 'repositions'. It is assumed, for clarity, that the mask carrier moves contagiously from one 'section' to the next adjacent 'section' such that each 'reposition' is of equal distance.

Figure 31:
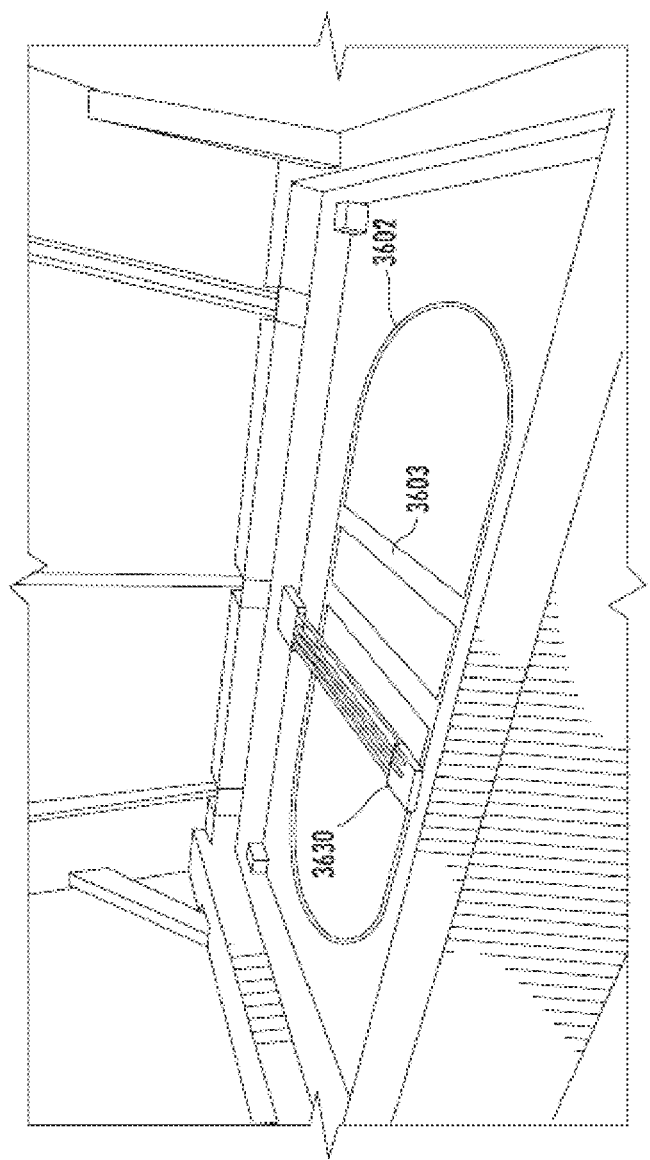
FIG. 31 depicts a mask carrier forming a layer of an object, according to embodiments.

FIG. 31 depicts another example of curing a layer of an object, e.g., using additive manufacturing devices and components as described herein. Similar to FIGS. 30A and 30B, a layer including a perimeter portion 3602 and infill section 3603 is cured. A mask carrier 3630 can be used to cure the layer. As shown in FIG. 31, the mask carrier 3630 can be using a mask including two curing orifices (e.g., two UV transmissive openings), and therefore is curing two lines in the layer by moving along a linear axis.

Figure 32A:
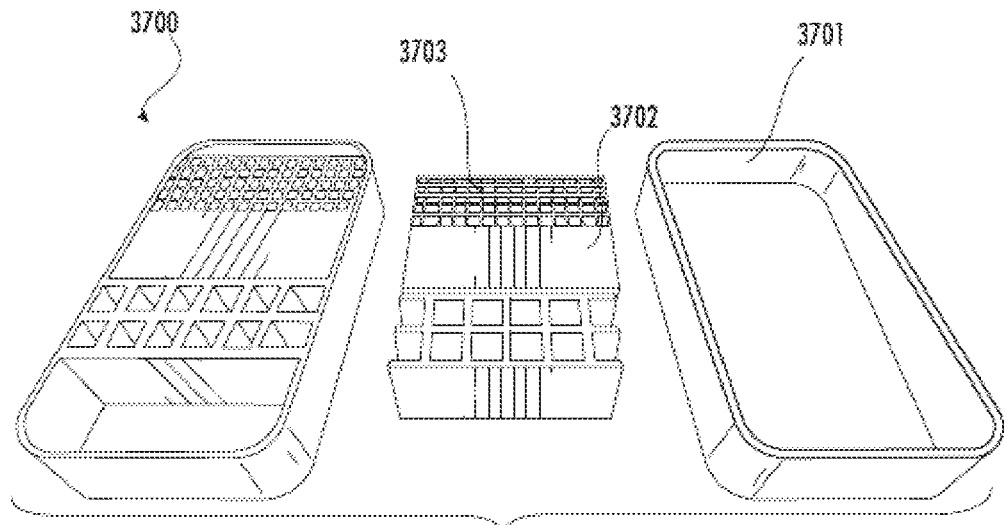
FIG. 32A depicts an example of an object formed using additive manufacturing devices, according to embodiments described herein.
Figure 32B:
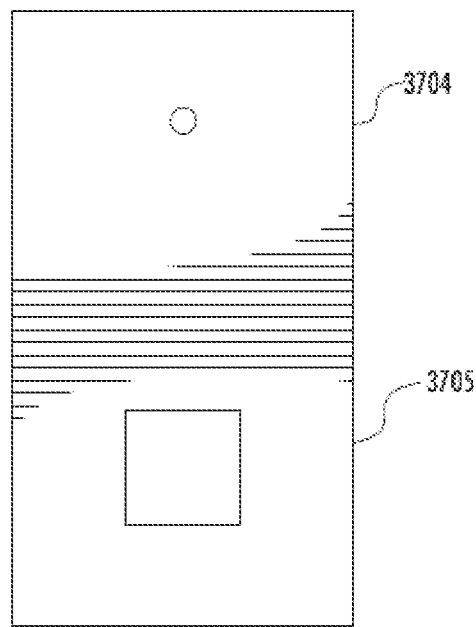
FIG. 32B depicts an example of one or more masks used to form the object depicted in FIG. 32A.

FIGS. 32A and 32B depict another example of curing an object, e.g., using additive manufacturing devices and components as described herein. As depicted in FIG. 30A, an object 3700 can include a solid infill section 3702, a line infill section 3703, and a perimeter portion 3701. For forming each of these, a suitable mask can be selected and used with a mask carrier operating in either an active mode or an active path mode. For example, to form the perimeter 3701, the mask 3704 (e.g., including a circular transmissive pattern) can be used. And to form the solid infill section 3702, the mask 3705 (e.g., including a larger square cross-sectional pattern) can be used.

Figure 33:
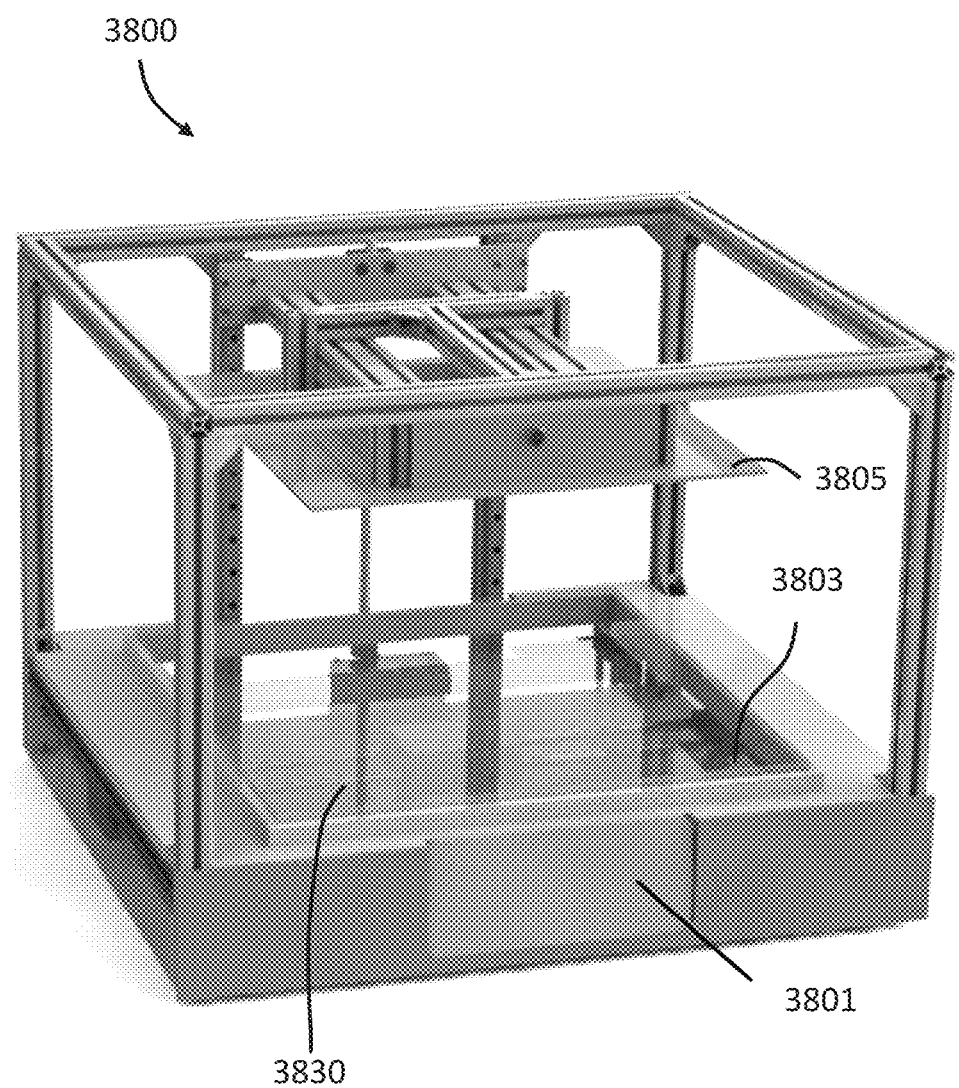
FIGS. 33-35 depict an example of an additive manufacturing device capable of interfacing with a mobile device, according to embodiments.

In some embodiments, an additive manufacturing device such as those described herein can be used with a mobile device, e.g., a smartphone, tablet, or other device including a suitable display (e.g., a LCD screen). FIGS. 33-35 depict an additive manufacturing device 3800 including a receptacle 3801 for receiving a mobile device (e.g., a smartphone). The additive manufacturing device 3800 can include components that are structurally and/or functionally similar to other additive manufacturing devices described herein. For example, the additive manufacturing device 3800 can include a print bed 3805, a vessel or container 3803, and a mask carrier 3830.

The receptacle 3801 can be configured to receive and support the mobile device (not depicted). In some embodiments, the mobile device can be configured to control the operation of one or more components of the additive manufacturing device 3801. For example, the mobile device can control the operation of the mask carrier 3830, print bed 3805, light source, mask reel, etc. The mobile device can include, for example, a processor, and can function similar to controller 160, as described above. In some embodiments, the mobile device can be configured to display a status of a print process and/or other information associated with the print process to a user.

Figure 34A:
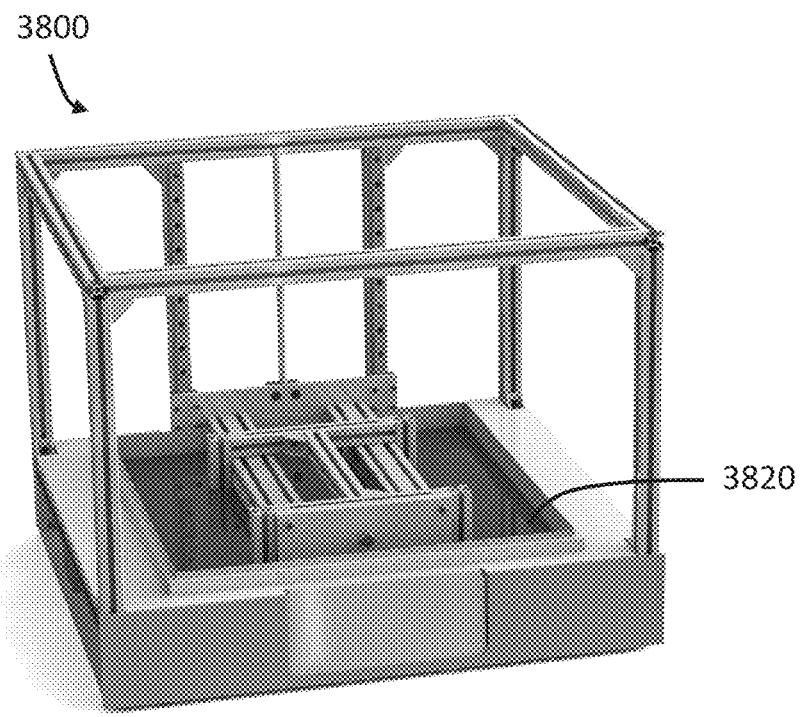
Figure 34B:
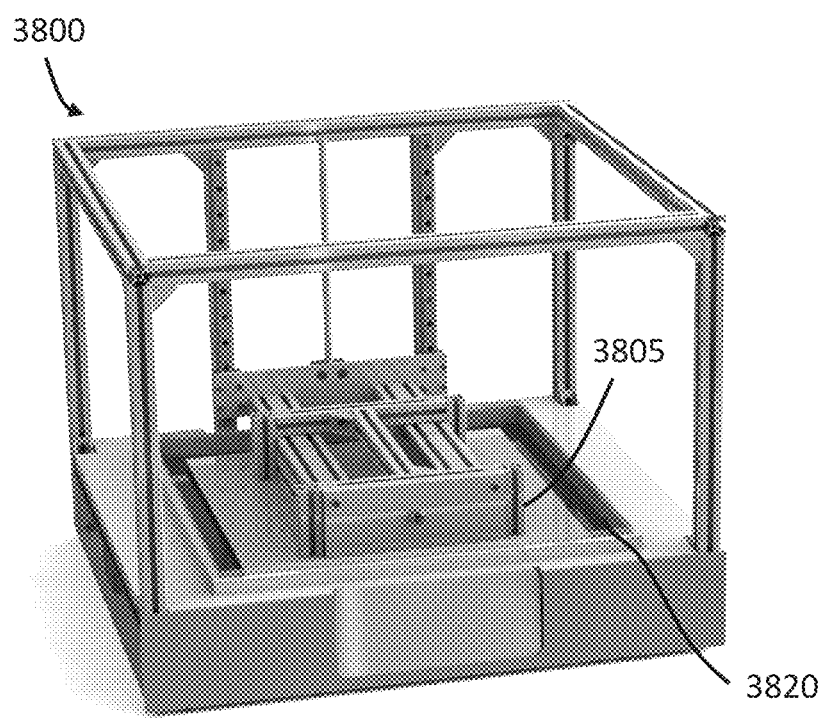
Figure 35:
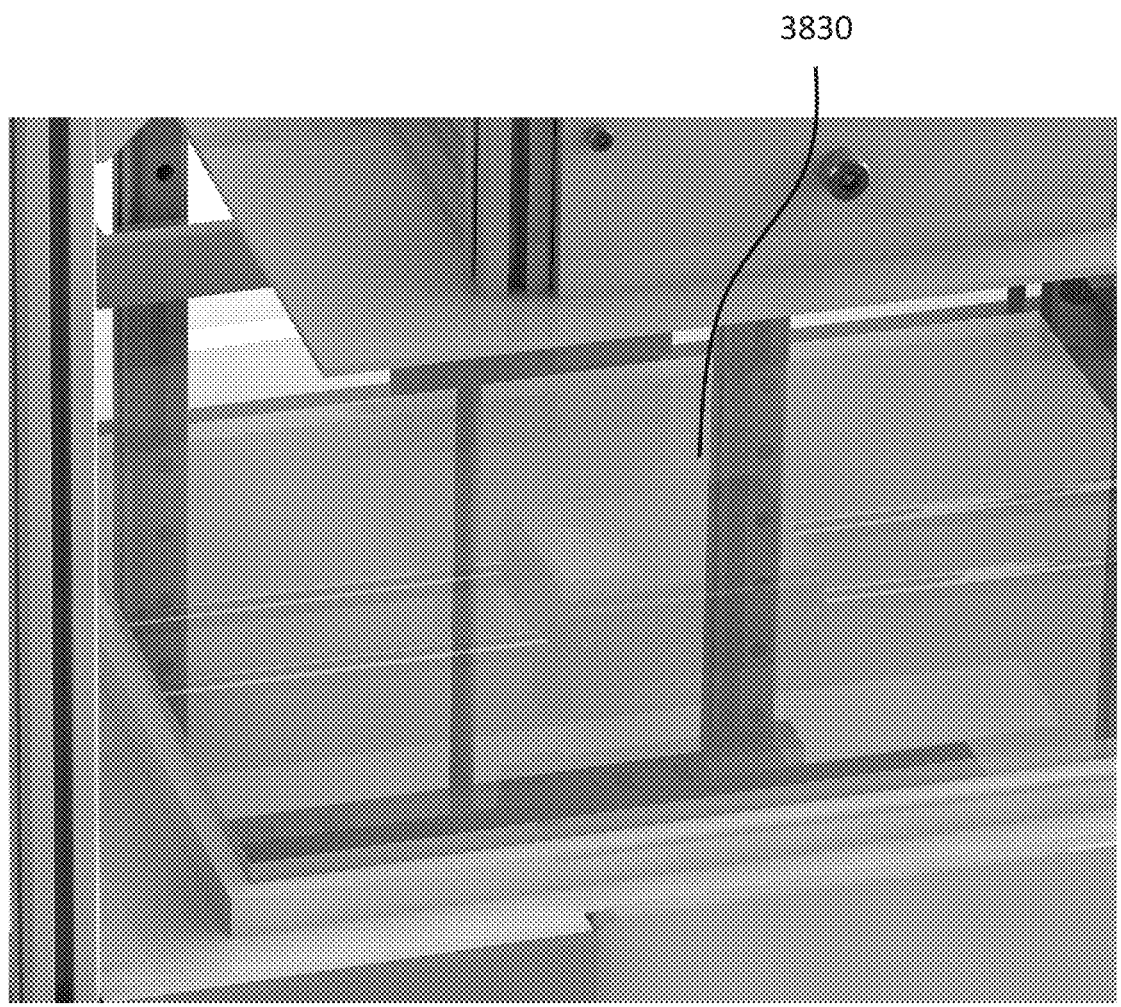

FIGS. 34A and 34B depict the print bed 3805 submerged and unsubmerged in liquid photopolymer 3820, respectively. FIG. 35 provides a detailed view of the mask carrier 3830, which can be similar to, for example, mask carrier 2030, including a light source (e.g., LED) and mask carrier portion and a LCD portion.

Figure 36:
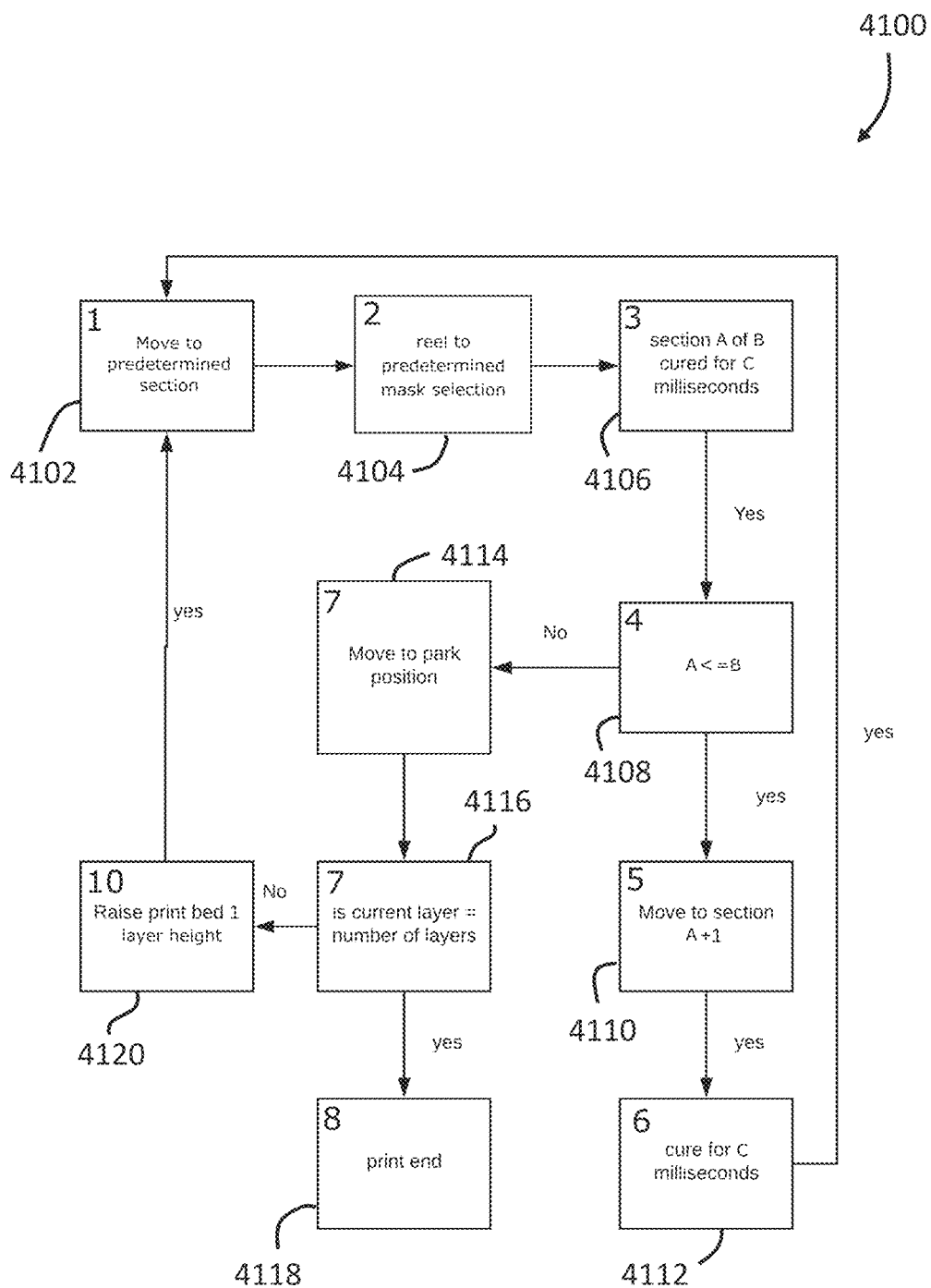
FIGS. 36-37 depict flows diagrams of printing an object using an additive manufacturing device, according to embodiments.
Figure 37:
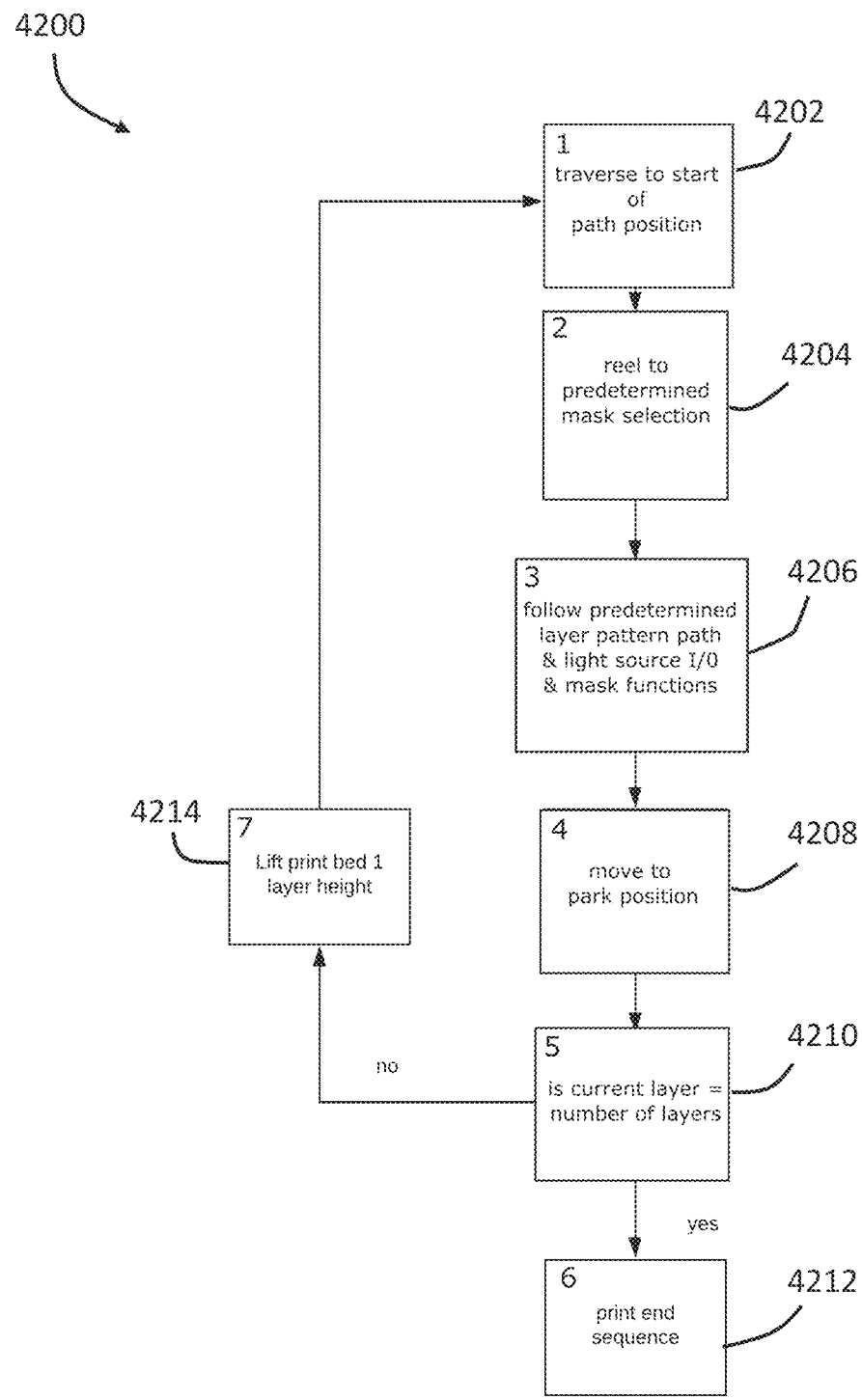

FIGS. 36-37 depict an example method of a print process 4100 using an additive manufacturing device, such as any of those described herein where there is a mask carrier and flexible vessel interfacing. FIG. 36 depicts an example flow of printing an object in stepping mode). The mask carrier first moves to a starting position when a print is initiated in block 4102. The appropriate mask is selected by reeling in block 4104. The object to be manufactured has 'B' number of 'sections' in the current 'layer' to be cured and each section is cured for 'C' seconds in block 4106. With reference to FIG. 27 the layer would have 30 sections for example. In block 4108 if 'A', the current section index is less than the total number of sections, 'B', then block 4110 is initiated and the mask carrier is moved to the next pre-determined 'section'. In block 4112 the section is cured for 'C' seconds. The process 4100 is then restarted at block 4102. This process 4100 will continue to loop until all 'sections' of the current 'layer' have been completed, at which point 'A' is not less than or equal to 'B' and block 4114 is initiated. In block 4114 the mask carrier is moved to a position not beneath the cured photopolymer located on the print bed and block 4116 is initiated. In block 4116 if the current layer equals the total number of layers in the object then the print cycle is ended in 4118, otherwise 4120 is initiated. In 4120 the print bed is raised by one single layer height. Following this the process starts again at 4102.

FIG. 37 depicts an example of a method 4200 of operating an additive manufacturing device with a mask carrier operating in an path mode, as described above. In block 4202 the mask carrier is moved to a position which represents the first point along a pre-determined path. In block 4204 the appropriate mask, along the mask reel, is selected for starting the path. In block 4206 the mask carrier follows said path while enabling and disabling the light source at pre-determined positions along the path. During block 4206, any pre-determined alterations to the mask reel are performed such as exchanging masks or motion of the mask to produce a cure pattern. In block 4208, the mask carrier is moved to a position that is not beneath the cured photopolymer which is located on the print bed. In block 4210, if the current layer is equal to the total number of layers to be produced then the print cycle is ended in block 4212, otherwise in block 4214 the print bed is raised by one single layer height. The process 4200 then repeats.

FIG. 38A depicts a light emitting diode (LED) array 4400 designed for the purposes of curing photopolymers in the aforementioned 3d printing devices. It consists several LEDs 4402 covering a surface area that it is desired to cure. The LEDs 4402 are positioned on a heat sink and housing 4404. As shown in FIG. 38B, the distance 4406 between the centres 4408 of the LED's 4402 referred to herein as the source pitch. As shown in FIG. 38C, the angle 4410 represents the angle of emission of light from each LED 4402 in the array 4400.

Figure 39:
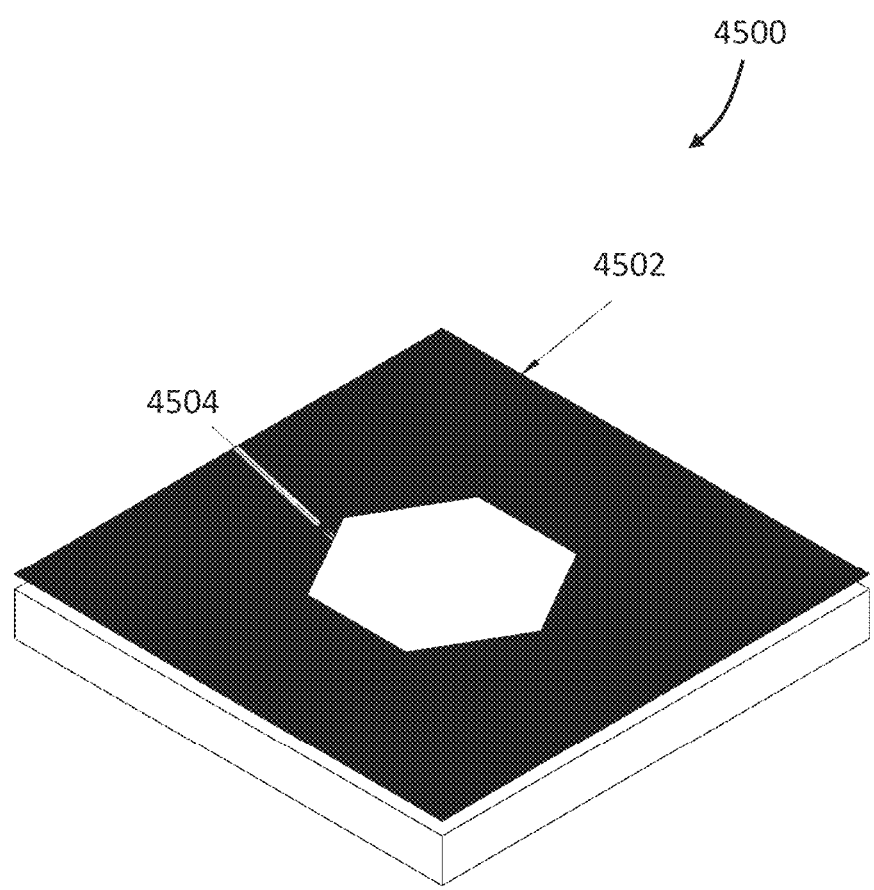

FIG. 39 depicts the light source 4500, in use, positioned under a physical mask 4502 which includes an orifice or a negative image cut-out 4504. FIG. 39 shows the same light source with a toner-printed mask. That is, one where the image/pattern negative is created via 2D printing. It should be appreciated that the light source 4500 may be used in combination with any of the additive manufacturing systems described herein.

FIG. 40 depicts the light source 4600, in use, positioned under a frame 4202 containing no mask where no negative image or patterning apparatus is present. An LED lighting pattern 4604 is arranged within the array 4606. A print bed 4608 is provided where an abject may be built up. It should be appreciated that the light source 4600 may be used in combination with any of the additive manufacturing systems described herein.

FIG. 41A and FIG. 41B depict an LED lighting pattern 4700 and the resulting cured pattern 4702, in photopolymer, when no mask is present. The resulting cured pattern is located on a 3D printer print bed 4704. The resulting cure pattern, in this instance, is dependent upon the layout of the LED's in the array rather than the pattern present on the physical/analogue mask.

Figure 42:
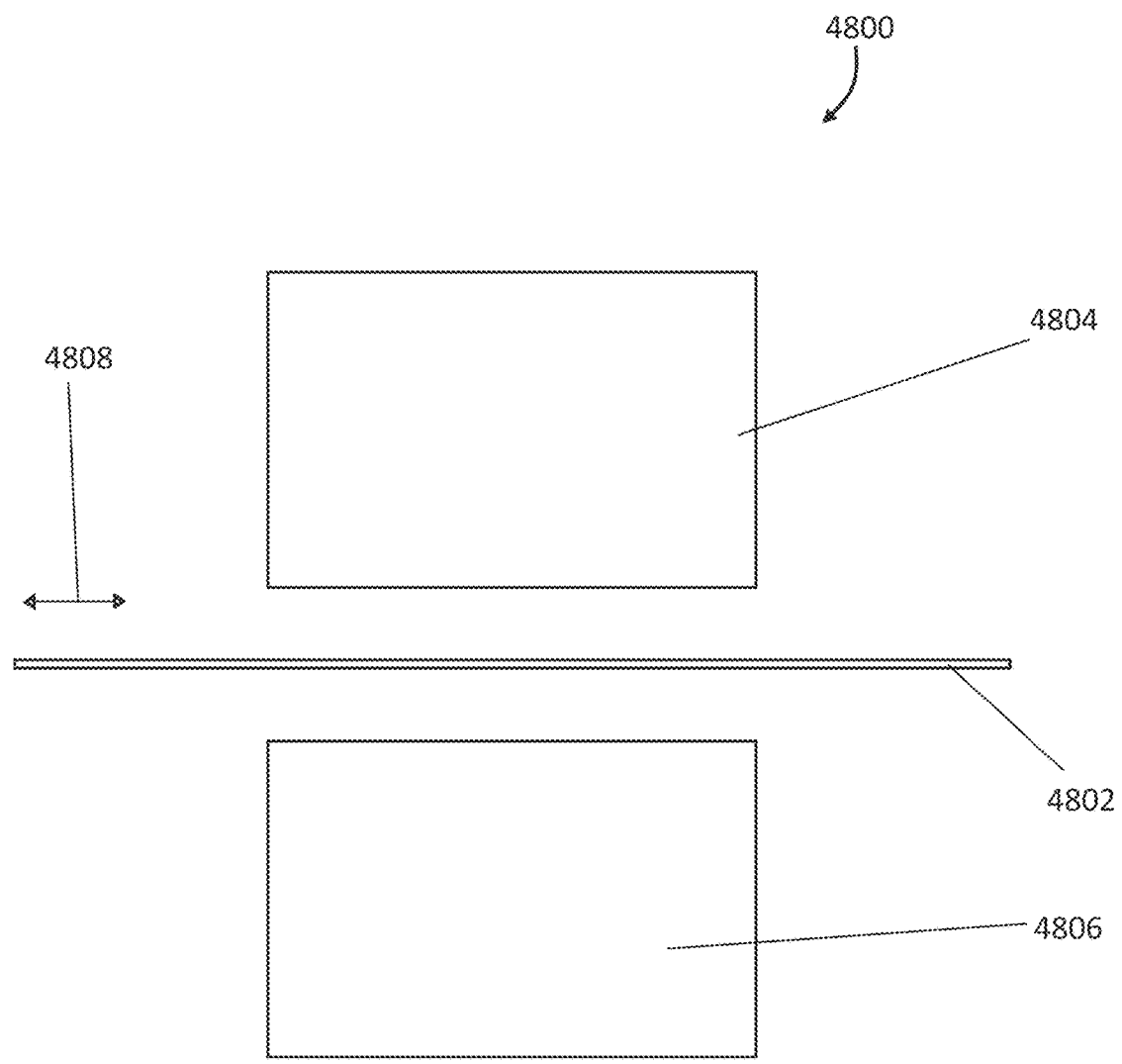
FIG. 42 depicts a sensory configuration which includes identifiers on a mask reel, as well as sensory components which are mounted within the 3D printing device.

FIG. 42 depicts an example configuration 4800 for the sensory positioning of a mask reel that can be used in an additive manufacturing process. The mask can include sensory components 4802, which can be used to sense a position of the mask. While sensory components 4804, 4806 are depicted, one of skill would, in light of the present disclosure, would appreciate that additional methods of determining a location of a mask can be used such as optical sensors, barcoding. In this example, sensory component 4804 emits infrared light and sensory component 4806 receives infrared light. When the lower sensor receives maximum light via orifice 4802, the mask is aligned in that axis. Additionally, magnetic inks may be used in the production of the mask to allow for hall sensor positioning. For example, a hall sensor is located within the 3d printer capable of detecting a magnetic field in motion, which is being generated by the motion of the mask reel and the presence of magnetic and or ferrous materials on its surface. Furthermore, in other embodiments inductive sensors may be used for example. In an embodiment, the purpose of the sensory components is to ensure that the mask image on the reel aligns with the previously cured layer correctly. The mask direction of motion is indicated by the arrow 4808. It runs between the sensory components in this example. It should be noted that the mask reel may be positioned in a plurality of axes in order to provide a desired alignment.

Figure 43A:
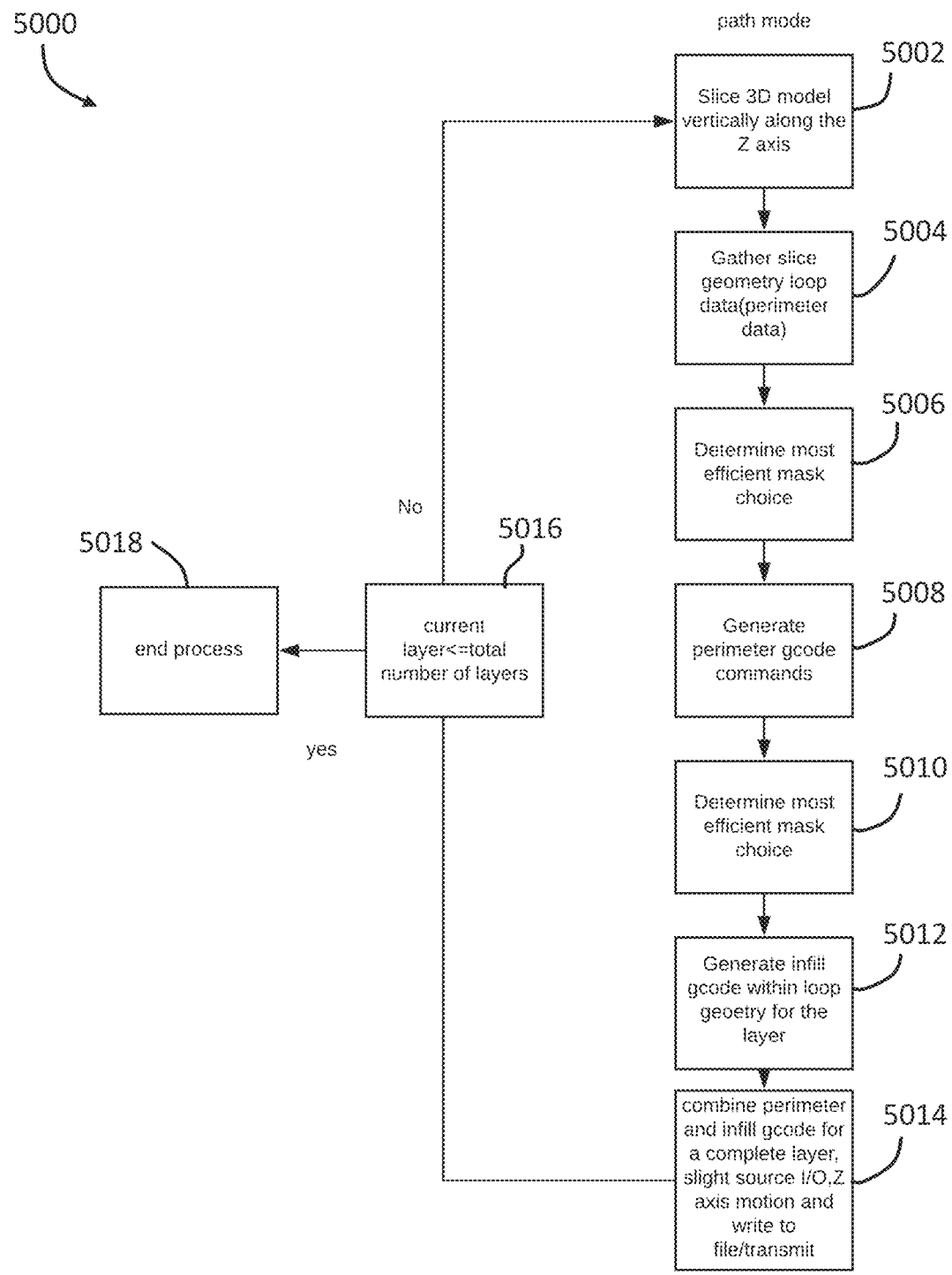
FIG. 43A-43C shows the slicing procedure for preparing files for path, stepping and combined modes of operation.
Figure 43B:
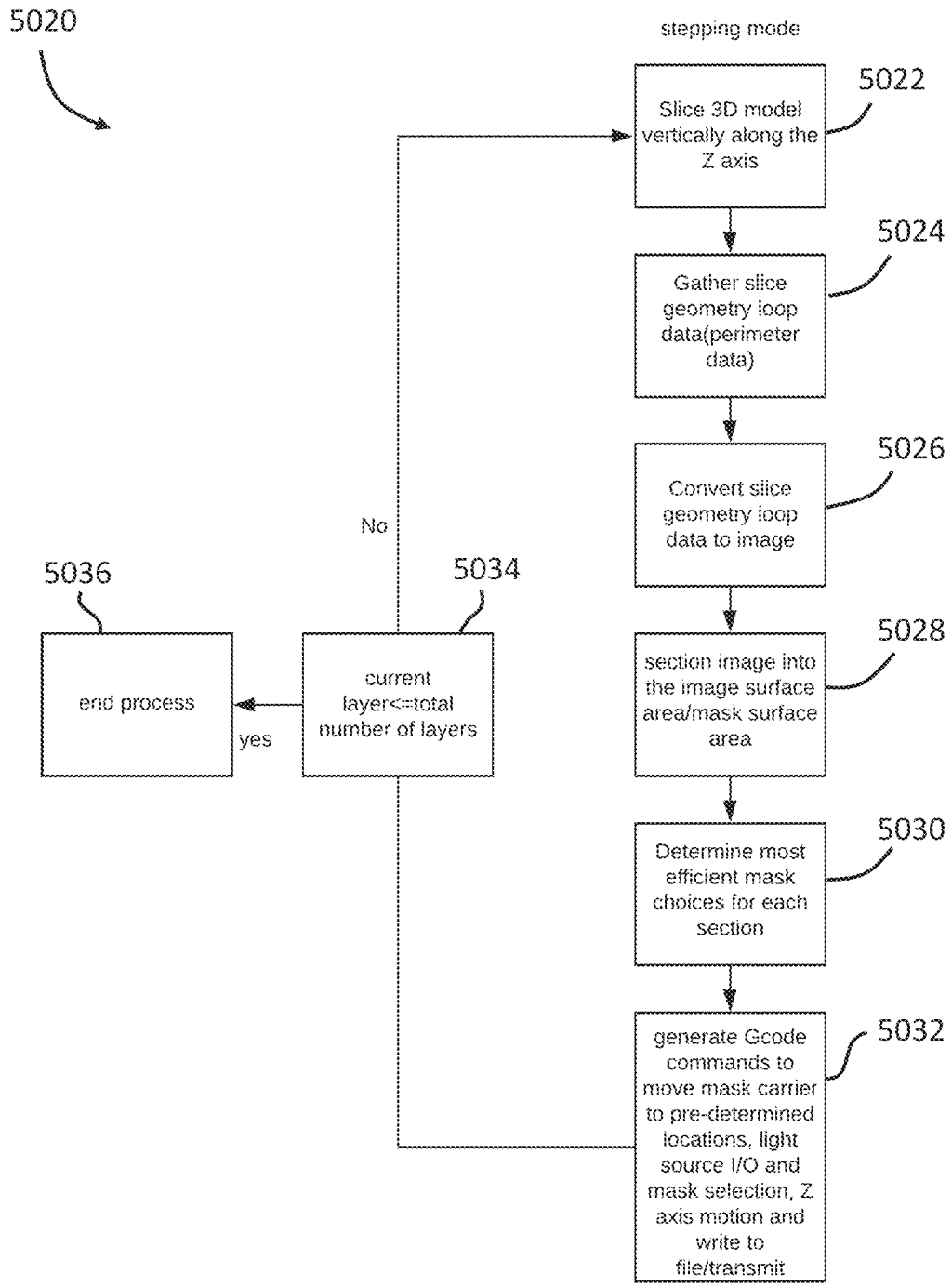
Figure 43C:
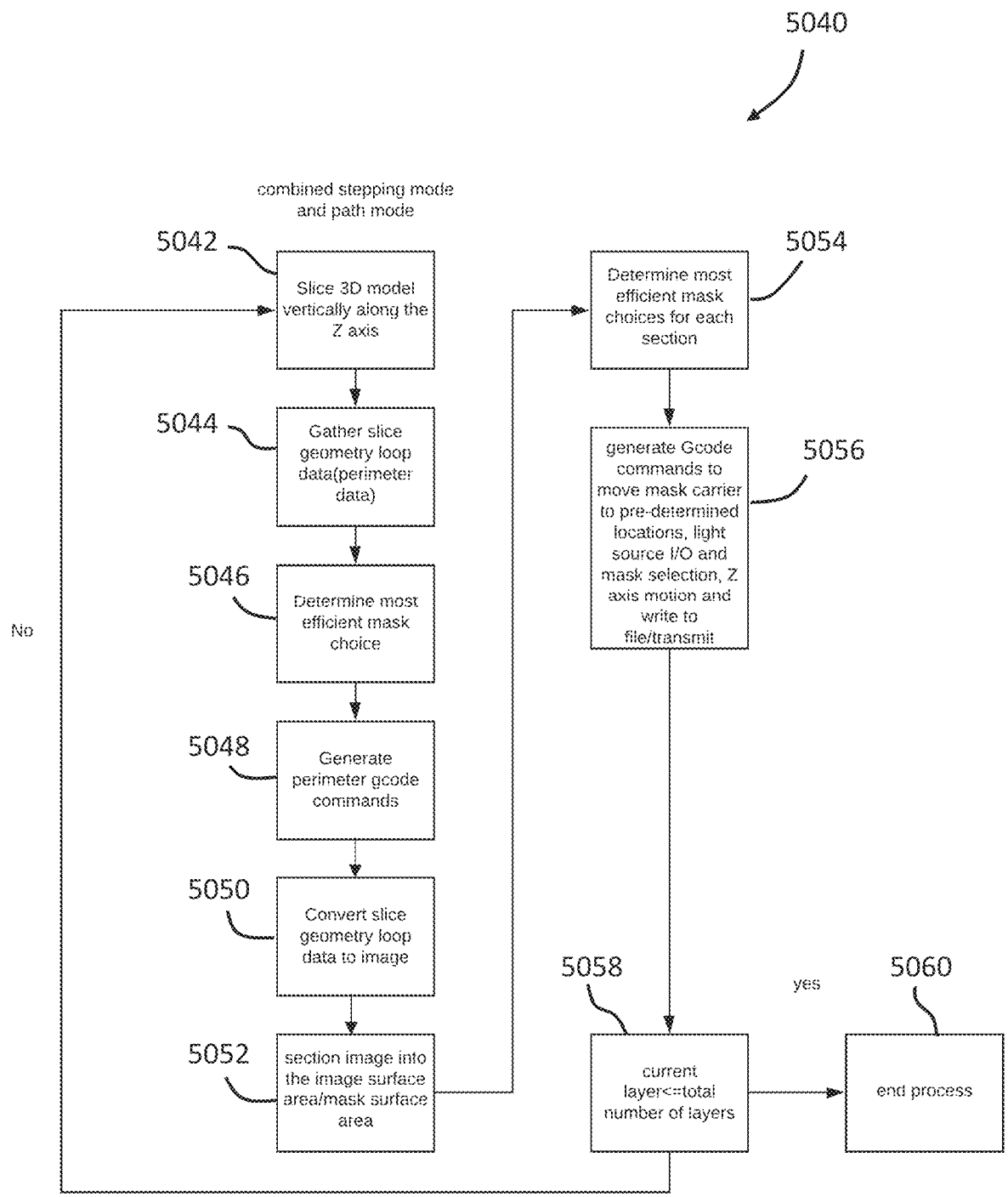

FIG. 43A-43C depict embodiments of a methods of slicing used for the printer to operate in path, stepping and combined path and stepping modes. In path mode (FIG. 43A) a method 5000 is provided where the 3D model geometry data is converted to Gcode commands that result in a plurality of lines and curves being drawn with a plurality of mask selections if desired. The method 5000 begins in block 5002 where the 3D model is sliced vertically along the Z-axis. The method 5000 then proceeds to block 5004 where the slice geometry loop data (perimeter data) is generated or gathered. The method 5000 then proceeds to block 5006 where an mask choice is determined based at least in part on the efficiency of the mask. The mask having a plurality of orifices. The method 5000 then proceeds to block 5008 where a perimeter code commands (i.e. a set of computer readable instructions such as gCode) is generated. The method 5000 then proceeds to block 5010 where an efficient mask choice is determined. The method 5000 then proceeds to block 5012 where an infill code commands (e.g. gCode) are generated within the loop geometry for the layer. The method 5000 then proceeds to block 5014 where a combined perimeter and infill code commands (e.g a set of computer readable instructions such as gCode) are generated for a complete layer, with slight source, input/output and axis motion. The method 5000 then proceeds to query block 5016 where it is determined if the current layer is the last layer. When block 5016 returns a negative or no, the method 5000 loops back to block 5002 and the process continues. When the block 5016 returns a positive, the method 5000 ends in block 5018.

Figure 44A:
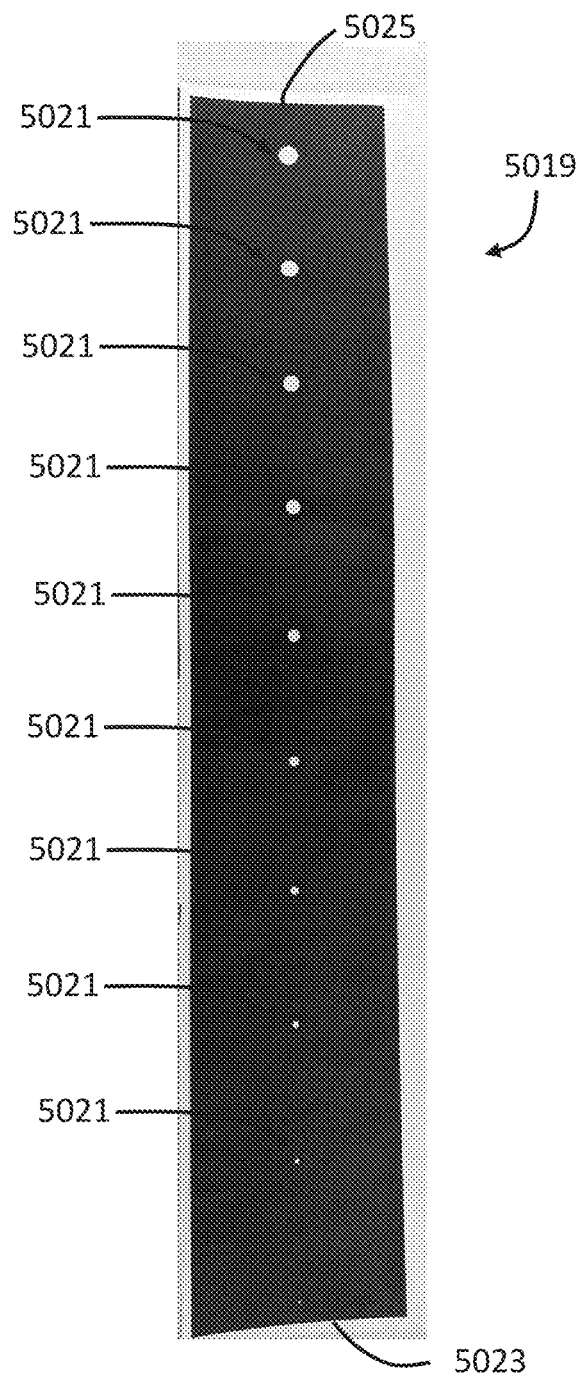
FIGS. 44A-44C are images of mask reels on various substrates. The left-most mask has a paper substrate created with inkjet printing methods. It features various orifice diameters suitable for path mode. The mask on the right is on a polymer substrate and features mask images suitable for stepping mode.
Figure 44B:
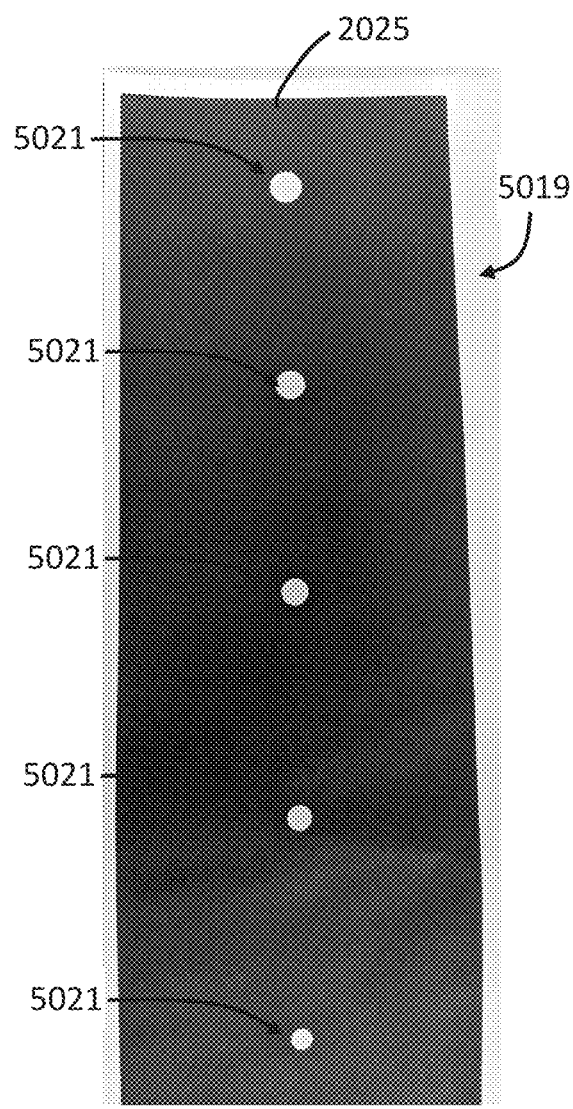
Figure 44C:
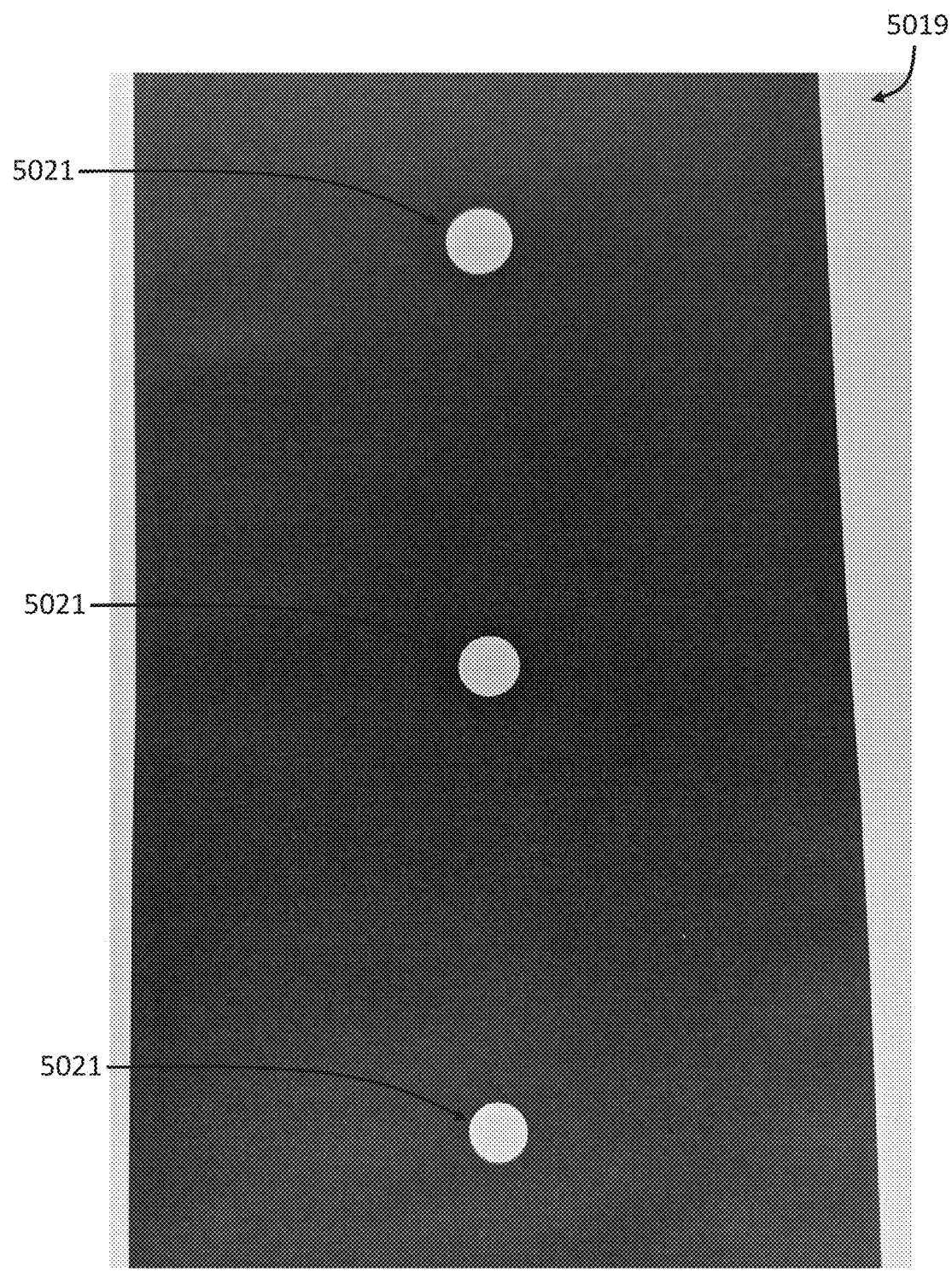

An embodiment of an active mask 5019 is shown in FIG. 44A-44C. In this embodiment, the mask 5019 includes a plurality of circular areas 5021 that allows light to pass therethrough. The circular areas 5021 a first size at a first end and gradually increase in size to a second size at an opposite end.

Figure 48A:
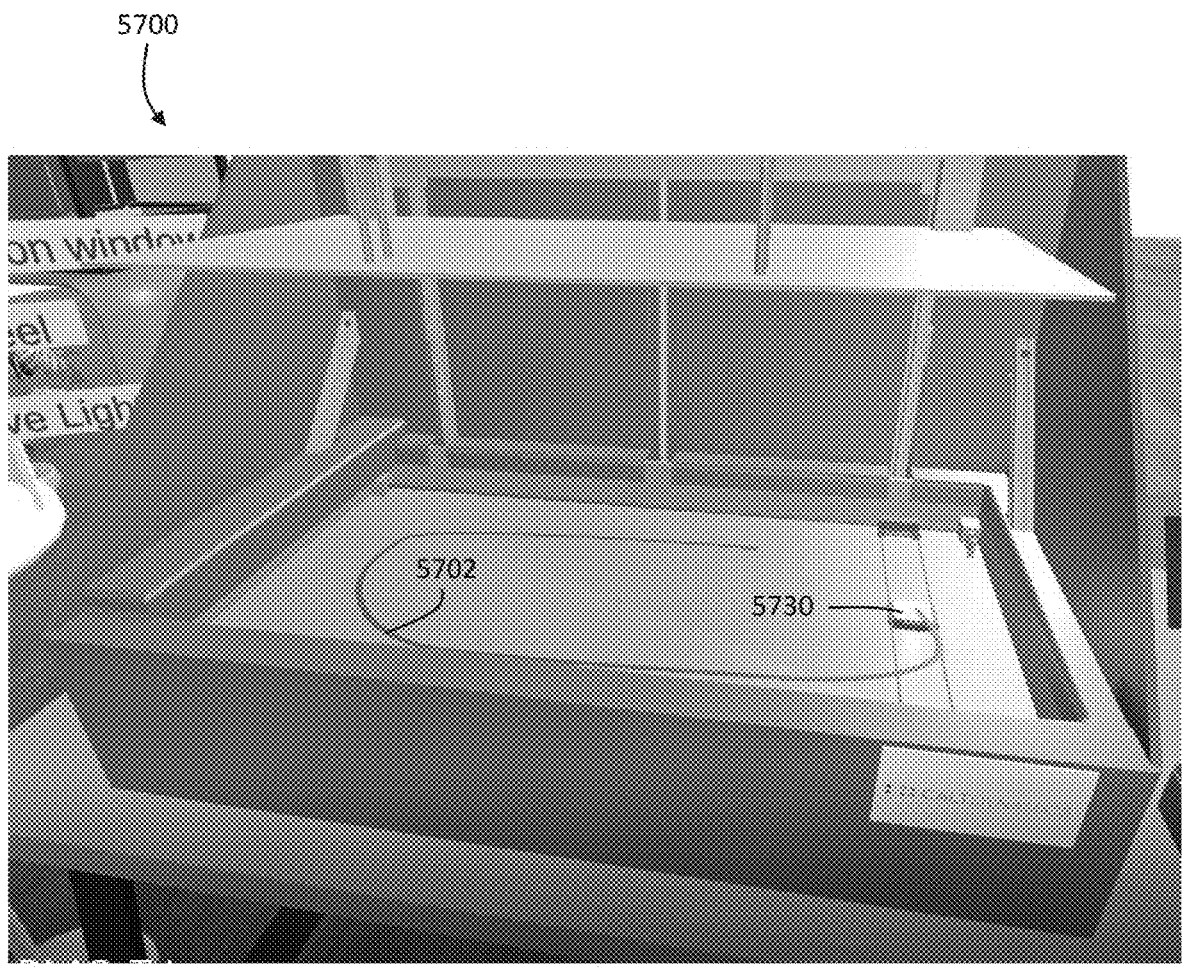
FIG. 48A illustrates a system forming a perimeter of a layer in accordance with an embodiment.
Figure 48B:
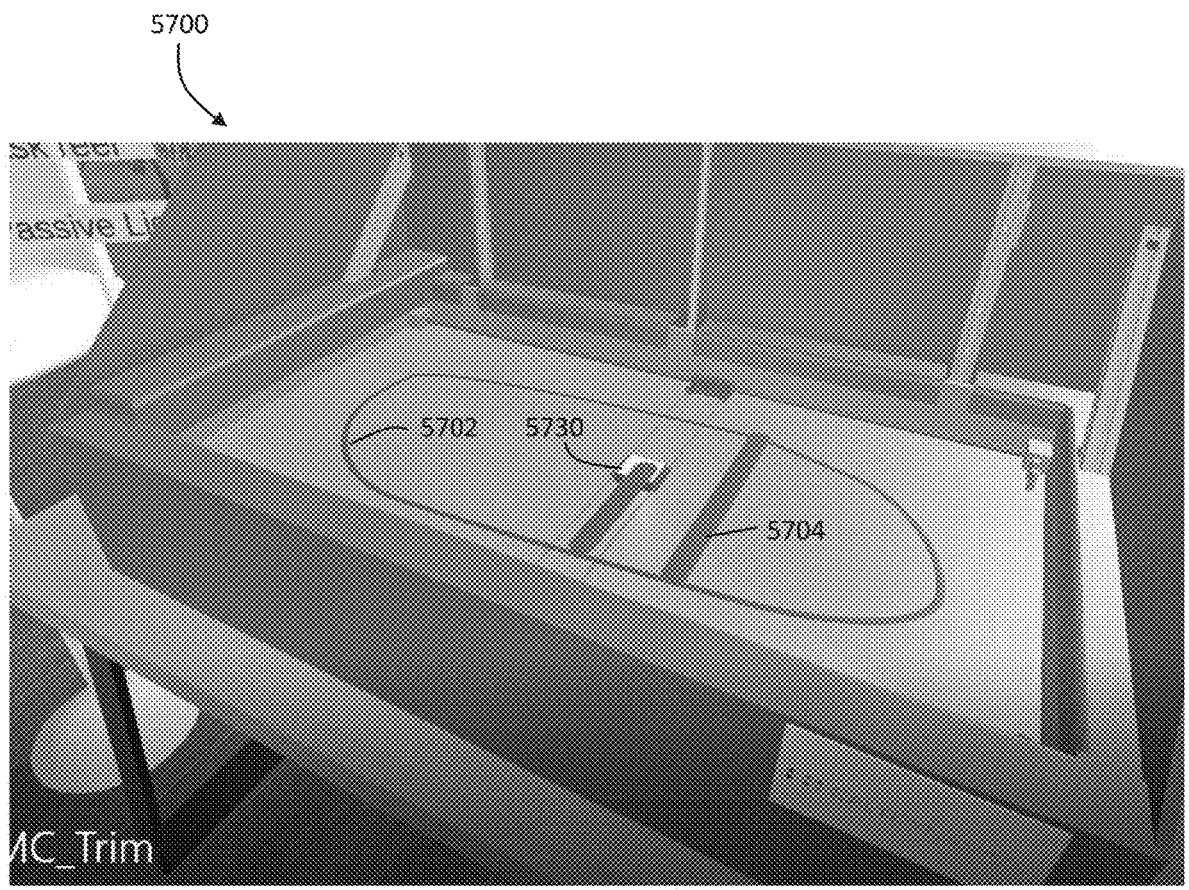
FIG. 48B illustrates the system of FIG. 49A forming an interior portion of the layer.

In an embodiment, when a system 5700 is operated using the method 5000, the perimeter 5702 of the object is formed first. In an embodiment, the mask carrier 5730 is configured with a mask having a relatively small orifice size, such as an orifice being closer to the end 5023 for the mask 5019 for example. In an embodiment, the perimeter 5702 is formed by continuously or nearly continuously moving the mask carrier 5730 along a path that defines the perimeter. Once the perimeter 5702 is formed, interior elements of the layer 5704 may be formed, such as is shown in FIG. 48B for example. In this example, the interior elements 5704 are formed using an orifice in the mask that is larger than that used to from the perimeter 5702, such as an orifice closer to the end 5025 of mask 5019 for example. It should be appreciated that the larger orifice may in some cases allow the area of photopolymer cured to be formed at a faster rate.

Figure 48C:
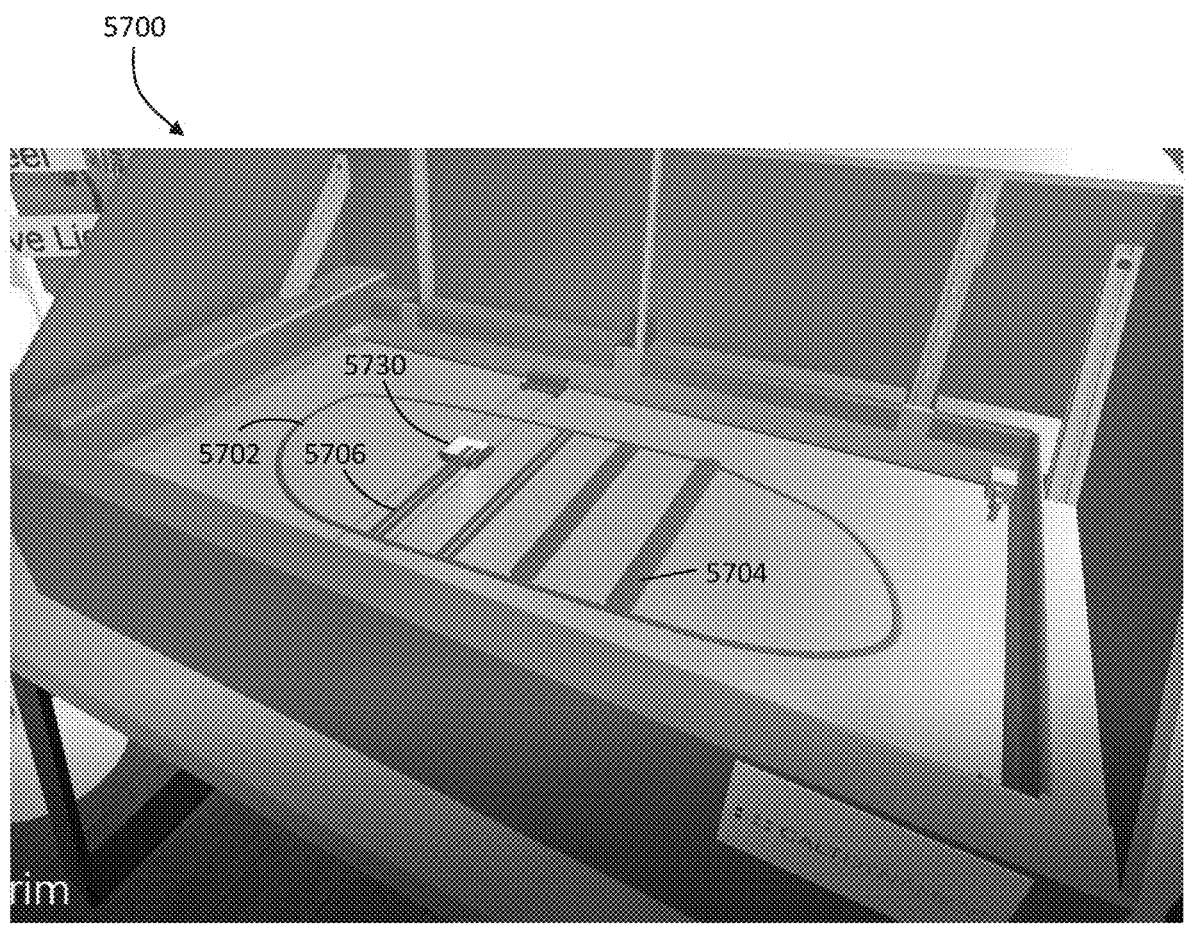
FIG. 48C illustrates the system of FIG. 49A forming an infill portion of the layer.

In the forming of some objects, there may be areas of a layer that are formed using infill 5706 as shown in FIG. 48C. As used herein, the term infill means cured photopolymer material that is used to take up or fill space inside an otherwise empty area of the object. In some embodiments, infill may be used to reduce the weight of an object by replacing solid interior material with infill. It should be appreciated that the orifice used on the mask to form the infill 5706 may vary depending on the space being filled.

In an embodiment, as the system 5700 transitions from one layer type (e.g. perimeter, interior element, infill, etc.) the mask within the mask carrier will automatically move to the orifice of the next layer type without stopping the motion of the mask carrier.

Referring to FIG. 43B, a method 5020 for the stepping mode slices the 3D model both vertically and horizontally such that sections can be cured sequentially. The appropriate/most efficient mask selection is made depending on the contents of the section. The method 5020 starts in block 5022 where the 3D model is sliced vertically along the Z axis. The method 5020 then proceeds to block 5024 where the slice geometry loop data (perimeter data) is gather. The method 5020 then proceeds to block 5026 where the slice geometry loop data is converted to an image. The method 5020 then proceeds to block 5028 where the image is sectioned into the image surface area and the mask surface area. The method then proceeds to block 5030 where it is determined which mask is chosen based at least in part on efficiency. In an embodiment, the image may be subdivided into a plurality of sections based at least in part on the size of the orifices in the selected mask and in some instances the size of the mask itself. The method 5020 then proceeds to block 5032 where code commands (e.g a set of computer readable instructions such as gCode) are generated for moving the mask carrier to a pre-determined location, and includes light source input/output, mask selection, and Z axis motion. The method 5020 then proceeds to query block 5034 where it is determined if the current layer is the last layer. When block 5034 returns a negative or no, the method 5020 loops back to block 5022 and the process continues. When the block 5034 returns a positive, the method 5020 ends in block 5036.

Figure 48D:
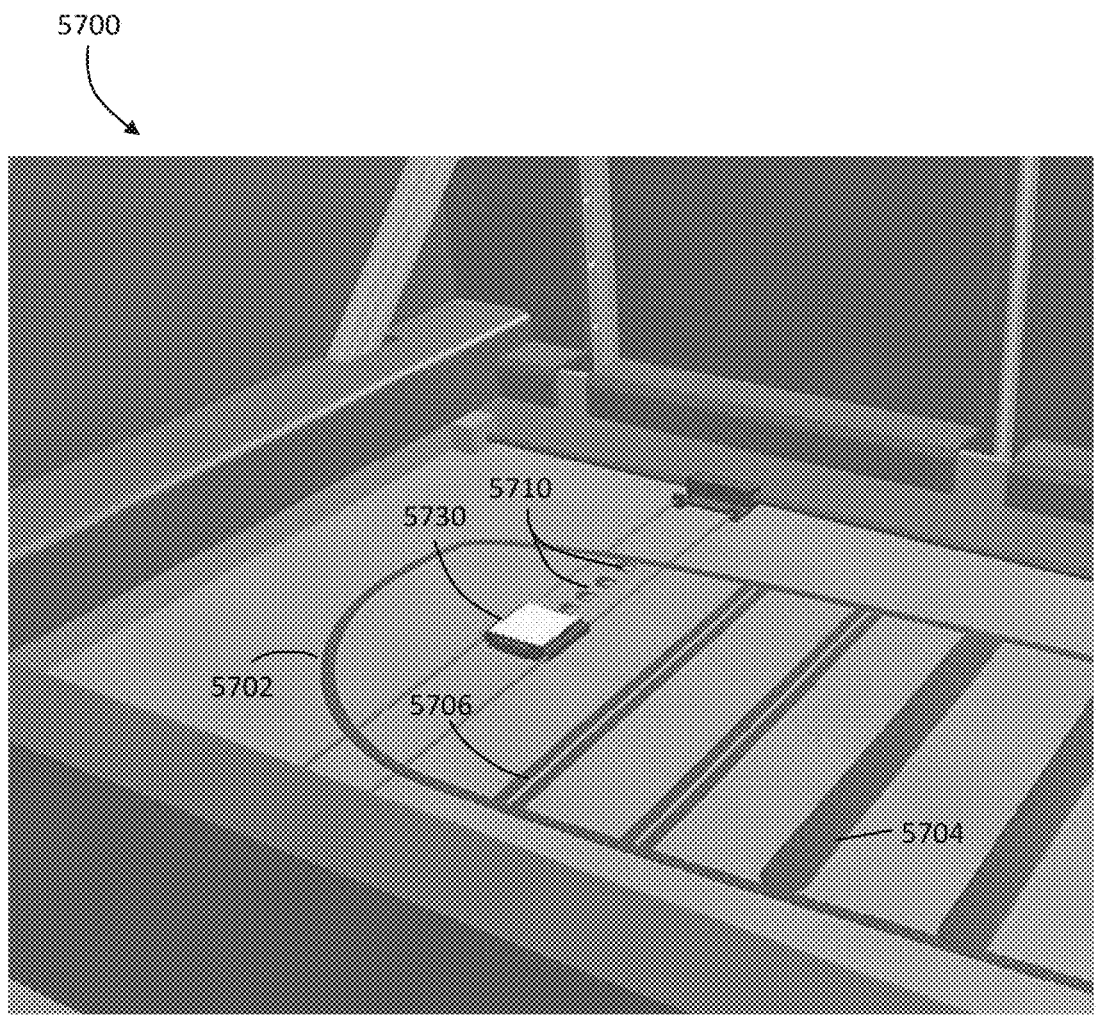
FIG. 48D illustrates the system of FIG. 49A performing a stepping mode of operation.

In the embodiment of FIG. 48A-48D, the stepping mode is illustrated in FIG. 48D where the mask carrier 5730 is moved in discrete steps to form a series or plurality of cured photopolymer shapes 5710.

Referring to FIG. 43C shows an embodiment a method 5040 for a combined path and stepping mode that allows the printer to draw a perimeter for example in path mode where a most efficient mask orifice is selected prior to curing. Following this, the layer is divided into images, described as sections, which can be cured in stepping mode. The resulting curing of the layer can be optimised such that a desired mode for the task be selected. In an embodiment, the desired mode is based at least in part on efficiency of the generation of the layer. The method 5040 starts in block 5042 where the 3D model is sliced vertically along the Z axis. The method 5040 then proceeds to block 5044 where the slice geometry loop data (perimeter data) is gathered. The method 5040 then proceeds to block 5046 where it is determined which mask is chosen based at least in part on efficiency. The method 5040 then proceeds to block 5050 where the slice geometry loop data is converted to an image. The method 5040 then proceeds to block 5052 where the image is sectioned into an image surface area and a mask surface area. The method 5040 then proceeds to block 5054 where it is determined which mask is chosen based at least in part on efficiency. The method 5040 where code commands (i.e. (e.g a set of computer readable instructions such as gCode) are generated to move the mask carrier to a pre-determined location, including light source input/output, mask selection, and Z axis motion. The method 5040 then proceeds to query block 5058 where it is determined if the current layer is the last layer. When block 5058 returns a negative or no, the method 5040 loops back to block 5042 and the process continues. When the block 5058 returns a positive, the method 5040 ends in block 5060.

Figure 45:
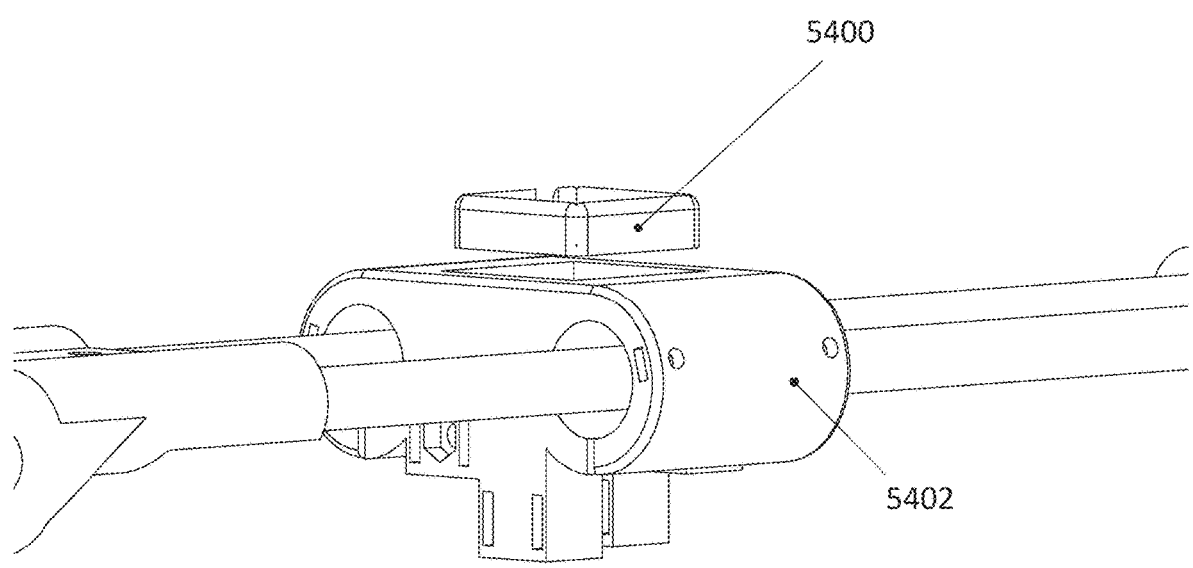
FIG. 45 illustrates a mask carrier in accordance with an embodiment.
Figure 46A:
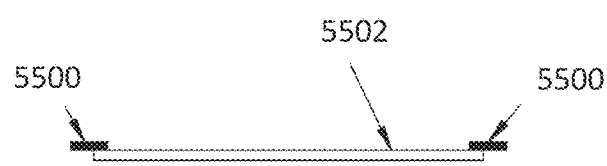
FIG. 46A-46D illustrate a sequence of steps illustrating that a force holding a cured object to a print bed is greater than a downward force cause by its mass.
Figure 46B:
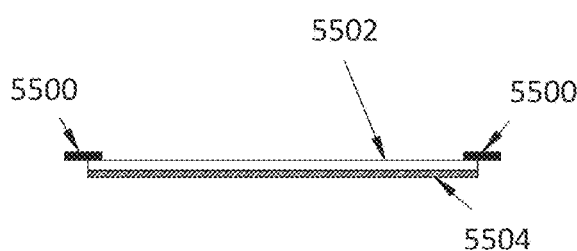
Figure 46C:
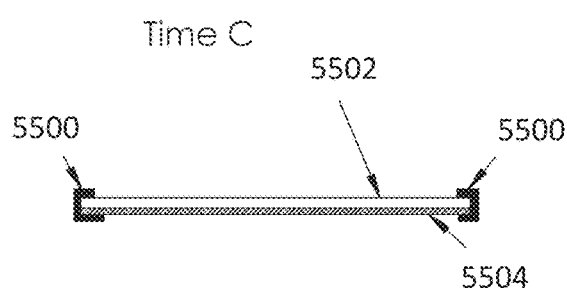
Figure 46D:
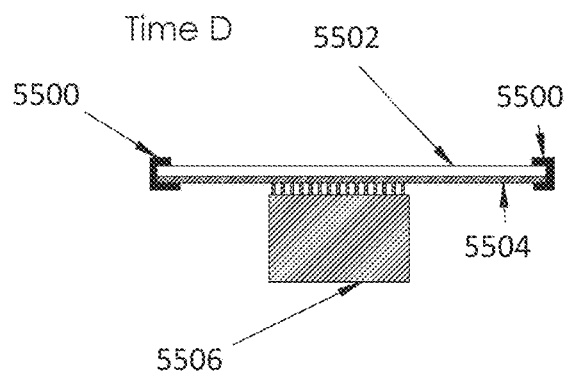

Referring now to FIG. 45 where an embodiment is shown of a mask carrier 5400. In this embodiment, the mask carrier 5400 is removably coupled to a mask reel housing 5402. The mask carrier 5400 is configured to support a light source, the mask reel 5402 and associated components as described herein. The mask reel housing 5042 and light source are removably coupled from each other. It should be appreciated that this modularity provides advantages in allowing mask reels to be provided or manufactured by different sources and used in a common system 1000. In an embodiment, a housing is configured to contain a mask reel and associated components such as rotary axels, sensory components for identification of the housing and the contents of the mask reel, motors for axel rotation and optical components. The housing is couple-able and decouple-able from a mask carrier assembly. For example, the housing may contain a near field communication tag that stores information about the mask reel contained within such as the number of masks on the reel, information about the purpose of each mask (e.g. a 10 mm diameter curing orifice). Additionally, the housing may feature electrical connections for the purposes of transferring power to internal components such as motors.

Referring now to FIG. 46A-46D, an embodiment is shown of a method which provides that the upward force holding a cured object to a print bed is greater than the force downward caused by its mass. It should be appreciated that this is advantageous when the object is large or heavy and would otherwise fall from the print bed under its own weight under the influence of gravity. A set of clamps 5500 whose position may be adjusted during the printing process. A print bed 5502 is provided such that at time A (FIG. 46A), the print bed 5502 is empty and the clamps 5500 are in an open/disengaged position. At time B (FIG. 46B), the print process has been initiated and a portion of the object has been manufactured. A base plate 5504 has been cured onto the print bed 5502. Once the base plate 5504 is complete, at time C (FIG. 46C), the clamps 5500 are moved into a closed/engaged position such that they are now applying pressure to the base plate 5504 in the direction of the print bed 5502. Time D (FIG. 46D) shows the end of the printing process with the completed object 5506 located below the base plate 5504 which is being held with additional force provided by the clamps to the print bed.

Figure 47A:
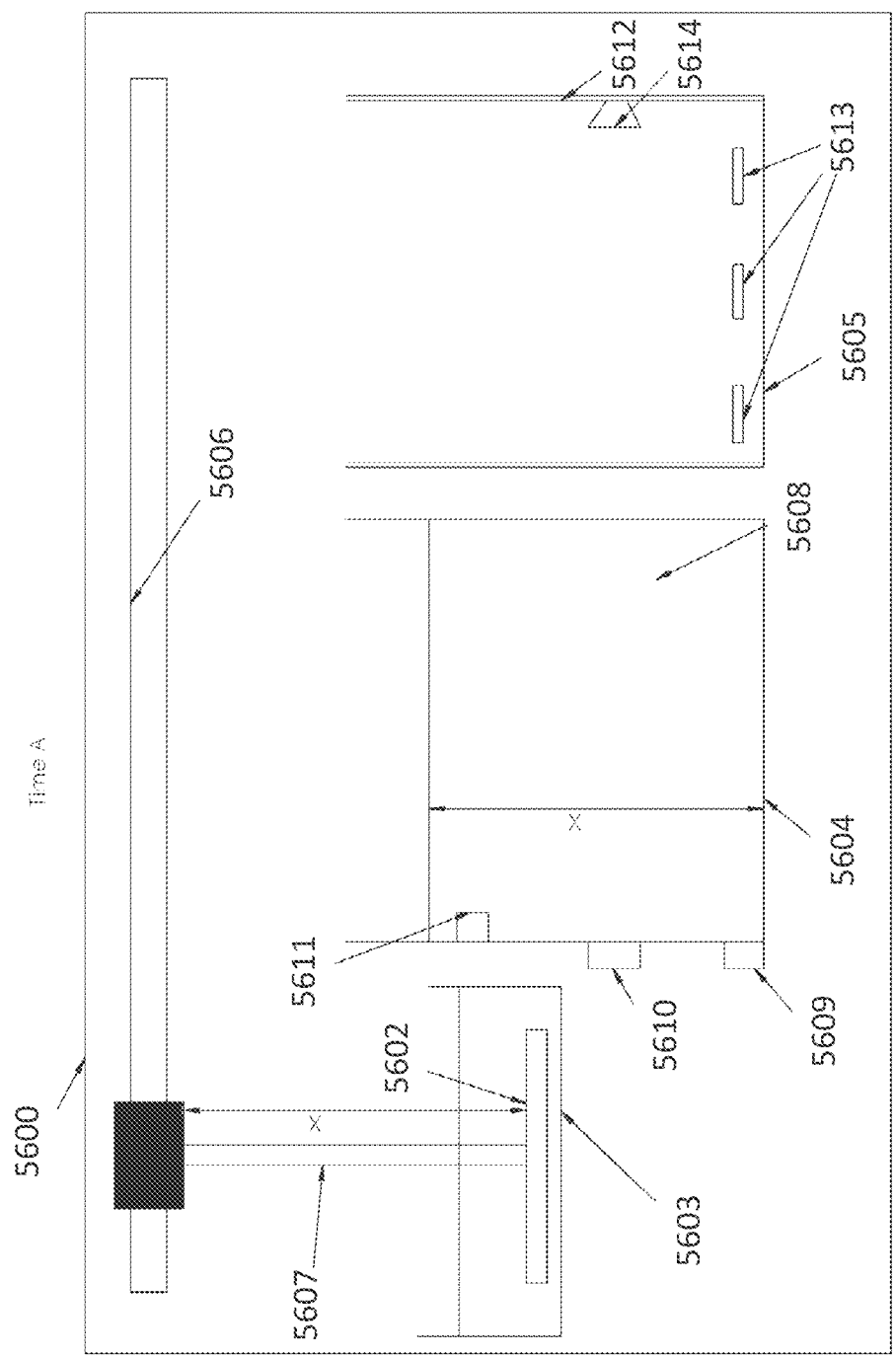
FIG. 47A-47H illustrates a system for fabricating or 3D printing and washing an object.
Figure 47B:
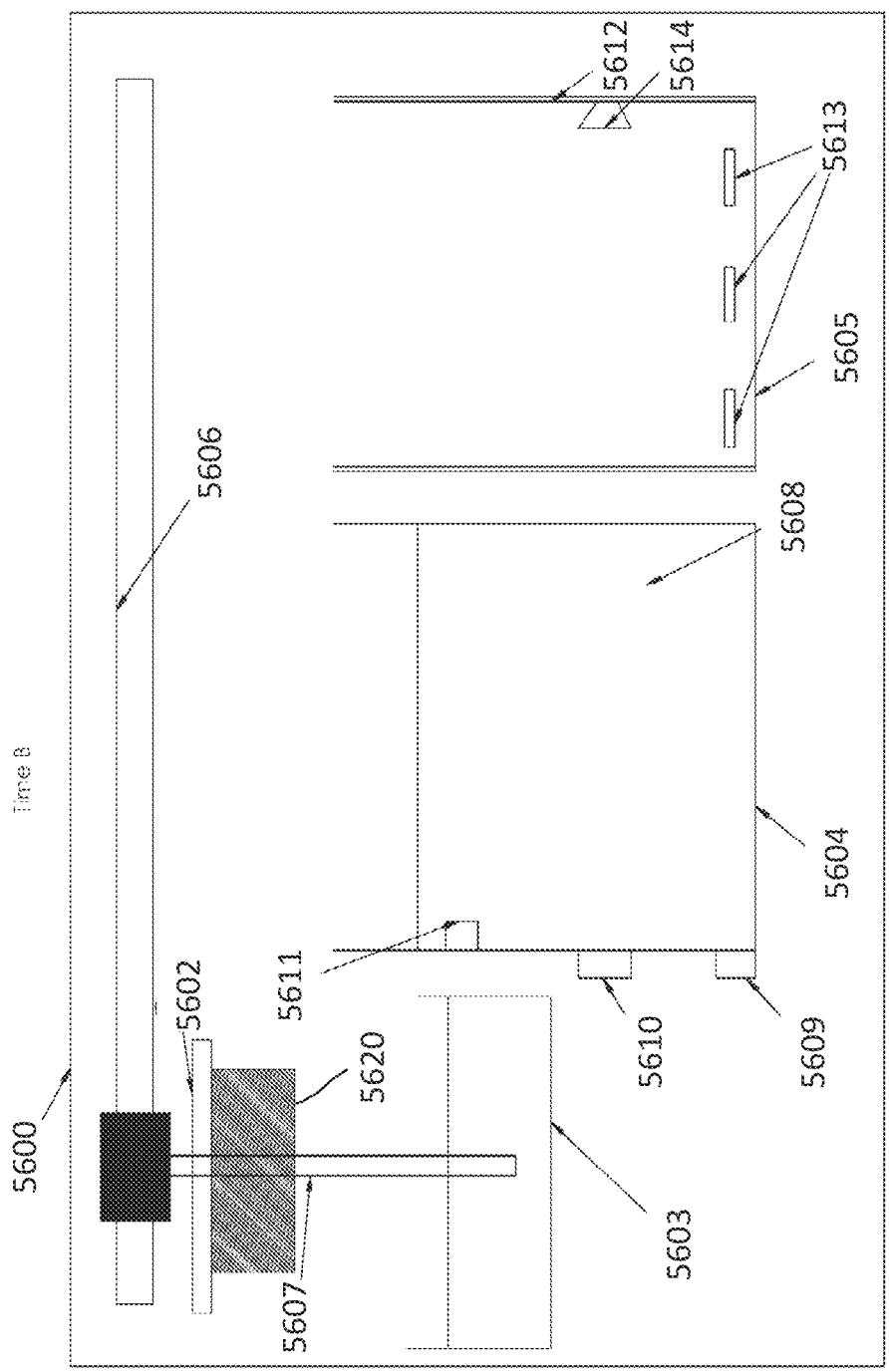
Figure 47C:
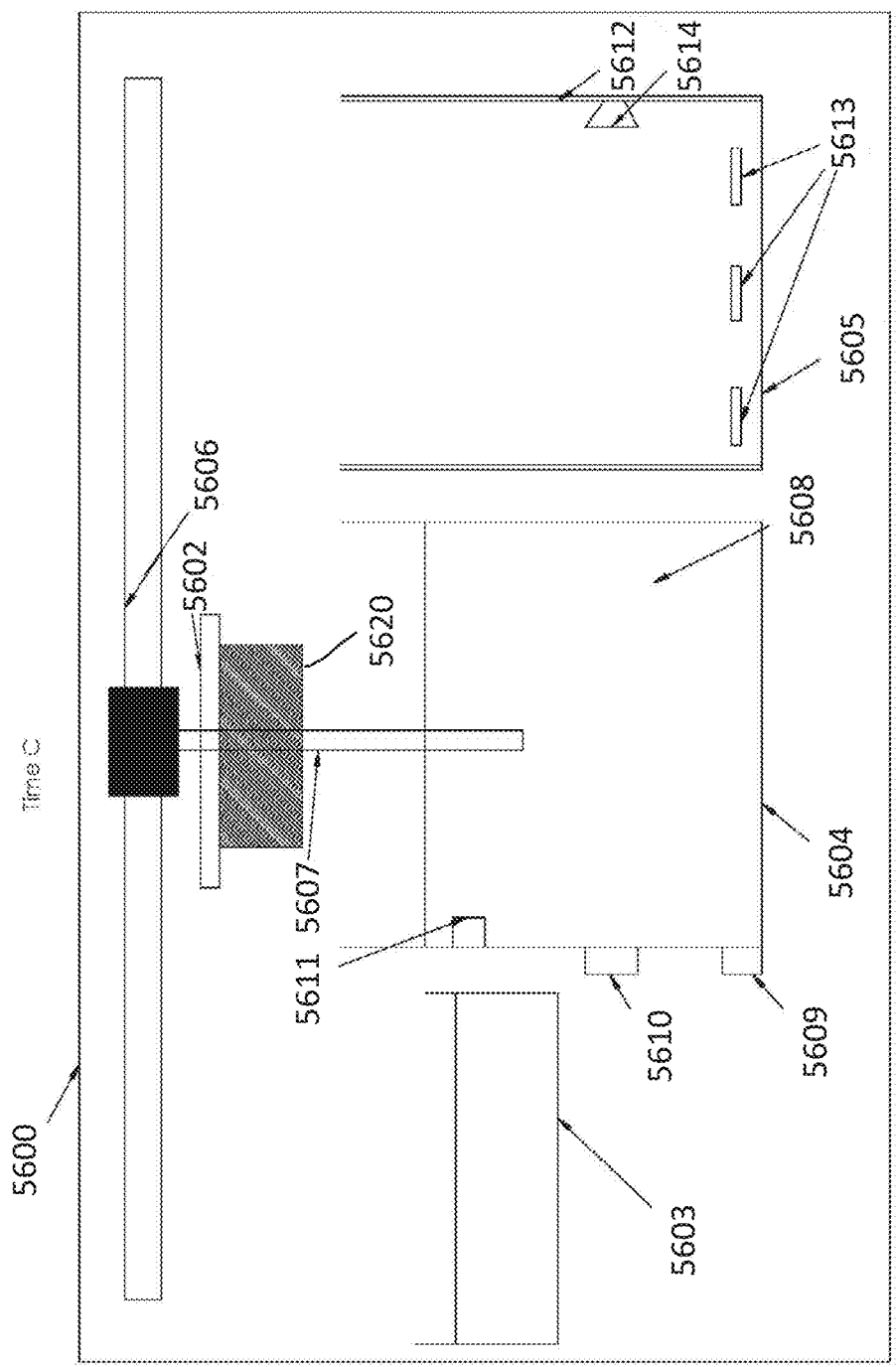
Figure 47D:
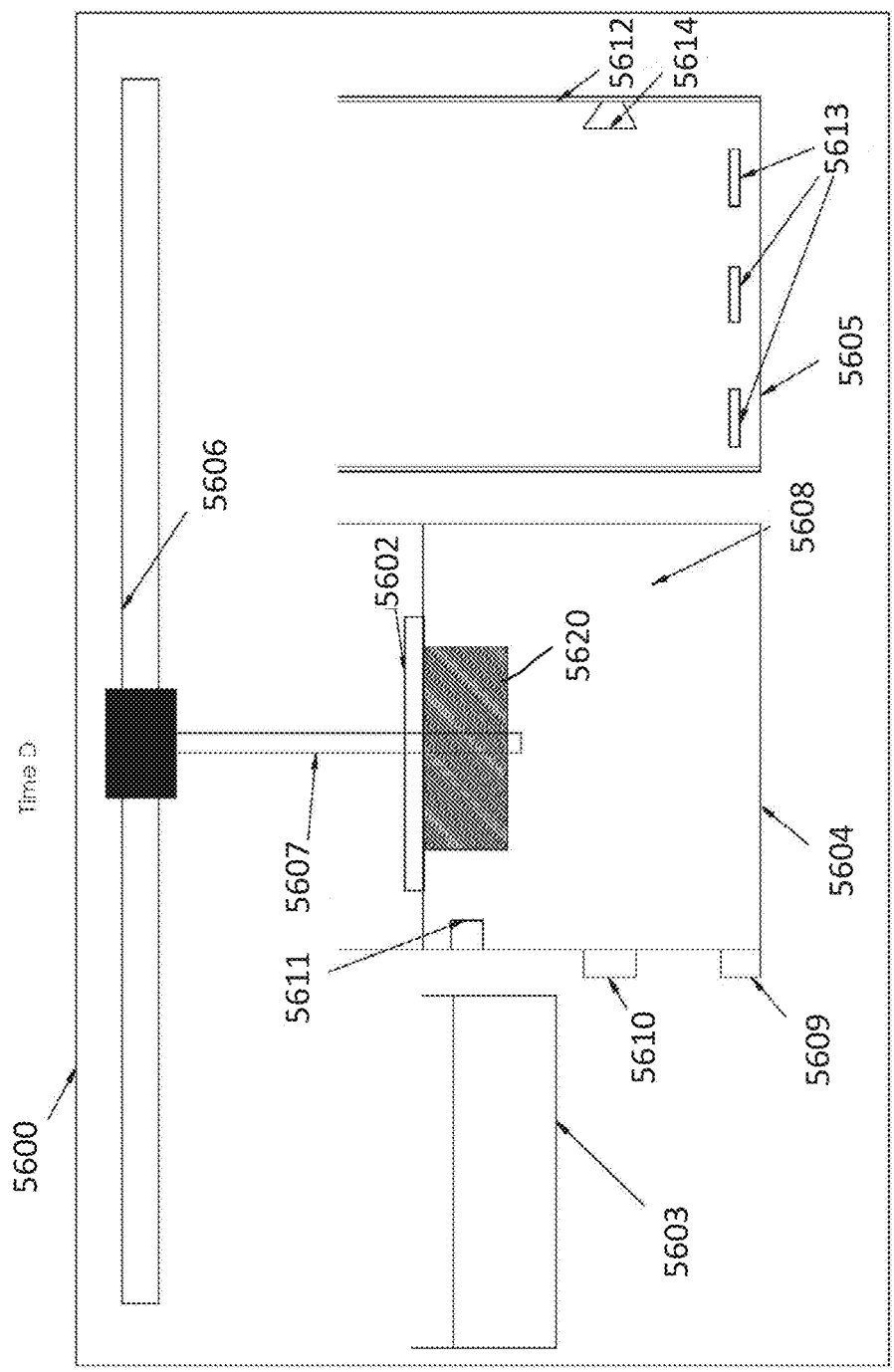

Referring now to FIG. 47A-47C, a mechanical configuration is shown which allows for the washing and curing of a 3D printed object in an automated process, following the manufacture of the printed object 5620, without the user removing the print bed for example. The 3D printing device 5600 includes with a print bed 5602 located above a photopolymer vessel 5603. The device 5600 also features a wash tank 5604 and a cure tank 5605. Additionally, the device 5600 features an axis 5606 of motion at 90 degrees to the motion of the z axis (e.g. perpendicular to the z axis). The z axis 5607 is mounted to the horizontal axis 5606. At time A (FIG. 47A) the device 5600 is in a position such that a 3D print can start. At time B (FIG. 47B), a 3D print has been completed. Normally this would be the end of the process but rather at time C (FIG. 47C), the z axis assembly 5607 has moved along axis 5606 such that it is located above the wash tank 5604. At time D (FIG. 47D), the completed 3D print has been lowered into the wash tank 5604. The speed with which it is lowered is controlled. The 3D print is submerged in a fluid 5608 within the chamber 5604. The 3D print is submerged for a specified amount of time which is controllable.

Figure 47E:
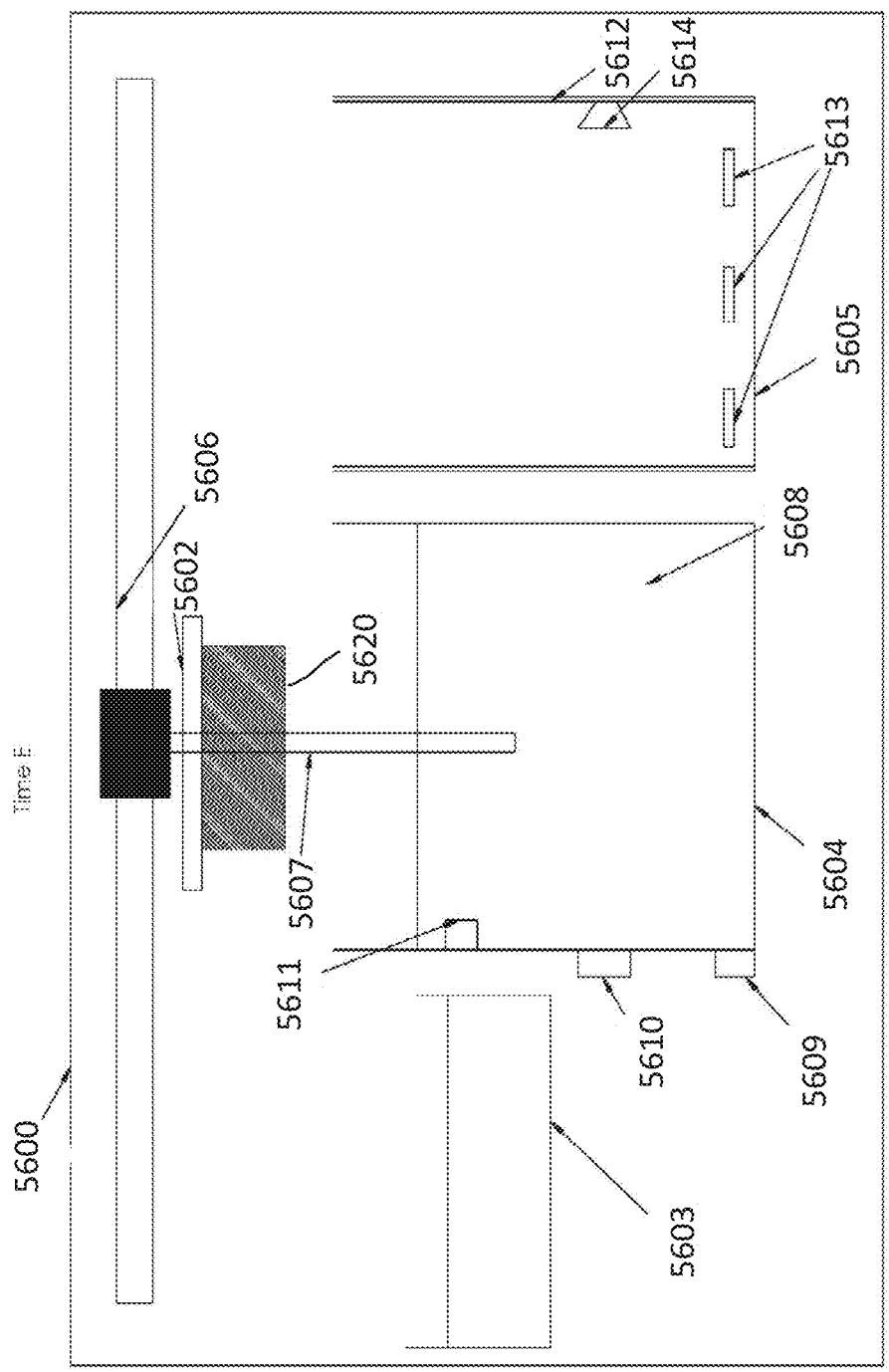
Figure 47F:
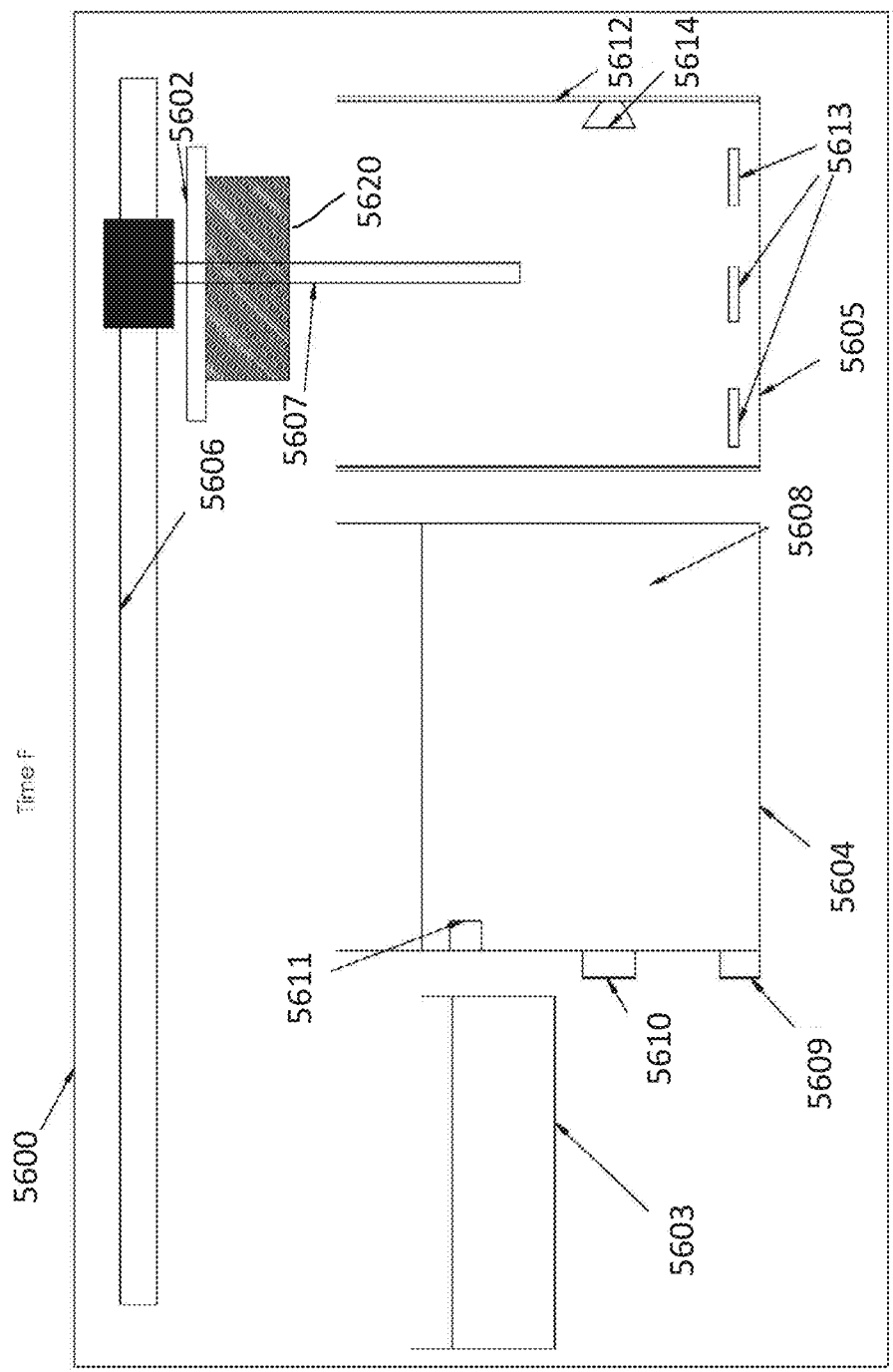
Figure 47G:
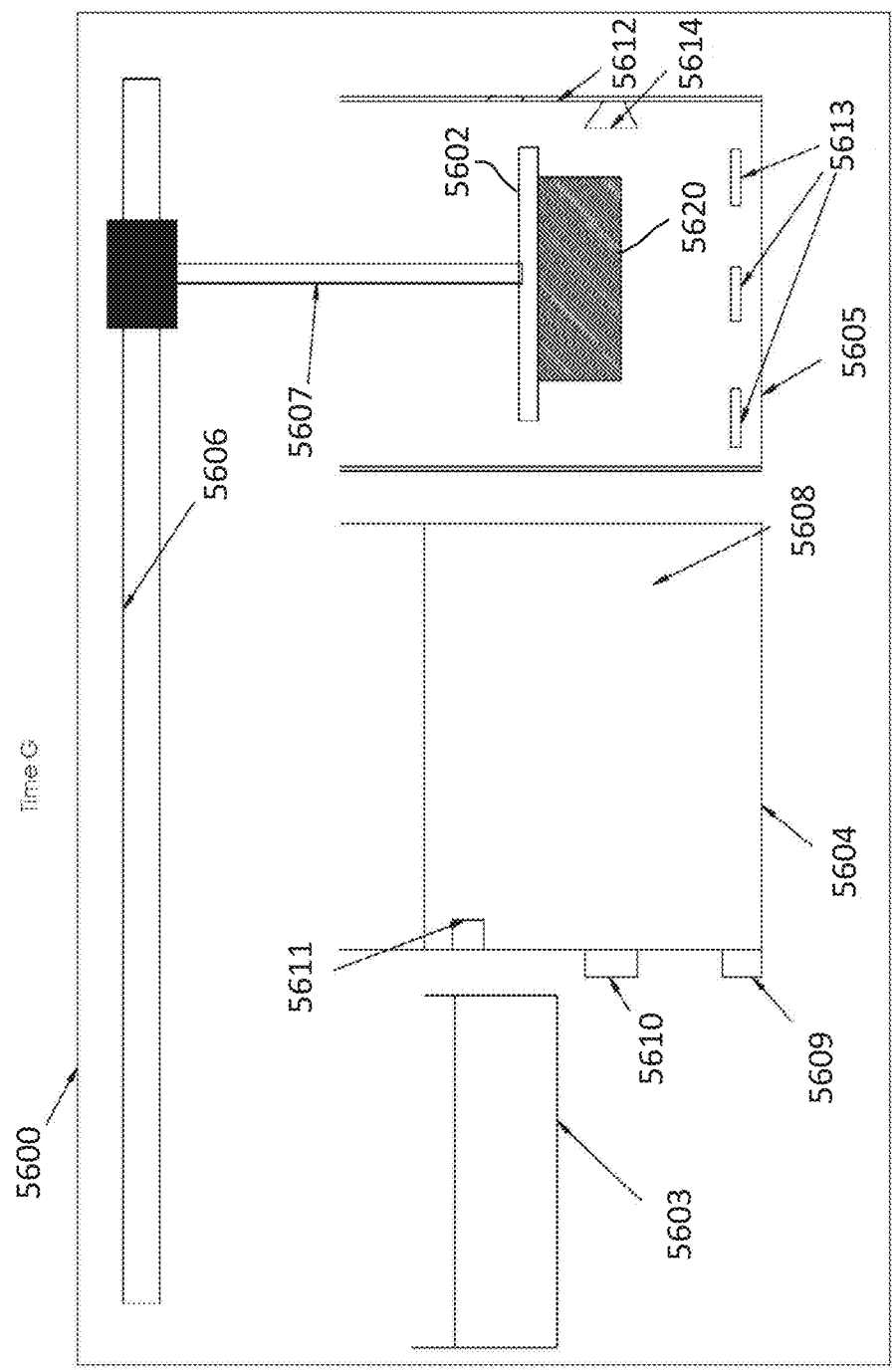
Figure 47H:
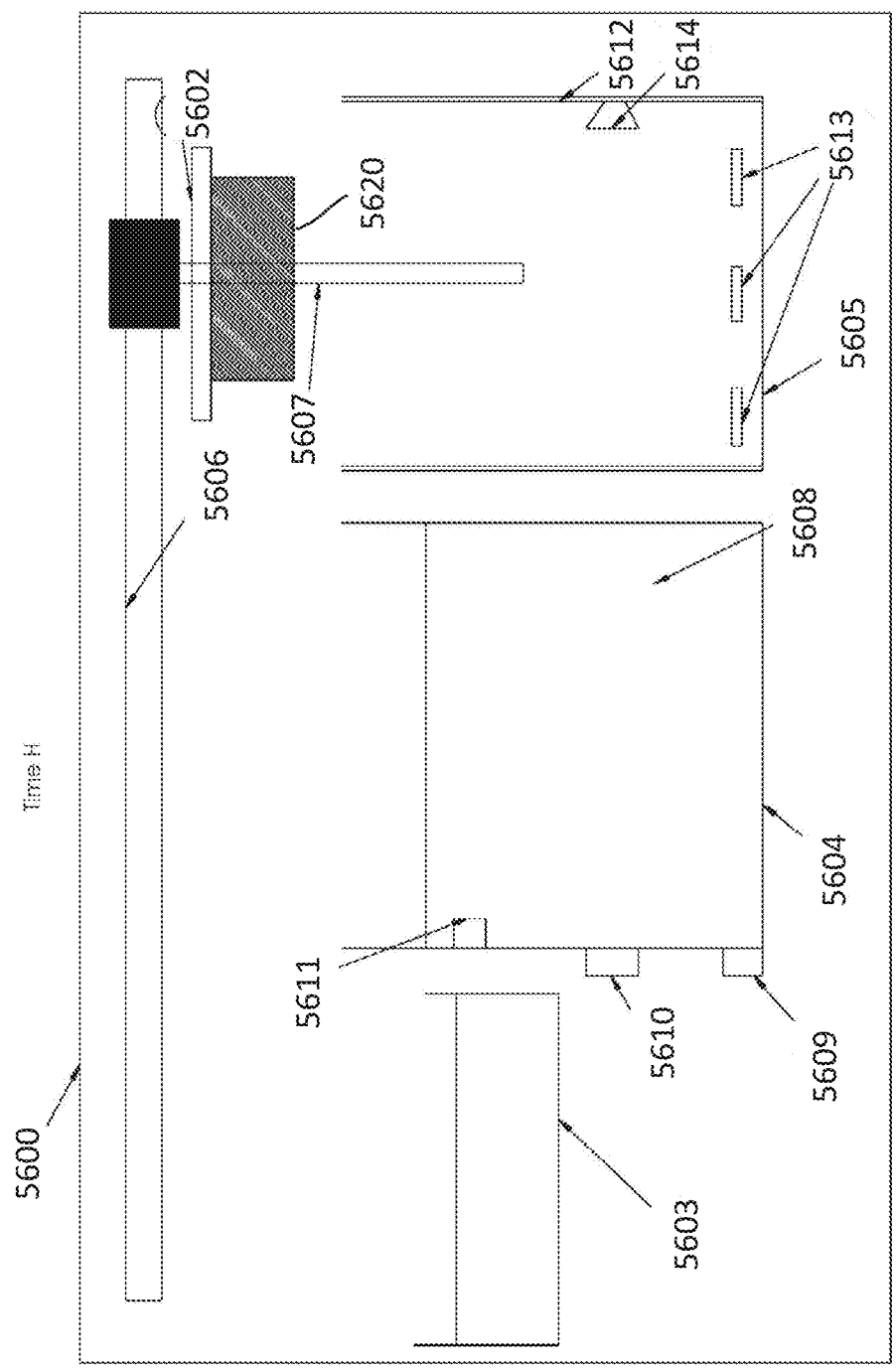

The chamber 5604 may feature additional actuators to induce sonic resonance 5609, heating elements 5610 for maintaining the chambers 5604 temperature and sensory components such as temperature sensors 5611 for providing proper operation of the device 5600. At time E (FIG. 47E), the cleaning process has been completed and the print bed 5602 has been raised to its highest position. At time F (FIG. 47F), the z axis assembly 5607 has been moved further along axis 5606 such that it is located above the curing chamber 5605. At time G (FIG. 47G), the 3D print object 5620 is lowered such that it is within the confines of, or interior of, the curing chamber 5605. This chamber 5605 features reflective wall lining 5612 such as an aluminum foil and a plurality of LEDs 5613 spaced equidistant throughout the chamber 5605. Additionally, the chamber features a heating element 5614 to allow for heating of the 3D printed object 5620 and evaporation of fluids via convection. The LEDs within the chamber 5605 may be illuminated for a specific amount of time for the purposes of post-curing the 3D printed object 5620. At time H (FIG. 47H), the 3D printed object 5620 has been raised along the z axis 5607 to its fullest extent and the process is complete.

In an embodiment, the additive manufacturing or 3D printing systems described herein, such as systems 100, 200, 300, 500, 600, 700, 900, 1000, 1100, 1200, 3100, 3800, 5600, 5700 for example, may be used with a mask having one or more orifices. In an embodiment, the mask 5019 includes a plurality of orifices 5021. The orifices 5021 may be of different sized, such as having a smallest orifice at one end 5023 and progressively and incrementally increasing in size to a largest orifice at a second end 2025.

It should be appreciated that a mask, such as mask 5019 allows the additive manufacturing system to generate a continuous cured bead of a photopolymer during operation. In other words, a mask such as mask 5019 provides flexibility and advantages in allowing the generation of a layer by forming a plurality of cured photopolymer areas in the shape of the orifice. In an embodiment, this may be similar manner to how an ink jet printer forms letters and images by depositing droplets of ink on a page for example. Thus a single mask 5019 may be used to generate a plurality of different objects without changing the mask. It should be appreciated that while FIG. 44A-44C illustrate the mask 5019 as having circular orifices, this is for example purposes and the claims should not be so limited. In other embodiments, the mask 5019 may have a plurality of orifices with a plurality of shapes. In an embodiment, one of the orifices may be used to form a repeatable shape or pattern, such as a logo for example. In an embodiment, the additive manufacturing system may form the repeatable shape or pattern using the stepping mode 5040 of FIG. 43C.

It should be appreciated that while embodiments herein describe the operation of the additive manufacturing system as using an orifice, in other embodiments, the system may use the light source of FIG. 41A-41B. In still further embodiments, the embodiments described herein may use a mask having an orifice (or plurality of orifices) in combination with the light source of FIG. 41A-41B.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should also be noted that the terms "first", "second", "third", "upper", "lower", and the like may be used herein to modify various elements. These modifiers do not imply a spatial, sequential, or hierarchical order to the modified elements unless specifically stated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of fabricating an object, the method comprising:
   providing a vessel containing a photopolymer, a membrane affixed to the vessel, and a bed having a surface disposed at least partially within the vessel, the surface being positioned a first layer thickness away from membrane;
   providing a movable carrier and a mask disposed within the carrier, the mask having a plurality of orifices formed therein, the plurality of orifices being configured to transmit light therethrough;
   directing a first light through at least one orifice of the plurality of orifices and the membrane into the photopolymer, the first light being generated by a light source;
   curing a first portion of the photopolymer between the membrane and the bed with the first light;
   moving, during operation, the carrier and the mask disposed within the carrier from a first position to a second position in a plane that is parallel to the surface to separate the first portion from the membrane, the light source being operably coupled to the carrier; and
   moving the bed in a direction away from the membrane and the light source.

2. The method of claim 1, wherein the membrane forms a bottom surface of the vessel.

3. The method of claim 1, wherein moving the bed in a direction away from the membrane separates the first portion from the membrane by a predetermined distance.

4. The method of claim 3, wherein separating the first portion from the membrane includes peeling the first portion from the membrane, the peeling beginning at an edge of the first portion in response to a movement of the carrier.

5. The method of claim 1, wherein the moving of the bed is a distance equal to a next layer thickness.

6. An additive manufacturing system comprising:
   a light source configured to emit light;
   a vessel configured to contain a photopolymer;
   a bed having a surface disposed at least partially within the vessel, the surface being movable in a first direction relative to the light source;
   a membrane fixed to the vessel, the membrane being positioned between the light source and the photopolymer; and
   a movable carrier disposed between the light source and the membrane, the light source being operably coupled to the movable carrier, the carrier being a mask carrier that is movable during operation in a plane that is parallel to the surface; and
   a mask disposed within the mask carrier, the mask having a plurality of orifices formed thereon, the orifices being configured to transmit the light therethrough.

7. The system of claim 6, wherein the vessel further comprises a housing having a bottom opening and the membrane extends across the bottom opening.

8. The system of claim 6, wherein an upper side of the membrane is coated with at least one of a hydrophobic material and a fluid having a density greater than a density of the photopolymer.

9. The system of claim 6, wherein the membrane is fixed to the vessel with a tension sufficient to maintain the membrane in a flat configuration when the weight of the photopolymer is acting on the membrane.

10. The system of claim 6, wherein the bed is configured to move one layer thickness after a first layer is formed.

11. The system of claim 6, wherein the light source is configured to emit light in the ultraviolet spectrum.

12. The system of claim 6, wherein the light source includes one of a light emitting diode, a cold cathode tube, or an array of dynamically selectively activated light emitting diodes.

13. The system of claim 6, wherein the membrane has a Youngs modulus between 0.4 GPa and 4.5 GPa.

14. The system of claim 6, wherein the mask carrier is removably coupled to the system.

15. The system of claim 6, wherein the membrane is configured in operation to release from a cured photopolymer as the mask carrier moves in the plane.

16. The system of claim 6, further comprising a wash tank disposed adjacent the vessel, wherein the bed is configured to move a formed photopolymer object from the vessel to the wash tank.

17. The system of claim 16, further comprising a cure tank having at least one evaporation element operably disposed thereon, the cure tank being disposed adjacent the vessel and the wash tank, the bed being configured to move the formed photopolymer object from the wash tank to the cure tank.

* * * * *